United States Patent [19]

Bourke et al.

[11] Patent Number: 5,276,814
[45] Date of Patent: Jan. 4, 1994

[54] METHOD FOR TRANFERRING INFORMATION BETWEEN MAIN STORE AND INPUT OUTPUT BUS UNITS VIA A SEQUENCE OF ASYNCHRONOUS BUS AND TWO SYNCHRONOUS BUSES

[75] Inventors: Donall G. Bourke, Boca Raton; Douglas R. Chisholm, Delray Beach, both of Fla.; Gregory D. Float, Vestal, N.Y.; Richard A. Kelley, Coral Springs, Fla.; Roy Y. Liu; Carl A. Malmquist, borh of Vestal, N.Y.; John M. Nelson, Apalachin; Charles B. Perkins, Jr., Endicott; Richard L. Place, Vestal, both of N.Y.; Hartmut R. Schwermer, Stuttgart, Fed. Rep. of Germany; John D. Wilson, Endwell, N.Y.

[73] Assignee: International Business Machines Corporation, Armonk, N.Y.

[21] Appl. No.: 351,181

[22] Filed: May 10, 1989

Related U.S. Application Data

[62] Division of Ser. No. 909,431, Sep. 19, 1986, abandoned.

[51] Int. Cl.⁵ .................. G06F 13/38; G06F 13/10
[52] U.S. Cl. .................................. 395/275; 395/250; 395/500; 364/DIG. 1; 364/260.1; 364/270.5; 364/271
[58] Field of Search ............... 364/200; 395/325, 250, 395/500

[56] References Cited

U.S. PATENT DOCUMENTS 4,442,504  4/1984  Dummermuth ................. 364/900
4,570,220  2/1986  Tetrick et al. ................. 364/200

FOREIGN PATENT DOCUMENTS 8520046  2/1981  European Pat. Off. .
8230549  4/1982  European Pat. Off. .
8511383  9/1985  European Pat. Off. .

OTHER PUBLICATIONS

Communication from EPO, dated Apr. 6, 1991, Application No. 87109388.6, for International Business Machines Search Report, 4 pages, EP87 10 9388.
IBM Technical Disclosure Bulletin, vol. 26, No. 10B, Mar. 1984, Bourke et al., IBM Series/1 Channel Attachment . . .

Primary Examiner—Thomas C. Lee
Attorney, Agent, or Firm—Baker, Maxham, Jester & Meador

[57] ABSTRACT

In a data processing system, an input output bus unit (IOBU) is connected one end of an input output interface controller (IOIC) via an asynchronous bus. The other end of the IOIC is connected to a storage controller (SC) and an input output interface unit (IOIU) via a synchronous bus. The SC and IOIU are connected to a memory unit and an instruction processing unit. The asynchronous bus, which is comprised of three sub-buses and a control bus, conducts signals between the IOIC and an IOBU in an asynchronous handshaking manner. The synchronous bus, which is comprised of two sub-buses and a control bus, conducts signals between the IOIC and the SC/IOIU in an synchronous manner. The IOIC, interconnected between the synchronous bus and asynchronous bus, functions as a buffer between the faster synchronous bus and the slower asynchronous bus. Various operations are performed between an IOBU and the memory unit via the asynchronous bus, IOIC, synchronous bus, message acceptance operation.

13 Claims, 41 Drawing Sheets

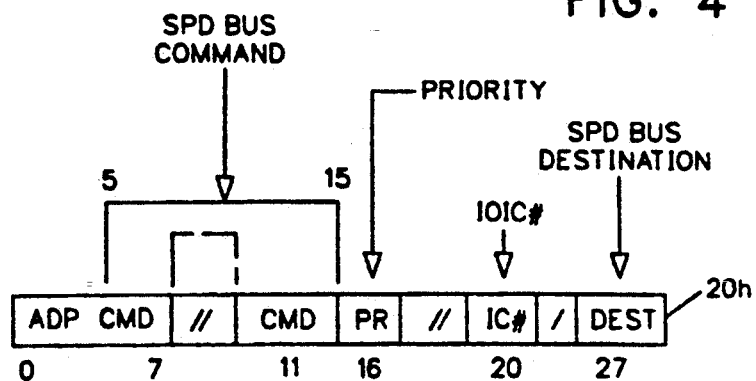
FIG. 4
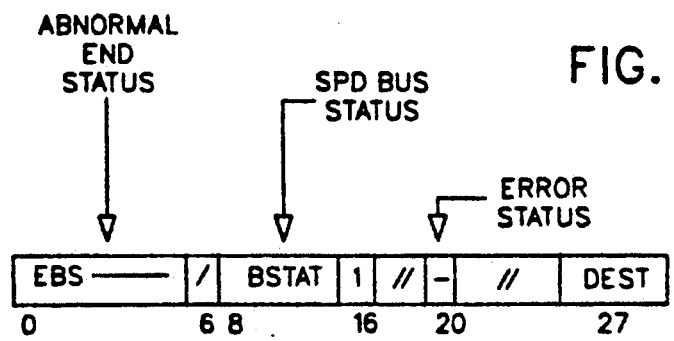
FIG. 5
FIG. 6
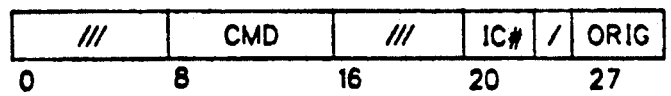

BUFFER WORD ADDRESS
(BINARY)

DATA BUFFER ARRAY

8 X 4 BYTES (FROM FIG. 3,20a)

OPCODE ADDRESS
(BINARY)

| STRG OPCODE | STARTING ADDR |
|---|---|
| (1 BYTE) | UPDATED ADDR |
| | UPDATED ADDR |
| | UPDATED ADDR |

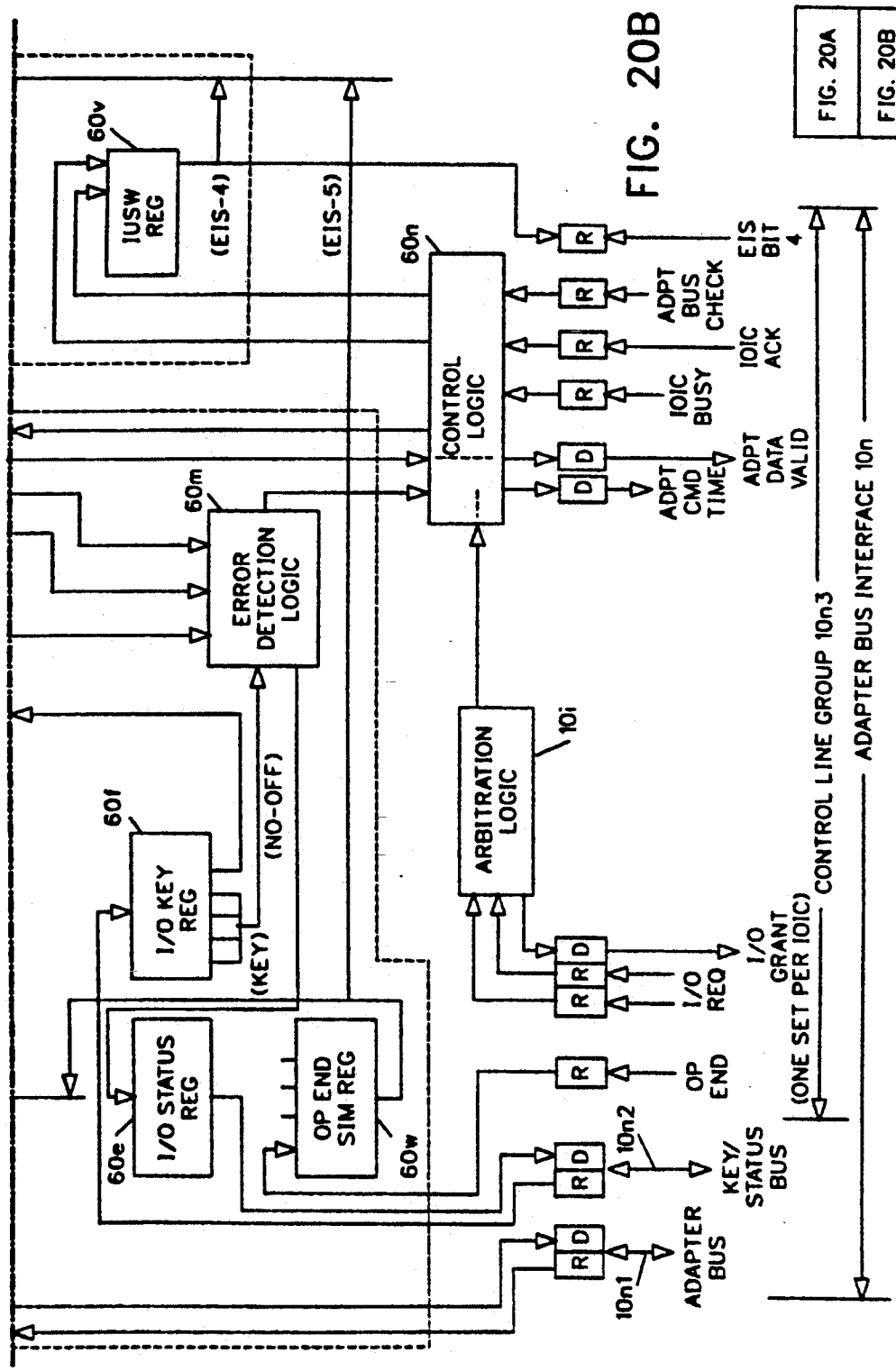

FIG. 21

PBO INSTRUCTIONS DECODED BY THE IOIC

| MNEMONIC | TITLE | ADAPTER COMMAND |
|---|---|---|
| CICCR | COPY ICCR | DC |
| CICSW | COPY ICSW | D9 |
| CMBR1 | COPY MESSAGE BUFFER REG 1 | DE |
| CMBR2 | COPY MESSAGE BUFFER REG 2 | DF |
| CMOSW | COPY MOSW | DA |
| CMSW | COPY MSW | DB |
| LMBR1 | LOAD MESSAGE BUFFER REG 1 | 9E |
| LMBR2 | LOAD MESSAGE BUFFER REG 2 | 9F |
| MMOSW | MOVE MOSW | D8 |
| NBO | NULLIFY BUS OPERATION | 90 |
| RICCR | RESET ICCR UNDER MASK | 9D |
| SICCR | SET ICCR UNDER MASK | 9C |
| RICSW | RESET ICSW UNDER MASK | 99 |
| SMSW | SET MSW | 9B |
| UORD | UNIT OPERATION READ | 94 |
| UORDD | UNIT OPERATION READ, DIRECT | 95 |
| UOWD | UNIT OPERATION WRITE | 96 |
| UOWDD | UNIT OPERATION WRITE, DIRECT | 97 |

FIG. 21A

MEMORY COMMANDS GENERATED BY THE IOIC

```
         ┌──────────── NORMAL = 1              │ DIAGNOSTIC = 0
         │ ┌────────── READ = 1/ WRITE = 0     │ READ = 1 / WRITE = 0
         │ │ ┌──────── BYTE (RMW) = 1 / WORD = 0 │ C1 ..
         │ │ │ ┌────── L1 ...                  │ C2    .
         │ │ │ │ ┌──── L2    ...(LENGTH)       │ C3    ... (CONTROL)
         │ │ │ │ │ ┌── L3   .                  │ C4    .
         │ │ │ │ │ │ ┌─ L4 ...                 │ C5 ..
         │ │ │ │ │ │ │ ┌ RESERVED              │ RESERVED
         0 1 2 3 4 5 6 7
```

| | | | | | | | | | | |
|---|---|---|---|---|---|---|---|---|---|---|
| 1 | 0 | 0 | 0 | 0 | 1 | 0 | − | 84−85 | WRITE 8 BYTES | |
| 1 | 0 | 0 | 0 | 1 | 0 | 0 | − | 88−89 | WRITE 16 BYTES | |
| 1 | 0 | 0 | 0 | 1 | 1 | 0 | − | 8C−8D | WRITE 24 BYTES | |
| 1 | 0 | 0 | 1 | 0 | 0 | 0 | − | 90−91 | WRITE 32 BYTES | |
| 1 | 1 | 0 | 0 | 0 | 0 | 1 | − | C2−C3 | READ 4 BYTES | |
| 1 | 1 | 0 | 0 | 0 | 1 | 0 | − | C4−C5 | READ 8 BYTES | |
| 1 | 1 | 0 | 0 | 1 | 0 | 0 | − | C8−C9 | READ 16 BYTES | |
| 1 | 1 | 0 | 0 | 1 | 1 | 0 | − | CC−CD | READ 24 BYTES | |
| 1 | 1 | 0 | 1 | 0 | 0 | 0 | − | D0−D1 | READ 32 BYTES | |
| 1 | 0 | 1 | 0 | 0 | 1 | 0 | − | A4−A5 | WRITE 1 BYTE | 2 CYCLE RMW |
| 1 | 0 | 1 | 0 | 1 | 0 | 0 | − | A8−A9 | WRITE 2 BYTE | 2 CYCLE RMW |
| 1 | 0 | 1 | 0 | 1 | 1 | 0 | − | AC−AD | WRITE 3 BYTE | 2 CYCLE RMW |
| 1 | 0 | 1 | 1 | 0 | 0 | 0 | − | B0−B1 | WRITE 4 BYTE | 2 CYCLE RMW |
| 1 | 0 | 1 | 1 | 0 | 1 | 0 | − | B4−B5 | WRITE 5 BYTE | 2 CYCLE RMW |
| 1 | 0 | 1 | 1 | 1 | 0 | 0 | − | B8−B9 | WRITE 6 BYTE | 2 CYCLE RMW |
| 1 | 0 | 1 | 1 | 1 | 1 | 0 | − | BC−BC | WRITE 7 BYTE | 2 CYCLE RMW |
| 0 | 0 | 0 | 0 | 1 | 0 | 1 | − | 0A−0B | MESSAGE ACCEPTANCE REQUEST | |

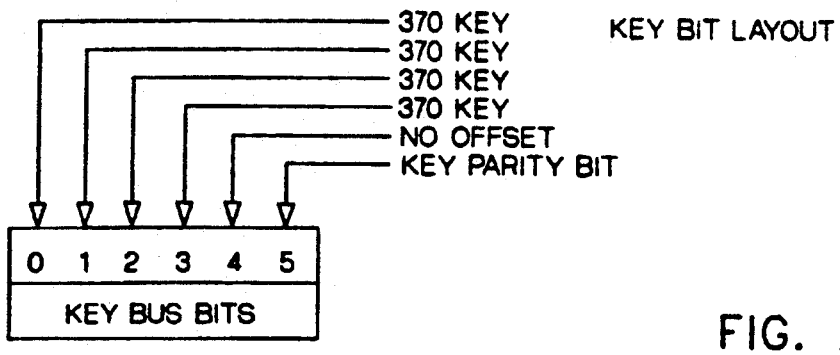
FIG. 22
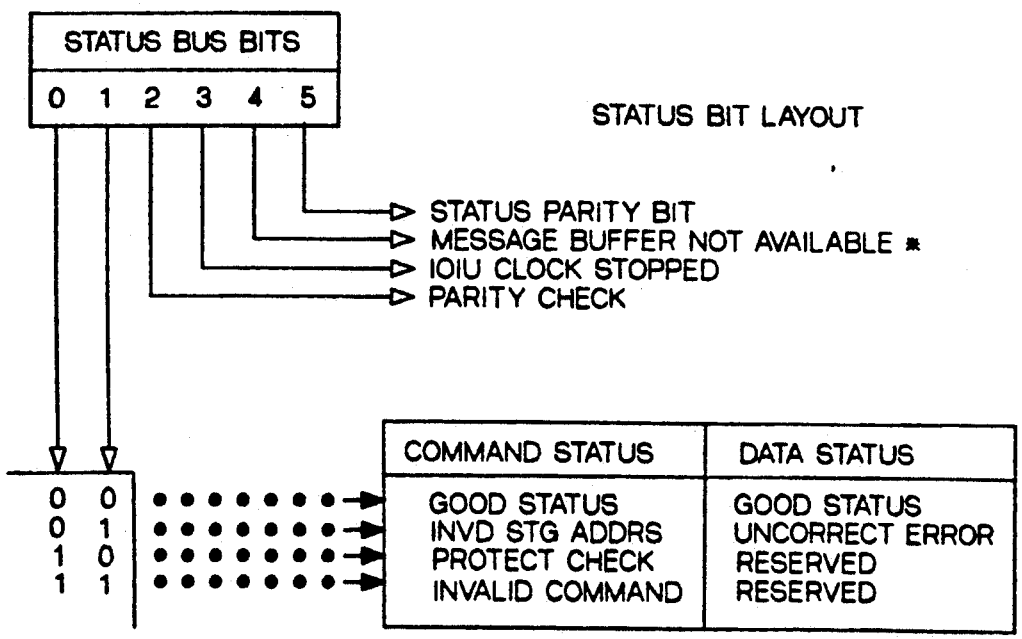
* NOTE: MESSAGE BUFFER NOT AVAILABLE SHOULD ONLY BE SENSED AT COMMAND STATUS TIME OF A MESSAGE ACCEPTANCE. IT HAS NO VALID MEANING AT DATA STATUS TIME.

FIG. 23

SPD STORAGE OPERATION COMMAND SUMMARY

| SPD CODE | COMMAND | BYTE ALIGNED OPERATION | NONE ALIGNED OPERATION |
|---|---|---|---|
| 40 | WRITE 1 BYTE | RMW CMD=A4 | RMW CMD=A4 |
| 43 | WRITE 4 BYTES | RMW CMD=B0 | RMW, RMW |
| 47 | WRITE 8 BYTES | WRT 8 CMD=C4 | RMW, RMW |
| 4F | WRITE 16 BYTES | WRT16 CMD=88 | RMW, WRT, RMW |
| 5F | WRITE 32 BYTES | WRT32 CMD=90 | ERROR |
| 00 | READ 1 BYTE | RD 4 CMD=C2 | RD 4 CMD=C2 |
| 03 | READ 4 BYTES | RD 4 CMD=C2 | RD 8, 16 OR 32 |
| 07 | READ 8 BYTES | RD 8 CMD=C4 | RD16 OR 32 |
| 0F | READ 16 BYTES | RD16 CMD=C8 | RD32 CMD=D0 |
| 1F | READ 36 BYTES | RD32 CMD=D0 | ERROR |

FIG. 24

SPD UNIT OPERATION COMMAND SUMMARY

| CODE | COMMAND | BUS OPER. | IOBU | BCU |
|---|---|---|---|---|
| F0 | WRITE ADDRESS - D | UNWRD | R | S |
| F2 | ENABLE - D | UNWRD | R | S |
| F3 | DISABLE - D | UNWRD | R | S |
| FE | INTERFACE RESET - D | UNWRD | R | S |
| FF | UNIT RESET - D | UNWRD | R | S |
| B0 | READ ADDRESS - D | UNRDD | R | S |
| B1 | READ IMMEDIATE STATUS - D | UNRDD | R | S |
| C0 | NORMAL MESSAGE COMMUNICATION | UNWR | X | X |
| C1 | UNASSIGNED | UNWR | X | X |
| CX | UNASSIGNED | UNWR | X | X |
| CX | UNASSIGNED | UNWR | X | X |
| CX | UNASSIGNED | UNWR | X | X |
| CD | UNASSIGNED | UNWR | X | X |
| CE | MAINTENANCE, SERVICE, & DIAG | UNWR | X | X |
| CF | INITIALIQATION & IPL | UNWR | X | X |
| D4 | SUSPEND REQUEST | UNWR | X | X |
| D6 | ADDRESS REQUEST | UNWR | S | R |
| D7 | RESUME | UNWR | X | X |
| 91 | READ IMMEDIATE STATUS | UNRD | X | X |
| 9F | READ WRAP | UNRD | X | X |

NOTE: S=SEND ONLY; R=RECEIVE ONLY; X=SEND OR RECEIVE

FIG. 25

| P | 0 | 1 | 2 | 3 | 4 | 5 | 6 | 7 |
|---|---|---|---|---|---|---|---|---|
| C/S BUS COMMAND BITS ||||||||||

STORAGE COMMAND

- 0  0 - STORAGE SEQUENCE
- 1  0 - READ
    1
- 2-7  BYTE COUNE. THE NUMBER OF BYTES TRANSFERRED IS EQUAL THE BYTE COUNT PLUS ONE.

UNIT OPERATION COMMAND

- 0  1 - UNIT OPERATION
- 1  0 - READ
    1 - WRITE
- 2  0 - ADDRESS SELECT
    1 - DIRECT SELECT
- 3-7  UNIT OPERATION COMMAND

FIG. 26

| P | 0 | 1 | 2 | 3 | 4 | 5 | 6 | 7 |
|---|---|---|---|---|---|---|---|---|
| C/S BUS STATUS BITS ||||||||||

STORAGE STATUS

- 0  DATA END
- 1  INVALID COMMAND
- 2  INVALID ADDRESS
- 3  UNIT CHECK
- 4  NOT READY
- 5  LINE LENGTH ERROR
- 6  PROTECTION VIOLATION
- 7  UNIT SPECIFIC

UNIT OPERATION STATUS

- 0  DATA END
- 1  INVALID COMMAND
- 2  BUFFER NOT AVAILABLE
- 3  UNIT CHECK
- 4  NOT READY
- 5  RESERVED
- 6  UNIT SPECIFIC
- 7  UNIT SPECIFIC

FIG. 26A

| LEGEND |
|---|
| OA = MESSAGE ACCEPTANCE COMMAND CODE<br>CM = COMMAND/ADDRESS<br>GP = ANY DATA WITH GOOD PARITY<br>KY = KEY DATA CYCLE<br>PC = IOIC PBO COMMAND<br>R1 = 1ST WORD TRANSFERRED ON READ<br>R2 = 2ND WORD TRANSFERRED ON READ<br>R3 = 3RD WORD TRANSFERRED ON READ<br>R4 = 4TH WORD TRANSFERRED ON READ<br>R5 = 5TH WORD TRANSFERRED ON READ<br>R6 = 6TH WORD TRANSFERRED ON READ<br>R7 = 7TH WORD TRANSFERRED ON READ<br>R8 = 8TH WORD TRANSFERRED ON READ<br>RS = SOURCE REGISTER INFORMATION<br>RT = TARGET REGISTER INFORMATION<br>W1 = 1ST WORD TRANSFERRED ON WRITE<br>W2 = 2ND WORD TRANSFERRED ON WRITE<br>W3 = 3RD WORD TRANSFERRED ON WRITE<br>W4 = 4TH WORD TRANSFERRED ON WRITE<br>W5 = 5TH WORD TRANSFERRED ON WRITE<br>W6 = 6TH WORD TRANSFERRED ON WRITE<br>W7 = 7TH WORD TRANSFERRED ON WRITE<br>W8 = 8TH WORD TRANSFERRED ON WRITE |

METHOD FOR TRANFERRING INFORMATION BETWEEN MAIN STORE AND INPUT OUTPUT BUS UNITS VIA A SEQUENCE OF ASYNCHRONOUS BUS AND TWO SYNCHRONOUS BUSES

This is a division of application Ser. No. 06/909,431, filed Sep. 19, 1986 now abandoned.

BACKGROUND OF THE INVENTION

The subject matter of this application relates to computer systems, and more particularly, to a new implementation of buses and interface circuits which interface peripherals to storage controllers and main memory. This application describes a new implementation of a slower asynchronous first bus, a faster synchronous second bus, and an interface controller which interconnects and buffers the slower first bus to the faster second bus.

Computer systems include peripheral input output (I/0) equipment which must communicate with an instruction processing unit (IPU) and a main memory. This communication occurs via a bus, interconnecting the IPU and main memory to the peripheral equipment, for transmitting commands, instructions and data from the IPU/main memory to the peripherals and from the peripherals to the IPU/main memory. There are different types of buses. Some are faster, in their operation, than others. If a faster bus were to interface with a slower bus, the faster bus would overrun the slower bus. In addition, the needs of the IPU/main memory are different than the needs of the peripherals. Therefore, a second bus, for transmitting commands, instructions and data from and to the IPU/main memory, must be different than a first bus for transmitting commands, instructions and data from and to the peripherals. Consequently, a need exists for the first bus, for communication with the peripherals, the second bus, for communication with the IPU/main memory, and an interface circuit, interconnecting the two busses, for interfacing and buffering the first bus with the second bus.

SUMMARY OF THE INVENTION

It is a principal object of this invention to set forth a new implementation of the first bus, termed an SPD bus, a new implementation of the second bus, termed an adaptor bus, and a new implementation of an input output interface controller (IOIC) interconnecting and buffering the SPD bus with the adapter bus.

The first bus, hereinafter termed the SPD bus, is an asynchronous bus which functions by way of a "handshaking" arrangement whereby a unit, on one end of the bus, must seek access to the bus, obtain access, search for another unit on the bus by transmitting a command and address, and receive an acknowledgement from the other unit before transmitting data from the one unit to the other unit.

The second bus, hereinafter termed the adapter bus, is a synchronous bus which functions by way of a "clocking" arrangement whereby a unit, on one end of the bus, will transmit commands, data or instructions to another unit, on the other end of the bus, when appropriate clock signals are generated, clocking the commands, data or instructions into the other unit.

However, the clocking arrangement of the adapter bus is inherently faster, in operation, than the handshaking arrangement of the SPD bus. Therefore, a need exists for an input output interface controller (IOIC), interconnecting the adapter bus to the SPD bus, to act as a buffer between the adapter bus and the SPD bus so that the faster adapter bus will not overrun the slower SPD bus. The IOIC must therefore comprise a registers and buffers section for storing commands, instructions, and data, an adapter bus control logic for retrieving the commands, instructions and data from the adapter bus for placement in the registers and buffers section of the IOIC and an SPD bus control logic for retrieval of the commands, instructions and data from the register and buffers section of the IOIC for placement on the SPD bus (and vice versa). Furthermore, since some arbitration scheme must exist for determining who may access the SPD bus, the IOIC must also comprise an arbiter circuit, termed a Bus Control Unit, for determining who shall access the bus.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 4 illustrates the destination select register of the registers and buffers section of FIG. 3;

FIGS. 5 through 9 illustrate the status registers of the registers and buffers section of FIG. 3;

FIG. 19, comprising

FIG. 20, comprising FIGS. 20A and 20B, illustrates the Dataflow of the Storage Controller 10i,10e, 10g of FIG. 1, the Adapter Bus interface 10n, and the Storage Bus interface 10f;

FIG. 21 illustrates a table of valid processor bus operation instructions for the IOIC;

FIG. 21A illustrates IOIC generated memory commands, that is, commands generated from the IOIC to the common storage facility via the adapter bus;

FIG. 22 illustrates the key status (K/S) bus bit layout;

FIG. 23 illustrates a table of SPD bus storage commands;

FIG. 24 illustrates SPD bus unit operation commands;

FIG. 25 illustrates the command status bus command bit layout;

FIG. 26 illustrates the command status bus status bit layout;

FIG. 26a illustrates a legend used in conjunction with FIGS. 27-39;

DESCRIPTION OF THE PREFERRED EMBODIMENT

Figure 1:
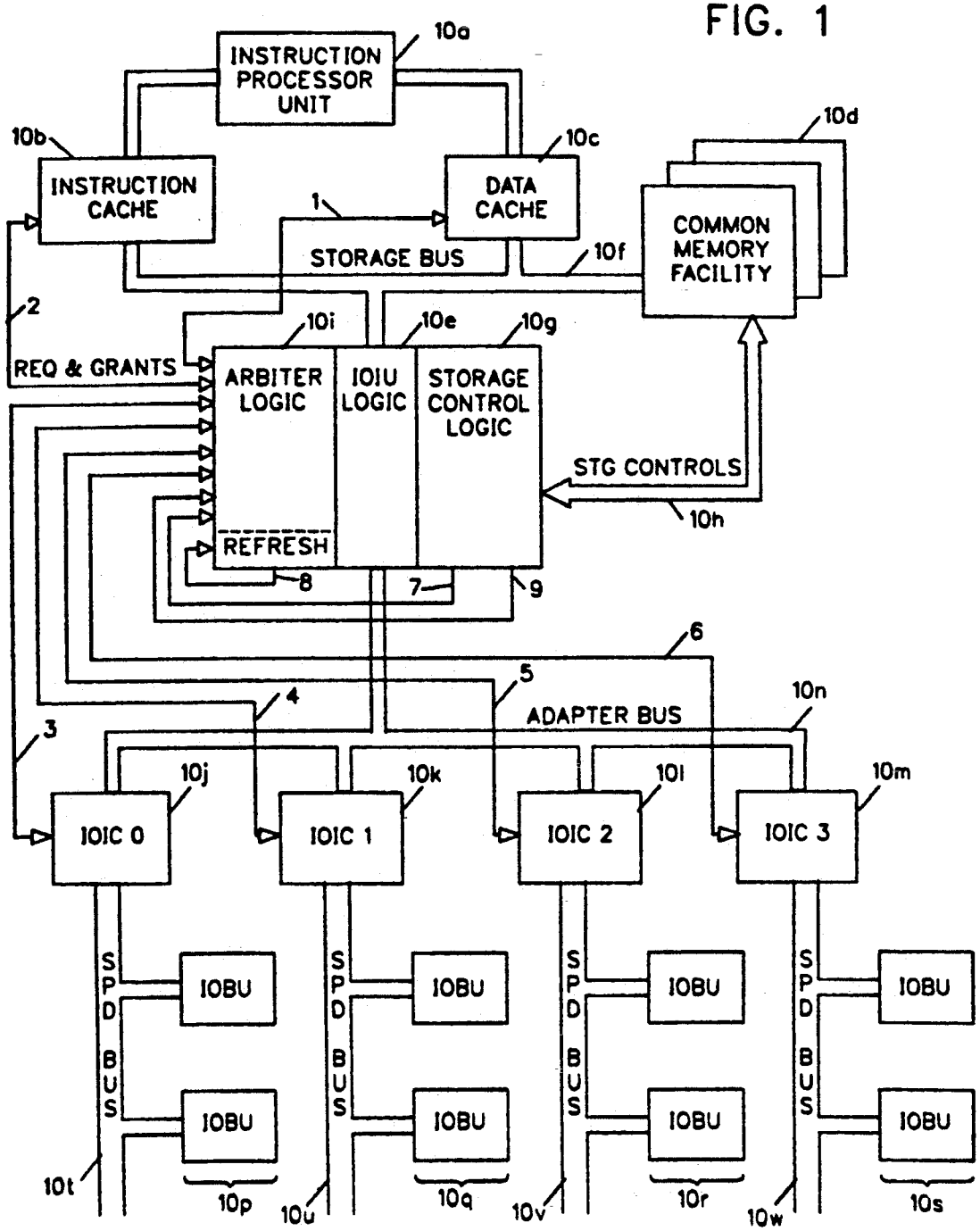
FIG. 1 illustrates a system block diagram of a computer system which incorporates an input output interface controller (IOIC), and a bus, otherwise referred to as an SPD bus, attaching the IOIC to various I/O processors and peripherals.

Referring to FIG. 1, a computer system 10, including an input output interface controller (IOIC) 10j-10m, an adapter bus 10n, and an I/O bus (otherwise termed an SPD bus or SPD I/O bus) 10t-10w is illustrated.

In addition to a discussion of the present invention, the following description may present and discuss areas considered peripheral to that of the present invention. A complete and thorough discussion of these peripheral areas may be found in a technical manual entitled "IBM System/370 Principles of Operation", manual number GA22-7000, which manual is available from IBM Corporation, the disclosure of which is incorporated by reference into the specification of this application.

In FIG. 1, an instruction processor unit 10a is connected to an instruction cache (I-cache) 10b and a data cache (D-cache) 10c. The instruction cache 10b and the data cache 10c are further connected to a common storage facility 10d and to an input/output interface unit logic circuit (IOIU logic) 10e via a storage bus 10f. The storage bus 10f is a 36 bit bi-directional three state bus made up of 4 bytes with parity. A storage control logic circuit 10g is connected to the common storage facility 10d via a control bus 10h and interfaces with the IOIU logic circuit 10e. The control bus 10h comprises ten control or handshake lines which include the following signal lines storage command time, card select, storage buffer time, storage data strobe, storage data valid, storage disable, storage refresh time, input parity error, ECC error, corrected error, and three clocks. The IOIU logic circuit 10e further interfaces with an arbiter logic circuit 10i. Refresh logic 10x is disposed within the arbiter logic circuit 10i. The arbiter logic circuit 10i receives access requests from the instruction cache 10b via line 2 and from the data cache 10c via line 1. The IOIU logic circuit 10e is further connected to an input-/output interface controller 1 (IOIC 1) 10j, to an input-/output interface controller 2 (IOIC 2) 10k, to an input-/output interface controller 3 (IOIC 3) 10L, and to an input/output interface controller 4 (IOIC 4) 10m via an adapter bus 10n. In this implementation, there may be a maximum of 16 IOICs, although, for the sake of clarity and brevity, four IOICs are shown in FIG. 1 The arbiter logic circuit 10i receives access requests from IOIC 1 10j via line 3, from IOIC 2 10k via line 4, from IOIC 3 10L via line 5, and from IOIC 4 10m via line 6. The IOICs 10j, 10k, 10L, and 10m are connected to various input/output (I/O) subunit processors 10p, 10q, 10r, and 10s via I/O buses 10t, 10u, 10v, and 10w, respectively. Hereinafter, an I/O subunit processor 10p-10s will be referred to as an I/O bus unit, or an IOBU and an I/O bus 10t-10w will be referred to as the SPD bus. An SPD bus is capable of handling addressing signals for up to 32 IOBUs. The arbiter logic circuit 10i receives bus adapter access requests from the storage control logic 10g via line 7, an access request from the refresh logic 10x via line 8, and a Processor Bus Operation (PBO) cycle steal (CS) request from the storage control logic 10g via line 9.

The functional operation of the computer system of FIG. 1 will be described in the following paragraphs with reference to FIG. 1.

The instruction processor unit (IPU) 10a executes instructions stored in the instruction cache 10b utilizing data stored in the data cache 10c. The results of the execution of the instructions are stored in the common storage facility 10d. If it is necessary to transfer the results to various ones of the IOBUs 10p, 10q, 10r, and 10s, the results are retrieved from the common storage facility 10d by the storage control logic 10g and are transferred to the adapter bus 10n via the IOIU logic 10e and to the IOBUs 10p through 10s via the IOICs 10j through 10m and the SPD buses 10t through 10w. However, the instruction cache 10b, the data cache 10c, and/or one or more of the IOICs 10j through 10m may require access to the shared buses (storage bus 10f, and the adapter bus 10n) simultaneously. Since the shared buses can handle only one access at a time, some arbitration mechanism must be utilized to determine which unit will access the shared bus at a particular point in time In order to make this determination, a plurality of units needing access, comprising the data cache 10c, the instruction cache 10b, the IOIC 1 10j, the IOIC 2 10k, the IOIC 3 10L, the IOIC 4 10m, the storage control logic 10g and the refresh logic 10x, each generate an access request signal which is directed to the arbiter logic 10i via lines 1 through 9. In accordance with a particular arbitration scheme, the arbiter logic 10i determines which of the plurality of units will access the shared bus.

A complete description of the arbiter logic 10i may be found in a prior pending application serial no. 791,647 filed on Oct. 28, 1985, now U.S. Pat. No. 4,760,515, issued Jul. 26, 1988, assigned to the same assignee as that of the present invention, entitled "an arbitration apparatus for determining priority of access to a shared bus on a rotating priority basis", the disclosure of which is incorporated by reference into the specification of this application.

A complete description of the instruction processing unit 10a of FIG. 1 may be found in a prior pending application Ser. No. 873,731, filed on Jun. 12, 1986, a decendent application (Ser. No. 569,381) of which i now U.S. Pat. No. 5,121,488, issued Jun. 9, 1992, assigned to the same assignee as that of the present invention, entitled "a sequence controller of an instruction processing unit for placing said unit in a ready, go, hold, or cancel state", the disclosure of which is incorporated by reference into the specification of this application.

Figure 2:
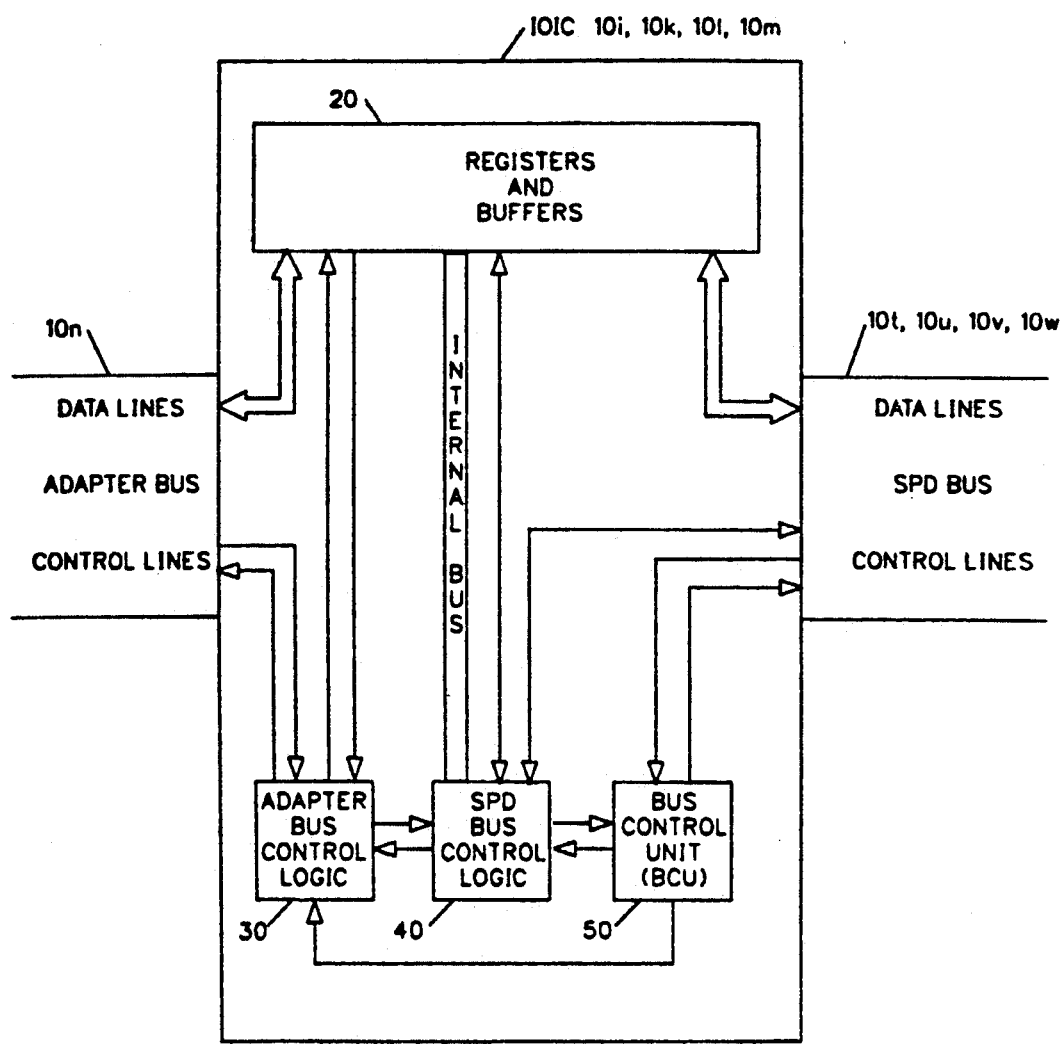
FIG. 2 illustrates a block diagram of the IOIC of FIG. 1, the IOIC including a registers and buffers section, an adapter bus control logic, an SPD bus control logic, and a bus control unit.

Referring to FIG. 2, a block diagram of each IOIC 10j, 10k, 10l, and 10m, is illustrated.

Each IOIC 10j through 10m is interfaced between an adapter bus 10n, which moves data using system clocks (i.e.—it is a synchronous bus), and an I/O bus otherwise termed the SPD bus 10t, 10u, 10v, and 10w, which moves data at a speed determined by the "handshaking" between one of the IOICs 10j, 10k, 10l, and 10m and an I/O bus unit (IOBU), one of IOBUs 10p, 10q, 10r, and 10s (i.e.—it is an asynchronous bus). Because of the difference between the data speeds of the adapter bus 10n and the SPD bus 10t, 10u, 10v, and 10w, the IOIC 10j through 10m must buffer all received data and control information in the IOIC buffers so that a faster adapter bus 10n will not overrun a slower SPD bus 10t through 10w.

In FIG. 2, an input output interface controller; (IOIC) 10j, 10k, 10l, or 10m is shown as being interposed between the adapter bus 10n on one end and the SPD bus 10t through 10w on the other end. Each of the IOICs 10j through 10m comprise a registers and buffers section 20 connected to the adapter bus 10n and one of the SPD Busses 10t thru 10w; an adapter bus control logic 30 connected to the registers and buffers section 20 and to the adapter bus 10n; an SPD bus control logic 40 connected to the registers and buffers section 20, to the adapter bus control logic 30, and to one of the SPD buses 10t through 10w; and a bus control unit (BCU) 50 connected to the SPD bus control logic 40, to the adapter bus control logic 30, and to one of the SPD buses 10t, 10u, 10v and 10w.

The registers and buffers section 20 of the IOIC include registers and buffers. The registers are used to hold data from both the IOIU 10e and the I/O bus units (IOBU) 10p through 10s. In addition to holding the data, the IOIC registers use this data to generate commands and hold status information associated with the IOIC operation. The IOIC buffers are used to hold data originating from the SPD bus 10t through 10w or the adapter bus 10n; however, in contrast with the IOIC registers, the IOIC buffers function solely to hold this data until it can be passed on from one bus to the other. In general, the IOIC registers and buffers 20 are used to hold all the information needed by the IOIC to transfer data from the adapter bus 10n to the SPD bus 10t–10w or from the SPD bus 10t–10w to the adapter bus 10n. The registers and buffers 20 are controlled by two bus control logic blocks, the adapter bus control logic 30 and the SPD bus control logic 40. The adapter bus control logic 30 and the SPD bus control logic 40 do not interfere with each other, and both can be performing a function simultaneously. They prevent buffers, in the registers and buffers section 20, from being overwritten if they are still being used. Parity is checked and good parity is generated as new data, is set in the buffers so that there will never be bad parity in the buffers which could cause a machine check when reading the buffers after a parity error is detected.

The adapter bus control logic 30 controls all the gating and setting of the registers and buffers with respect to data from and to the adapter bus 10n. It also decodes all the commands that are transmitted from the IPU 10a via the IOIU 10e to the IOIC 10j through 10m and it controls their function or sends the information to the SPD bus control logic 40 if the command is a unit operation. It requests the adapter bus 10n and controls the data to and from the adapter bus for storage operations with respect to the I/O bus units (IOBU) 10p through 10s.

The SPD bus control logic 40 controls all the gating and setting of the registers and buffers 20 with respect to data from and to an SPD bus 10t through 10w. It also decodes all the commands that come from the IOBUs 10p through 10s to the IOIC 10j through 10m and controls their function. In addition, it generates storage operation codes and starting addresses for storage operations to the common storage facility 10d. For message acceptance and storage operations, it sends information to the adapter bus control logic 30 so that data from those operations can be sent to the common storage facility 10d via the adapter bus 10n.

The bus control unit (BCU) 50 of IOIC 10j-10m controls arbitration of the IOBUs 10p through 10s access to the SPD bus 10t through 10w and monitors the functions on the SPD bus. The BCU 50 includes a programmable timer. If the SPD bus operation takes too long, or hangs, the operation will timeout so that the SPD bus can recover. Only the BCU 50 can originate Direct Selection operations on the SPD bus 10t through 10w. Because an IOIC 10j through 10m contains the BCU 50, its address will always be "00" on the respective SPD bus 10t through 10w.

The broad functional operation of the IOIC 10j-10m, the adapter bus 10n and the SPD bus 10t-10w, will be described in the following paragraphs with reference to FIG. 2 of the drawings.

Let us assume that commands and/or data shall be transmitted from the main memory or common storage facility 10d to one of the IOBUs 10p-10s. The IOIU 10e relays the data for transmission to an IOIC. Since the adapter bus 10n is a synchronous bus (one whereby data is transmitted when properly clocked into a second unit from a first unit), the data in the IOIU 10e is clocked into the registers and buffers section 20 of the IOIC via the adapter bus. The adapter bus control logic 30 controls the retrieval of the data from the adapter bus 10n and the subsequent storage of the data into the registers and buffers section 20. The adapter bus control logic 30 notifies the spd bus control logic 40 when the buffer is full. In response, the spd bus control logic 40 notifies the bus control unit (BCU) 50. Since the BCU 50 is the arbiter for use of and access to the SPD bus 10t-10w, the BCU 50 determines when the spd bus control logic 40 may have access to the SPD bus after the spd bus control logic 40 requests the bus. When the BCU 50 determines that there is no other IOBU 10p-10s having a higher priority for access to the SPD bus, the BCU 50 transmits an acknowledge bus (ACKB) signal to the spd bus control logic 40 giving the logic 40 the next access to the SPD bus 10t–10w. However, the spd bus control logic 40 cannot proceed until it receives a bus grant (BUSG) signal from BCU 50. When the spd bus control logic 40 is given access to the SPD bus, by receiving a bus grant (BUSG) signal from the BCU 50, it controls the registers and buffers section 20 to place the data stored therein onto the SPD bus.

However, since the SPD bus is an asynchronous bus, the spd bus control circuit 40 does not place data on the SPD bus via a clocking arrangement, rather, it places data on the SPD bus via a "handshaking" arrangement. The "handshaking" arrangement is described in the following paragraph.

The "handshaking" arrangement is essentially a master/slave relationship, wherein the IOIC may be the master and an IOBU may be a slave, or the IOBU may be the master and the IOIC may be the slave. When the IOIC is attempting to place data on the SPD bus for the purpose of transmitting such data to an IOBU, the IOIC is the master and the IOBU is the slave. As will be described in more detail below, the SPD bus 10t–10w comprises an SPD address data (A/D) bus, a command status (C/S) bus and an origin destination (O/D) bus. When the data from the IOIC registers and buffers section 20 is placed onto the SPD bus, via the A/D bus, C/S bus, and O/D bus, three signals are used by the spd bus control logic 40 of the IOIC and by the IOBUs attached to the SPD bus: a master steering (MST) signal, a master select (MSEL) signal, and a ready (RDY) signal. Prior to placement of the data from registers and buffers 20 on the SPD bus, the spd bus control logic 40 generates the MST signal to all IOBUs. The MST signal says: "I have the bus". Therefore, in the above example, the spd bus control logic 40 of the master IOIC transmits the MST signal to the arbiter in the BCU 50 for the purpose of informing the BCU that the master IOIC has access to the SPD bus. The spd bus control logic 40 then controls the placement of the data from the registers and buffers section 20 onto the SPD bus. The spd bus control logic 40 then transmits the MSEL signal to all its IOBUs. The MSEL signal says: "data has been placed on the bus and it is valid". Therefore, in the above example, the spd bus control logic 40 of the master IOIC transmits the MSEL signal to all prospective slave IOBUs attached to its respective SPD bus, for the purpose of informing the IOBUs that the data has been placed on the bus and the data is valid. When a slave IOBU has received the data, the slave IOBU transmits the RDY signal back to the master IOIC, from which the data was transmitted. The RDY signal says: "I have received your data and I have placed my own data on the SPD bus, if needed". Therefore, in the above example, the slave IOBU transmits the RDY signal to the master IOIC for the purpose of informing the master IOIC that the slave IOBU has received the transmitted data and, if necessary, has proceeded to transmit its own data back to the master IOIC. Because the SPD bus is asynchronous, the response from the slave IOBU may be given at any time.

Therefore, after the master IOIC has informed the BCU 50 that it has access to the SPD bus, via the MST signal, the master IOIC "talks" to the slave IOBU via the MSEL signal, indicating the data has been placed on the bus, and the slave IOBU "talks" to the master IOIC via the RDY signal, indicating the data has been received and, if necessary, other data is being returned to the master IOIC.

Figure 2A:
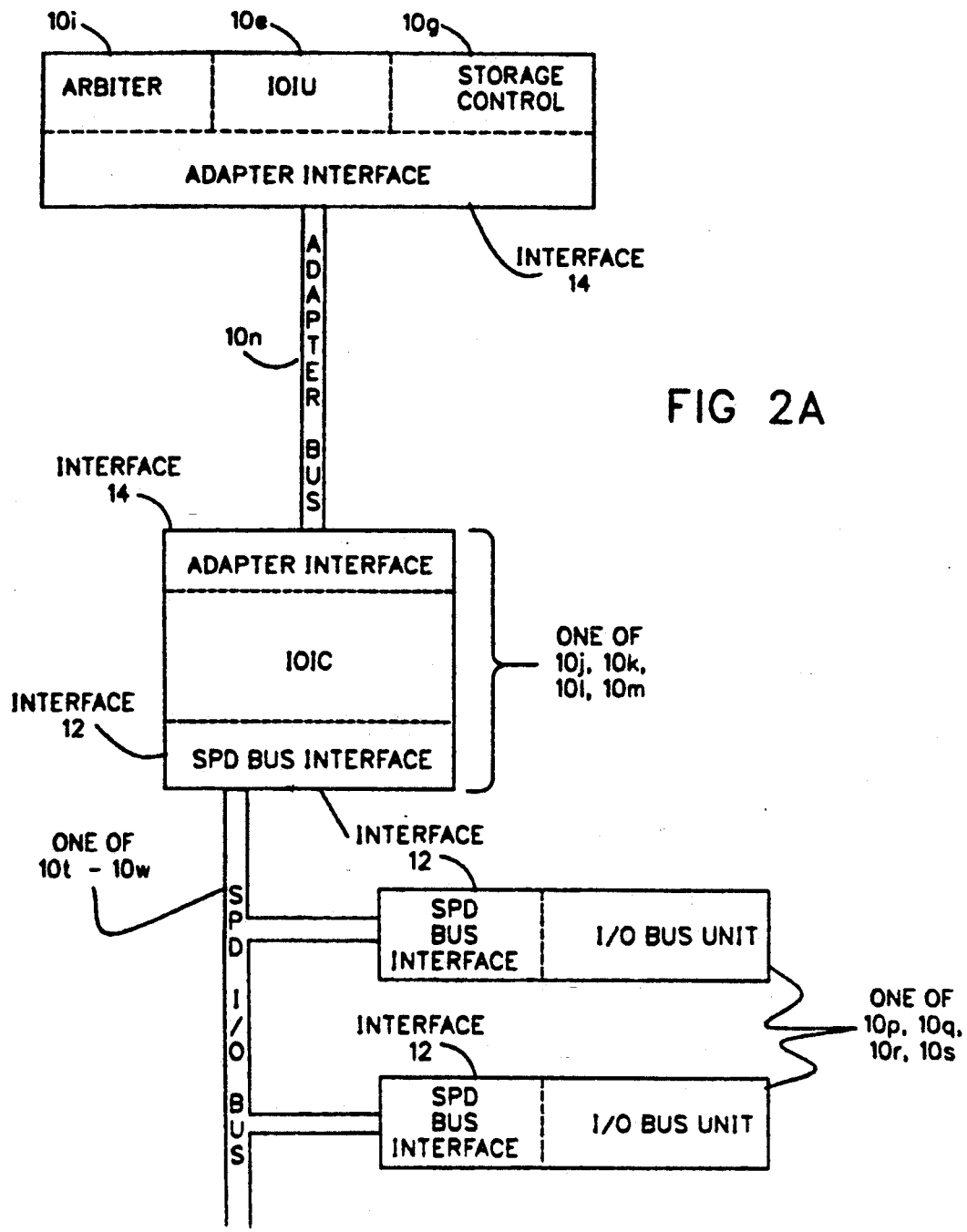
FIG. 2a illustrates a section of FIG. 1 emphasizing an interface section associated with the I/O bus unit (IOBU), the IOIC, and the arbiter logic/IOIU/storage control of FIG. 1.

Referring to FIG. 2a, a section of FIG. 1 is illustrated. In FIG. 2a, a pair of I/O bus units (IOBU), one of 10p–10s, are connected to an input/output interface controller (IOIC), one of 10j–10m, by way of an SPD I/O bus, one of 10t–10w. The IOIC is also connected to the arbiter logic 10i/IOIU 10e/storage control 10g by way of the adaptor bus 10n. Each I/O bus unit 10p–10s includes, as a physical part thereof, an interface section 12 and a main section, the main section being the I/O bus unit minus the interface section 12. The IOIC 10j–10m also includes, as a physical part thereof, an interface section 12, on the SPD bus side, an interface section 14, on the adaptor bus side, and a main section. The main section of the IOIC would include the IOIC minus interface sections 12 and 14. The arbiter logic 10i/IOIU 10e/storage control 10g also incorporates an interface section 14 and a main section, the main section consisting of the arbiter 10i, IOIU 10e, and storage control 10g minus interface section 14.

In FIG. 2a, since the SPD I/O bus 10t–10w must interface with both the IOIC 10j–10m and the I/O bus units 10p–10s, the interface sections 12 associated with the the IOIC and the I/O bus units must be identical to each other. In addition, the interface sections 12 associated with the IOIC and the I/O bus units must be be identical, in structure and function, to the structure and function of the SPD I/O bus. Similarly, the interface sections 14 associated with the IOIC and the arbiter 10i/IOIU 10e/storage control 10g must be identical to each other and must be identical, in structure and function, to the structure and function of the adaptor bus 10n.

The structure and function of the adaptor bus 10n and the SPD I/O bus 10t–10w will be set forth in detail in the following paragraphs.

DETAILED DESCRIPTION OF THE PREFERRED EMBODIMENT

The information contained the following paragraphs will describe in detail (i) the construction and function of the input output interface controller (IOIC), (ii) the construction and function of the storage controller which includes arbiter logic 10i, IOIU logic 10e, and storage control logic 10g, (iii) the construction and functional characteristics of the adapter bus 10n, (iv) the construction and functional characteristics of the SPD I/O bus 10t–10w; and (v) a functional description of the SPD bus 10t–10w, IOIC, adaptor bus 10n, and Storage Controller 10e, 10g operating in combination while performing a variety of specific functional operations.

(i) Input Output Interface Controller (IOIC) 10j–10m

Figure 3:
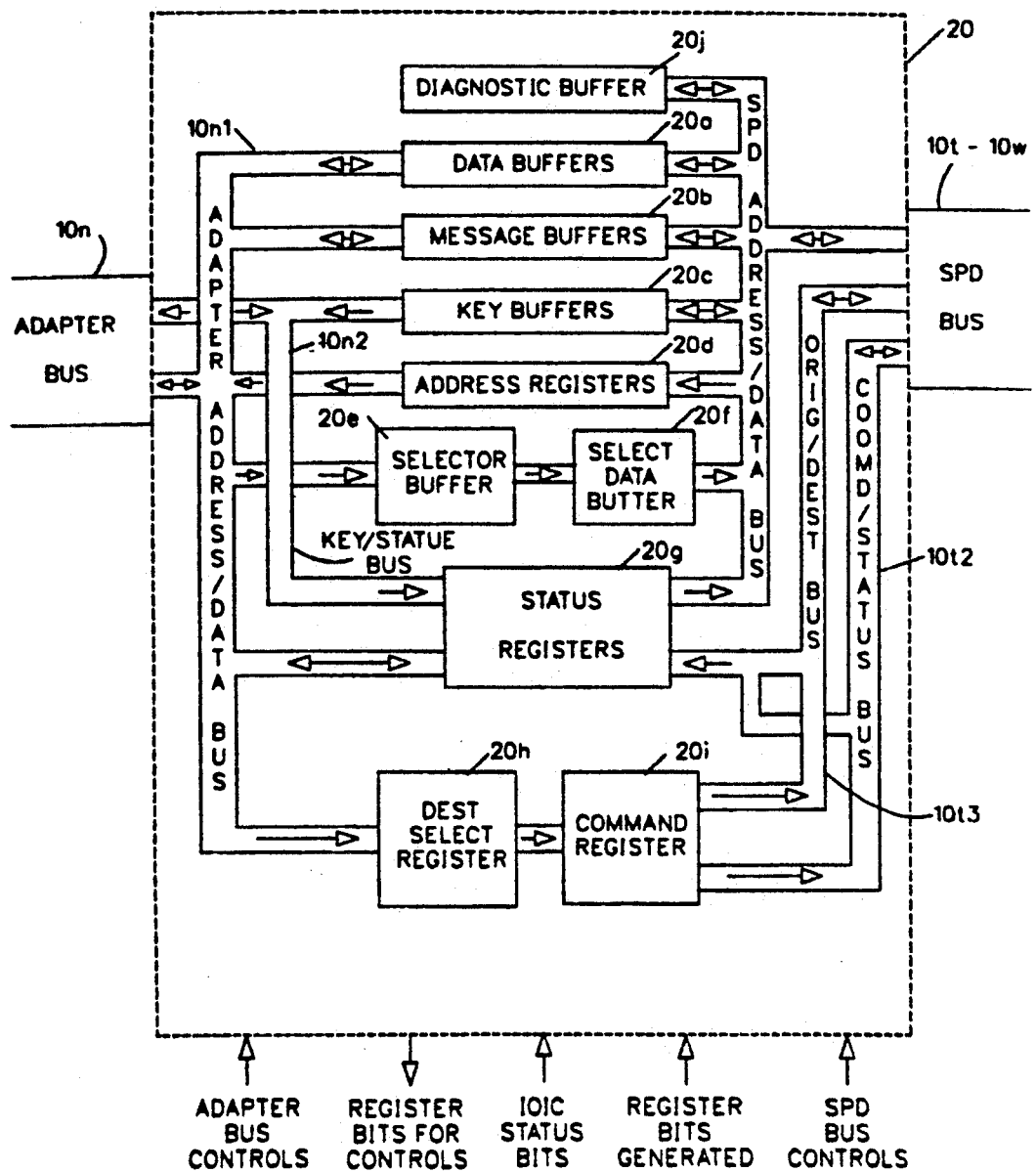
FIG. 3 illustrates the registers and buffers section of the IOIC of FIG. 2, which section includes a destination select register and status registers.

Referring to FIG. 3, a block diagram of the registers and buffers section 20 of FIG. 2 is illustrated.

In FIG. 3, the registers and buffers section 20 comprises data buffers 20a connected to the adapter bus 10n via an adapter address data (A/D) bus 10n1 and to the SPD bus 10t–10w via an spd address data (A/D) bus 10t1; message buffers 20b connected to the adapter bus 10n via the adapter address data (A/D) bus 10n1 and to the SPD bus 10t–10w via the spd address data (A/D) bus 10t1; a key buffer 20c connected to the adapter bus 10n via a key status (K/S) bus 10n2 and to the SPD bus 10t–10w via the spd address data (A/D) bus 10t1; address registers 20d connected to the adapter bus 10n via the adapter address data (A/D) bus 10n1 and to the SPD bus 10t–10w via the spd address data (A/D) bus 10t1; a selector buffer 20e connected to the adapter bus 10n via the adapter address data (A/D) bus 10n1; a select data buffer 20f connected to the selector buffer 20e and to the SPD bus 10t-10w via the spd address data (A/D) bus 10t1; status registers 20g connected to the adapter bus 10n via the adapter address data (A/D) bus 10n1 and the key status (K/S) bus 10n2 and to the SPD bus 10t-10w via the spd address data (A/D) bus 10tl, an orig dest (O/D) bus (origin destination bus) 10t3, and a comd status (C/S) bus (command status bus) 10t2; a dest select register 20h (destination select register) connected to the adapter bus 10n via the adapter address data (A/D) bus 10nl; a command register 20i connected to the dest select register 20h and to the SPD bus 10t-10w and the status registers 20g via the orig dest (O/D) bus 10t3 and to the SPD bus 10t-10w and the status registers 20g via the comd status (C/S) bus 10t2; and a diagnostic buffer 20j connected to the spd address data (A/D) bus 10t1. Hereinafter, the spd address data bus 10t1 will be referred to as the spd A/D bus 10t1, origin destination bus 10t3 as the O/D bus 10t3, command status bus 10t2 as the C/S bus 10t2, adapter address data bus 10n2 as the adapter A/D bus 10n1, and key status bus 10n2 as the K/S bus 10n2. Generally speaking, the buffers 20a, 20b, 20c, 20e, 20f and 20j function solely to store data temporarily as the data is transmitted from the SPD bus 10t-10w to the adapter bus 10n or vice-versa. Buffers 20e, 20f functions solely to receive data from the Adapter bus and and transmit the data to the SPD bus; buffer 20j receives and sends data from/to the SPD bus only. The buffers do not alter or otherwise change the data while being stored therein.

The data buffers 20a are eight data buffers which are each four bytes wide. According to this implementation, the data buffers 20a can buffer up to thirty two bytes of data, with parity, when the IOIC is doing storage operations. However, an additional 32 bytes of data could be buffered if one so desired. The data buffers 20a are used when the IOIC is a slave for storage and message acceptance operations. The data path to and from the data buffers is four bytes wide and the data must be byte aligned by the IOBUs 10p-10s before being sent to the data buffers of the IOIC.

The message buffers 20b comprise two message buffers, message buffer 1 and message buffer 2, each being capable of buffering four bytes of data with parity. The message buffers 20b are used when the IOIC is master for unit operations. The data path to and from the message buffers is four bytes wide and the information in the message buffers is the data on the spd address data (A/D) bus 10t1 during the two data cycles of a unit operation. There are four processor bus operation (PBO) commands associated with the message buffers. They are load message buffer reg 1 (LMBR1), load message buffer reg 2 (LMBR2), copy message buffer reg 1 (CMBR1), and copy message buffer reg 2 (CMBR2). The load instructions are not performed when a Message Origination Status Word (MOSW) busy bit is on; instead, IOIC BUSY is returned to the adapter bus.

The key buffer 20c is five (5) bits wide, with parity, and is used to buffer the first five (5) bits of the spd address data bus during a select cycle when the IOIC 10j-10m is a slave. This data is sent to the IOIU 10e, for storage protection and message acceptable buffer selection, via the key status bus portion of the adapter bus 10n following receipt of a grant to access the adapter bus 10n.

The selector buffer 20e is four bytes wide, with parity, and is used to buffer the data from the RS register of the IPU 10a, which is the data on the adapter address data (A/D) bus 10n1 following the command time cycle of a processor bus operation (PBO) command. The selector buffer 20e is set in each IOIC 10j-10m following the command time cycle.

The select data buffer 20f is four bytes wide, with parity, and is set with the data from the selector buffer 20e when the IOIC address matches the destination select address presented on the Adapter Bus at Adapter Command Time and the IOIC is not busy. The data from the buffer is placed on the spd address data bus during the select cycle when the IOIC 10j-10m is master for a unit operation.

The diagnostic buffer 20j is four bytes wide, with parity, and is set with the data from the spd A/D Bus 10t1 during a Select Cycle when doing SPD Read Wrap commands and the IOIC is the slave. During the two data cycles of this command the contents of the diagnostic buffer are driven to the A/D Bus by the IOIC.

The definitions of a select cycle, a data cycle, and read wrap commands will become apparent from a reading of the remaining portion of this detailed description.

The registers 20d, 20g, 20h, and 20i are loaded with data from the buses 10n and 10t-10w, the data being used by the IOIC 10j-10m to perform its operation. The data in the registers is passed on to one or the other of the buses 10n, 10t-10w, but the IOIC 10j-10m may alter the data before it is passed to the respective bus.

Referring to FIG. 4, a sketch of the fields associated with the dest select register 20h is illustrated. The dest select (destination select) register 20h is four bytes wide, with parity. It is used to buffer the adapter command, spd command, IOIC number, priority, and spd destination address. This is the data on the adapter address data (A/D) bus 10n1 during the command time cycle of a processor bus operation (PBO) instruction. The destination select register 20h is set by each IOIC during command time cycle. The IOIC checks this data to see if there is an address match and determines the type of command.

Referring to FIG. 3, the command register 20i is four bytes wide, with parity, and is set with the data from the dest select register 20h when the IOIC address matches and the IOIC is not busy. The data for the spd command status (C/S) bus 10t2 and the spd orig dest (O/D) bus 10t3 during the select cycle comes from this register when the IOIC is master for a unit operation.

The address registers 20d include four address registers which are each four bytes wide They are used to store a maximum of four memory commands and addresses. The first address register is set with the data on the spd address data (A/D) bus 10t1 during the select cycle when the IOIC is a slave. Next, the SPD bus control logic 40 looks at the SPD bus command and byte three of the address register. If the command is a storage command, it generates a memory command which it then puts in byte zero of the first address register. If, due to boundary restrictions, the first memory command cannot store all of the data in the data buffers, then, the SPD bus control logic 40 generates a new memory command and address and puts it in bytes zero and three of the next address register. It can take up to four memory commands to store the data buffered in one spd storage operation. Therefore, the SPD bus control logic 40 will generate up to four commands and addresses and put them in the four address registers. The SPD bus control logic 40 will generate one memory command when doing a read, therefore, only the first address register is used during a read. The data in bytes one and two is not changed by the memory command generator.

The status registers 20g comprise a plurality of registers which contain bits that may be set directly by executing an instruction, are the logical OR of other status bits, or are set by the IOIC. Some bits are hardwired and can only be copied. The following numbered paragraphs set forth a description of each of the registers in status registers 20g:

(1) message origination status word (MOSW) register: referring to FIG. 5, the MOSW is illustrated. The MOSW is a thirty-two bit word used by the IOIC to record status pertaining to unit operations initiated by the IOIC. The unit operations use MOSW to indicate busy, error and operation end status. When the IOIC accepts a unit operation, it resets the operation end (E) bit, bstatus (BSTAT) data end bit and the destination (DEST) field of the MOSW while setting the busy (b) bit of the MOSW. The status summary (S) is the logical OR of all the error bits in the MOSW. When both the E and the S bits are one (1), an operation end interrupt (EIS(5)) is signaled. The BSTAT is received on the spd comd status (C/S) bus 10t2 at the end of the data cycles, the BSTAT containing the ending status. The DEST is received on the spd orig dest (O/D) bus 10t3 during the data cycles when doing Direct Select Unit operations. There are two PBO commands for reading the MOSW; they are: copy MOSW (CMOSW) and move MOSW (MMOSW) Both instructions read the MOSW but the MMOSW will reset all the other bits after reading the E bit and determining if the E bit is in an on condition (binary 1).

(2) message acceptance status word (MASW) register: referring to FIG. 6, the MASW is illustrated. The MASW is a thirty two bit word used by the IOIC to record status pertaining to message acceptance operations. It is the fourth word stored as part of the message acceptance operation. The MASW contains the CMD field, which represents the comd status bus during the select cycle, the IC number, which is the address of the IOIC, and the ORIG field, which is the bus address of the IOBU 10p-10s originating the message acceptance operation.

Figure 7:
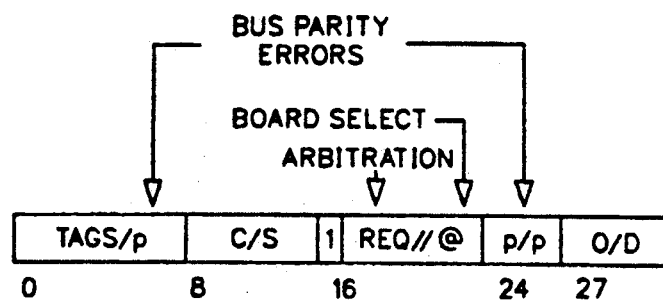

(3) monitor status word (MSW) register referring to FIG. 7, the MSW is illustrated. The MSW is a thirty two bit word required by IOICs that support the BCU 50 function for fault isolation. The contents of the MSW are defined only between the time that it is set and the next SPD bus operation The MSW records the state of the SPD bus 10t-10w at the time it is set. In FIG. 7, the TAGS field contains the state of master select (MSEL), ready, master steering (MST), acknowledge bus and bus grant. The C/S field contains a number representing the comd status bus, and the O/D field contains a number representing the orig dest bus. There are three parity error bits in the MSW which indicate if the comd status (C/S) bus 10t2, the orig dest (O/D) bus 10t3, or the spd address data (A/D) bus 10t1 had a parity error at the time when the MSW was set. The arbitration field contains the state of the request bus and the three request priority lines along with the state of the board select line. The MSW is set as the result of a bus timeout or the execution of the set MSW (SMSW) PBO instruction.

The PBO command for reading the MSW is the copy MSW (CMSW) command.

Figure 8:
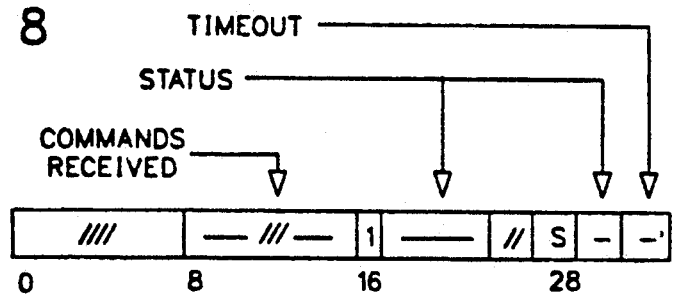

(4) IOIC status word (ICSW) register referring to FIG. 8, the ICSW is illustrated. The ICSW is a thirty-two bit word used by the IOIC to record status pertaining to asynchronous bus events. In FIG. 8, the ICSW includes a commands received field, a status field, and a timeout field. When the IOIC is a bus slave during a unit operation, it 'ORs' a one with the corresponding bits in the Commands Received field for the Resume, Address Request, and Suspend Request commands. The Status field contains bits for Unit Check (for both Unit OP and Storage OP), Storage Error, and Buffer Not Available. The Timeout bits are set when there is a timeout and indicates the type (Idle/Operation) of timeout. The Status Summary (S) bit is the logical 'OR' of all the bits in the ICSW that need to raise an EIS(4) interrupt. There are two PBO commands associated with the ICSW. They are Copy ICSW (CICSW) for reading the word, and Reset ICSW under mask (RICSW) for resetting the bits that can be reset.

Figure 9:
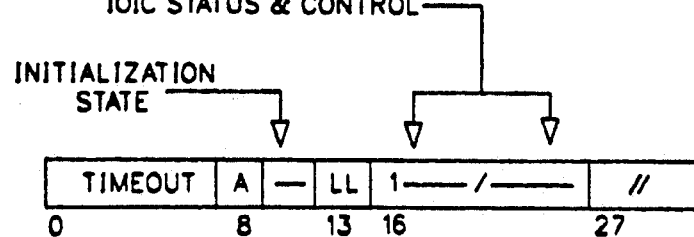

(5) IOIC control register (ICCR) referring to FIG. 9, the ICCR is illustrated. In FIG. 9, the ICCR includes an initialization state field, a timeout field, a line length field, and an IOIC status and control field. The ICCR is a thirty-two bit word used to control IOIC functions and provide status. The ICCR is also used to provide a programming interface for data returned to another IOBU 10p-10s via the Read Immediate Status SPD I/O Bus command. The Timeout field holds the status of the IOIC at the time of a timeout plus three errors that can cause a timeout. The Initialization State and Line Length fields contain data needed by an IOBU when doing a Read Immediate Status to the IOIC. Initialization State bits are set and reset by PBO commands and the line length field is set to thirty-two bytes. The IOIC Status and Control bits field is used by an IOIC to communicate status to the program or to permit programmed control of IOIC functions. The status control bits are Allow Arbitration, Activate Bus Clear, Ready (for both Unit Op and Storage Op), Assigned BCU, and Monitor Clock Disable. There are three PBO commands associated with the ICCR. They are Copy ICCR (CICCR) for reading the word, Set ICCR under mask (SICCR) for setting state and control bits, and Reset ICCR under mask (RICCR) for resetting the bits that can be reset. The set and reset instructions are not performed when the MOSW Busy bit is on and IOIC BUSY is returned to the Adapter Bus.

Figure 10:
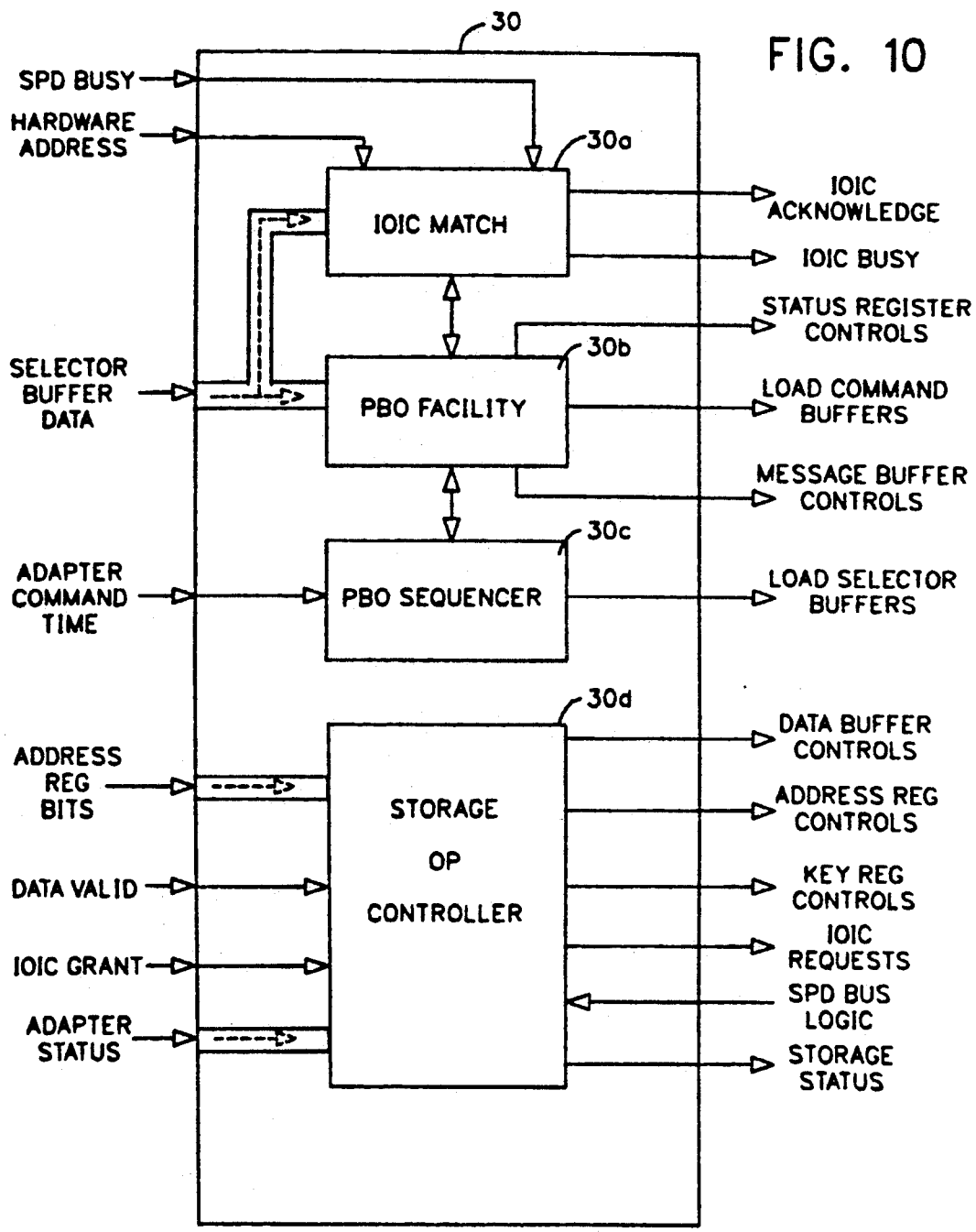
FIG. 10 illustrates the adapter bus control logic of FIG. 2.

Referring to FIG. 10, a block diagram of the adapter bus control logic 30 of FIG. 2 is illustrated.

The Adapter Bus control logic 30 is used to control all the IOIC 10j-10m functions needed for the transfer of data to and from the adapter bus 10n. This includes handling of PBO instructions, keeping track of Adapter Bus cycles for the IOIC, and placing data in or getting data from the correct registers and buffers of the IOIC. It also handles status information from the Key/Status (K/S) Bus 10n2 and puts that status in the Status Registers 20g or sends it to the SPD Bus Control Logic 40 to be put on the comd status (C/S) bus 10t2.

In FIG. 10, the adapter bus control logic 30 comprises an IOIC match logic 30a responsive to an SPD busy signal, to a hardware address signal, and to selector buffer data. It outputs either an IOIC acknowledge signal or an IOIC busy signal; a PBO facility logic 30b connected to the IOIC match logic 30a, responsive to the selector buffer data and generating a status register control signal, a load command buffer signal, and a message buffer control signal; a PBO sequencer 30c connected to the PBO facility, responsive to adapter command time and generating a load selector buffers signal; and a storage op controller 30d receiving address register bits, data valid signal, IOIC grant signal, and adapter status signal and generating a data buffer control signal, an address register control signal, a key register control signal, an IOIC requests signal, an SPD bus logic signal, and a storage status signal.

With regard to the PBO sequencer 30c of FIG. 10, the start of a PBO instruction to an IOIC is signaled by the adapter command time signal from the IOIU 10e of FIG. 1. At this time, in response to the adapter command time signal, the PBO Sequencer 30c, in all the IOIC's 10j-10m, starts/gates the 24 adapter address data bus 10n1 by generating the Load Selector Buffer control signal, the load selector buffer control signal energizing the dest select register 20h of FIG. 3 during the first cycle. During the second cycle the PBO Sequencer 30c gates the Adapter address data Bus 10n1 to the selector buffer 20e of FIG. 3. The PBO Sequencer 30c also keeps track of the cycle of the PBO instruction as it is executed by the PBO Facility logic 30b.

With regard to the IOIC address match logic 30a of FIG. 10, the IOIC# field of the Dest Select register 20h of FIG. 3 contains the address of the IOIC for which the PBO instruction is intended. This address is matched against a hardware address in the IOIC. If there is a match, the IOIC Match logic 30a looks at the Adapter Command field of the Dest Select reg 20h of FIG. 3 for the type of command. The types of commands that the match logic 30a looks for are ones that can be performed at any time and ones that can only be performed when the SPD Bus is not busy. The commands that can be performed at any time will always send the IOIC ACKNOWLEDGE signal back to the IOIU 10e when there is a match. The other commands must determine if the SPD Bus is busy (MOSW Busy Bit) The IOIC ACKNOWLEDGE signal will be transmitted if the SPD bus 10t-10w is not busy and the IOIC BUSY signal will be transmitted if the SPD Bus 10t-10w is busy. The IOIC 10j-10m will not perform or hold the PBO instruction after it sends the IOIC BUSY signal back to the IOIU 10e.

With regard to the PBO facility 30b, the PBO Facility 30b takes the Adapter Command from the DEST SELECT register 20h of FIG. 3 and decodes the PBO instruction. If the PBO Facility 30b decodes a Unit Operation, it will load the command buffers using the Load Command Buffers controls. The process of loading the command buffers involves copying the DEST SELECT REGISTER 20h to the COMMAND REGISTER 20i and copying the SELECTOR BUFFER 20e to the SELECT DATA BUFFER 20f. This is information that the SPD Bus Control Logic 40 will need to complete the operation on the SPD Bus. The PBO Facility 30b will set the MOSW Busy Bit (FIG. 5) so that no other Unit Operations can be accepted until this one has ended. The Unit Operation decode will also send a PBO request to the SPD Arbiter for use of the SPD Bus. The PBO instructions that are not Unit Operations all have to do with the IOIC Registers and Buffers. The PBO Facility logic 30b, using the Status Register 20g and Message Buffer Controls, generates all the controls to gate and set the correct data to or from the Adapter Bus 10n.

With regard to the storage operation controller 30d, the storage commands, including the message acceptance command, are started by requesting the ADAPTER BUS 10n from the IOIU 10e. There are two types of requests made by the Storage Op Controller 30d for access to the Adapter Bus, that is, the command request (IOIC CMD REQ) and the normal request (IOIC REQ). The SPD Bus Control Logic 40 tells the Storage Op Controller 30d when it is time to send the request. After requesting the bus, nothing happens until the IOIC GRANT signal is received from the IOIU 10e, granting the IOIC access to the adapter bus 10n. When the grant is received and validated, the request is dropped and the Storage Op counter starts. The ADDRESS REGISTER CONTROL signal gates the command and address onto the Adapter Address data (A/D) Bus 10n1 and the KEY REGISTER CONTROL signal gates the key onto the key status (K/S) Bus 10n2 during the cycle following the receipt of IOIC GRANT. Looking at the command and address, the DATA BUFFER CONTROL signal moves the data between the DATA BUFFERS 20a and the Adapter Bus 10n using data buffer pointers from the last byte of the address. After moving the data, the storage op controller 30d waits for status on the Key status (K/S) bus 10n2 and checks to see if another storage operation is needed to move the data in the data buffers 20a. If more data needs to be moved, the Storage Op Controller 30d will start a new storage operation with a request for the ADAPTER BUS, via the IOIC REQUESTS signal, and use the command and address in the next Address Register. After all the data has been moved, the Storage Op Controller 30d will give the SPD Bus Control Logic 40 his ending status.

Figure 11:
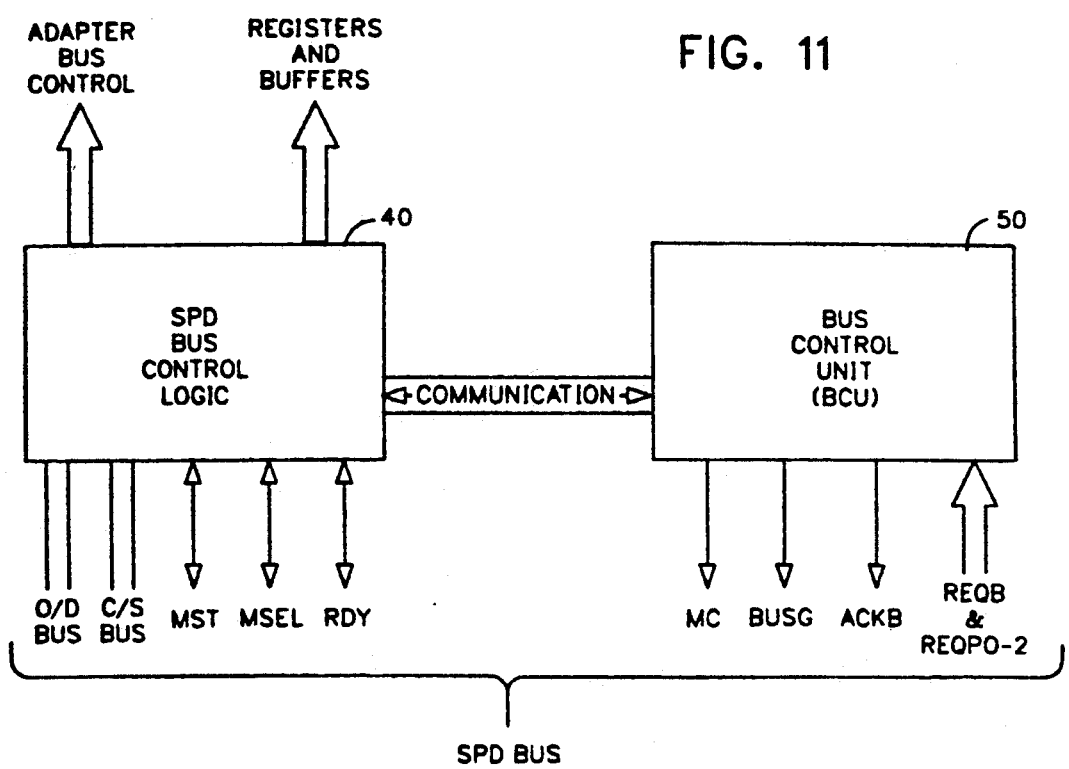
FIG. 11 illustrates the spd bus control logic and the bus control unit of FIG. 2.

Referring to FIG. 11, the SPD bus control logic 40 and the bus control unit (BCU) 50 of FIG. 2 is shown again in FIG. 11.

The SPD Bus Control 40 and Bus Control Unit (BCU) 50 are the IOIC logic controllers for the SPD I/0 Bus, overseeing bus arbitration, processor initiated bus operations and storage transfers. FIG. 11 provides a high-level view of the SPD bus control 40 and the BCU 50 logic. There are two distinct operations that the logic must perform. The SPD Bus Control Logic 40 contains the control unit for IOIC bus functions. This includes handling storage operations, message operations and unit operations. The bus control logic 40 must perform tag handshaking, provide proper bus control signals and data validity indicators to the data flow logic, IOIC Registers and Buffers. In addition to providing controls to the data flow logic (where the A/D Bus drivers physically reside), the bus control logic 40 has direct responsibility for driving and receiving the origin destination (O/D) bus and the command/status interface (C/S) Bus. The Bus Control Unit (BCU) 50 controls bus arbitration (the orderly transfer of control from one bus user to another) and includes several timers which are used to keep track of the time a bus operation is taking to complete. The objective behind the use of the timers is to determine why a bus user has stopped the operation of the SPD bus 10t-10w.

Figure 12:
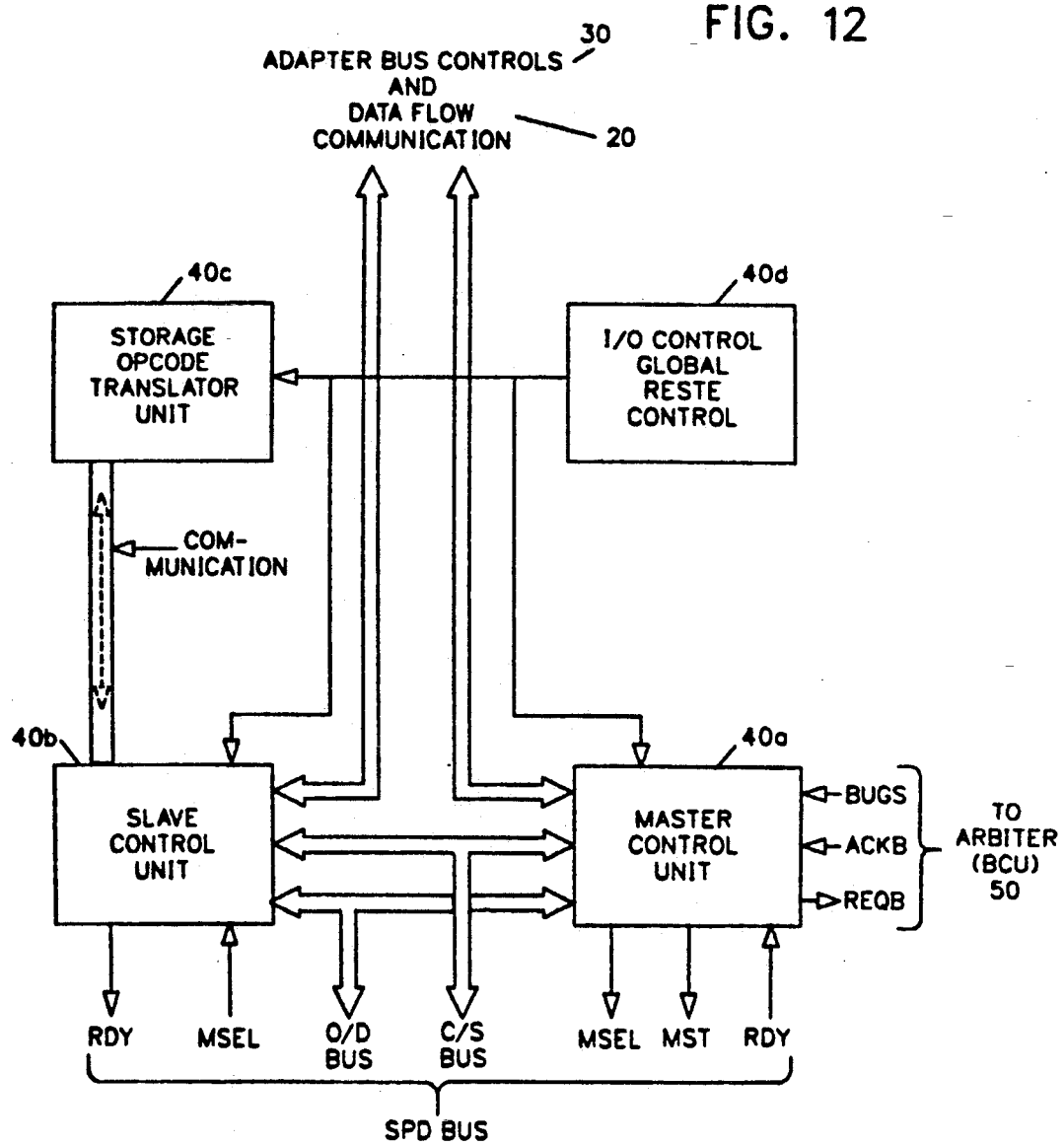
FIG. 12 illustrates further detail of the spd bus control logic of FIG. 2 and 11.

Referring to FIG. 12, a further construction of the SPD bus control logic 40 of FIGS. 2 and 11 is illustrated.

The SPD bus control logic 40 is comprised of four modules a slave control unit 40b, a master control unit 40a, a storage opcode translator 40c and an I/O control global reset control 40d.

The Slave Control Unit 40b provides control when the IOIC is a bus slave. This module generates the ready (RDY) bus tag in response to receiving a Master Select Tag (MSEL) from an I/O Bus Unit (IOBU) on the SPD Bus.

The Master Control Unit 40a provides control when the IOIC is a bus master. It sends the request bus (REQB) signal to the Arbitration Unit (the BCU 50) as if it were an IOBU and thus receives the arbitration lines Bus Grant (BUSG) and Acknowledge Bus (ACKB) When it gains control of the SPD Bus, it drives the Master Select (MSEL) and Master Steering (MST) tag lines and expects to receive the Ready (RDY) tag. To the bus arbiter logic, the master controller 40a looks like any other I/O bus unit (IOBU) In performing its function, the Master Control Unit 40a uses the Selector Buffer 20e of FIG. 3, and message buffer 1 (MBR1)/message buffer 2 (MBR2) associated with message buffers 20b illustrated in FIGS. 3 and 19.

The Storage Opcode Translator unit 40c contains both a hardwired opcode translation unit and a control unit for holding the operands and addresses in the Address Registers in the data flow logic. This unit is necessary because the storage information format on the SPD Bus is incompatible with the memory opcode format in the CPU.

The global reset control 40d brings the IOIC back to an initial ready state after performing an operation or in the event of a bus timeout.

As illustrated in FIG. 12, both the Slave control unit 40b and the Master control unit 40a have communication lines which connect to the Adapter Bus Control Logic 30 and the data flow Registers & Buffers 20 of FIG. 2. They both share a need for the origin/destination (O/D) Bus 10t3 and the command/status (C/S) Bus 10t2 as well. The Storage Opcode Translator unit 40c is a hardware 'assist' for the Slave Control Unit 40b since it is during a slave operation that the opcode translation is required. Therefore control signals exist between these two units when doing a storage operation.

Figure 13:
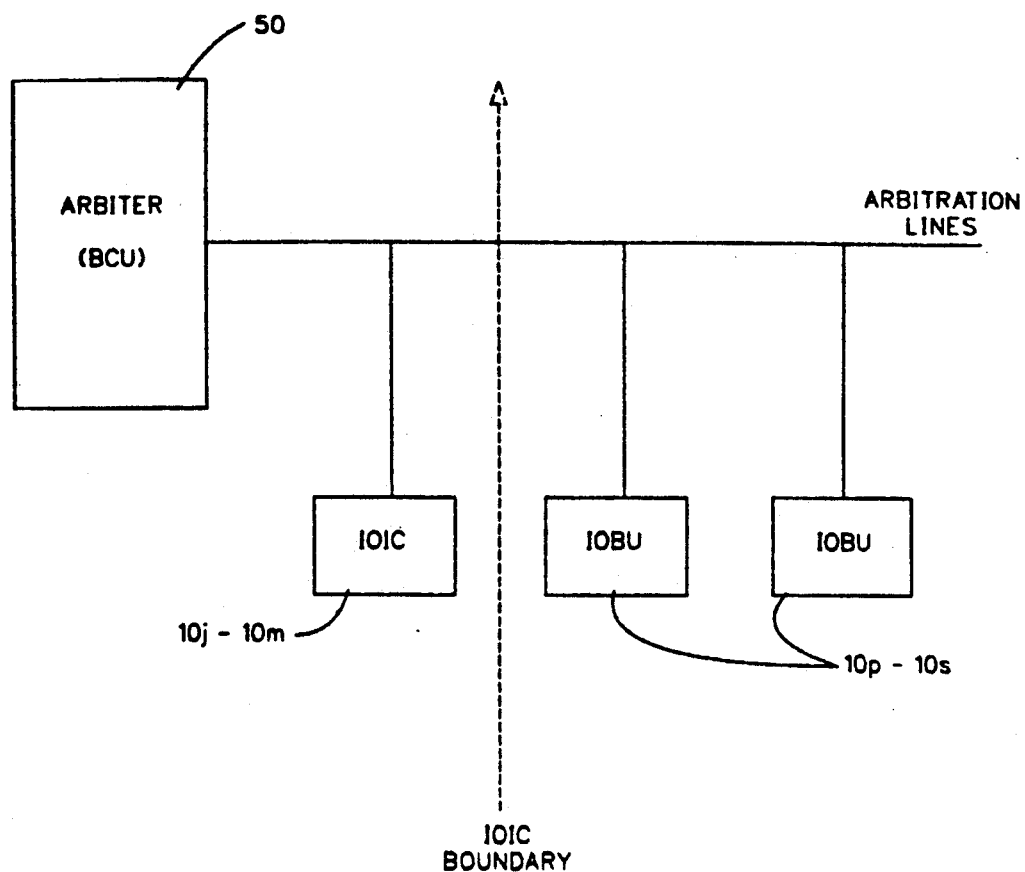
FIG. 13 illustrates another sketch of the bus control unit, IOIC 10j-10m and IOBUs 10p-10s.

Referring to FIG. 13, another sketch of the IOIC 10j-10m, BCU 50, and I/O bus units (IOBU) 10p-10s is illustrated.

In FIG. 13, it is important to realize that, to the BCU 50 (the arbiter for deciding access to the spd bus 10t-10w), the IOIC is viewed as an I/O Bus Unit (IOBU), the IOIC arbitrating for the SPD Bus 10t-10w like any other IOBU, even though, physically, the Bus Arbiter (BCU) is a part of the IOIC.

The Adapter Bus Control logic 30 tells the Master Control unit 40a of the Spd Bus Control Logic 40 to the IOIC. As shown in FIG. 12, the Master Control Unit 40a sets the IOIC's "request SPD Bus" line ON via the "REQB" signal When this line is set, the IOIC arbitrates for use of the SPD Bus like any other IOBU.

Figure 14:
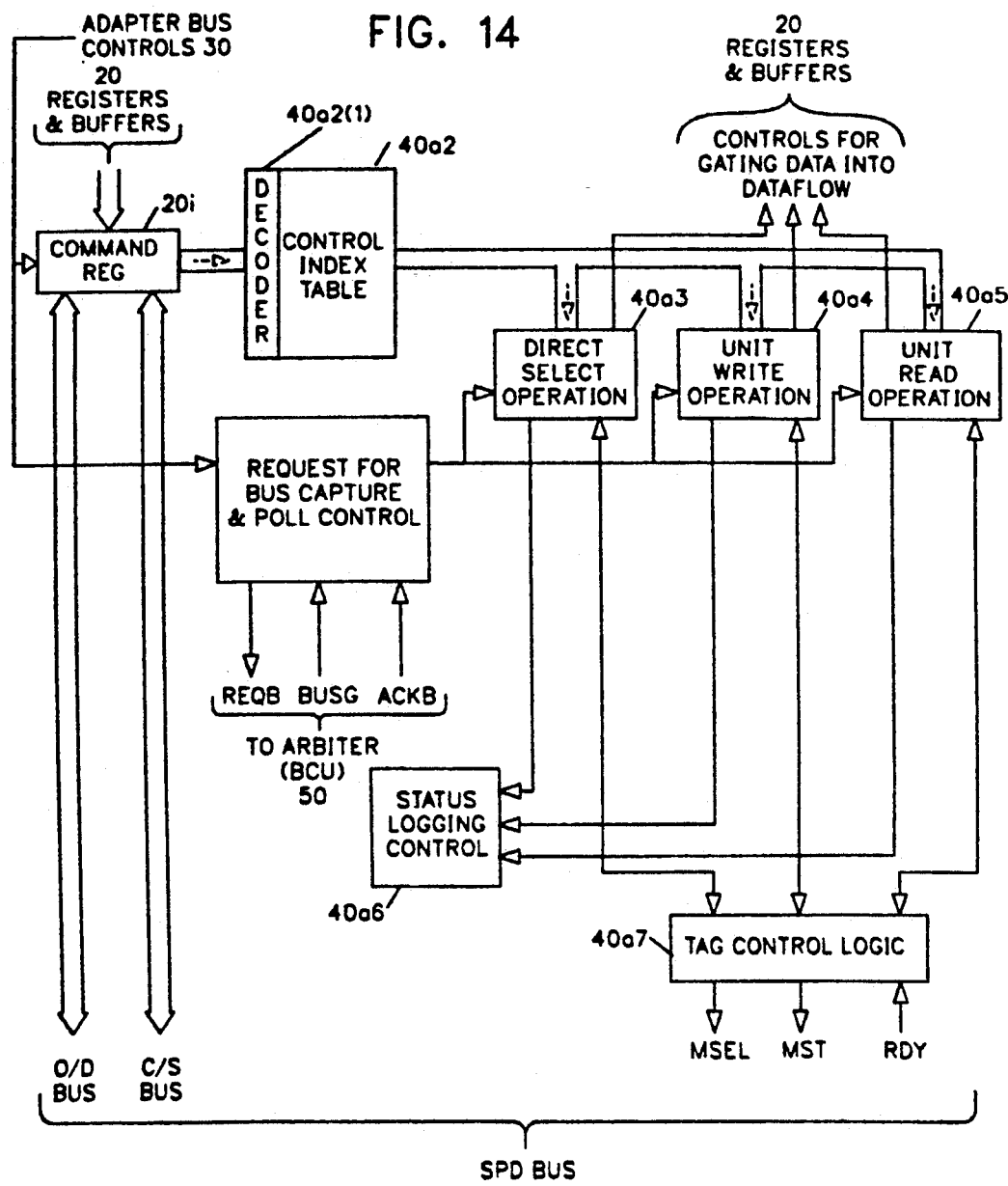
FIG. 14 illustrates a further construction of the master control unit of FIG. 12.

Referring to FIG. 14, a further construction of the master control unit 40a, of FIG. 12, is illustrated.

The master control unit 40a comprises the command register 20i of FIG. 3; the command register 20i is connected to the O/D bus 10t3 and the C/S bus 10t2, and is further connected to a control index table 40a2 with decoder 40a2(1) The control index table 40a2 is connected to direct select operation control logic 40a3, unit write operation control logic 40a4, and unit read operation control logic 40a5. The operation control logic 40a3, 40a4, and 40a5 are each connected to a status logging control 40a6, a tag control logic 40a7, and a request for bus capture and poll control logic 40a8.

In FIG. 14, when the COMMAND REG 20i is loaded, the Control Index Table 40a2, in response thereto, selects either the direct selection operation 40a3, the unit write operation 40a4, or the unit read operation 40a4, representative of the type of operation to be performed, in accordance with the contents of the COMMAND REG 20i. The direct selection operation 40a3 logic (DIRSEL), unit write operation 40a4 logic (UNIT WRITE), and unit read operation 40a5 logic (UNIT READ) each perform a specific type of operation, described in connection with a functional description of the present invention set forth below. This logic also include status indicators which are connected to the STATUS LOGGING CONTROL block 40a6 as well as lines to enable the TAG CONTROL LOGIC 40a7. The tag control logic 40a7 generates the master select (MSEL), master steering (MST), and receives the ready (RDY) signals. The Request for Bus Capture and Poll Control logic 40a8 generates the request bus "REQB" signal, which requests access to the SPD bus 10t-10w, and receives, in response thereto, the acknowledge bus "ACKB" signal, which acknowledges receipt of the REQB signal, and the bus grant "BUSG" signal, which grants to the master control unit 40a access to the SPD bus 10t-10w.

Figure 15:
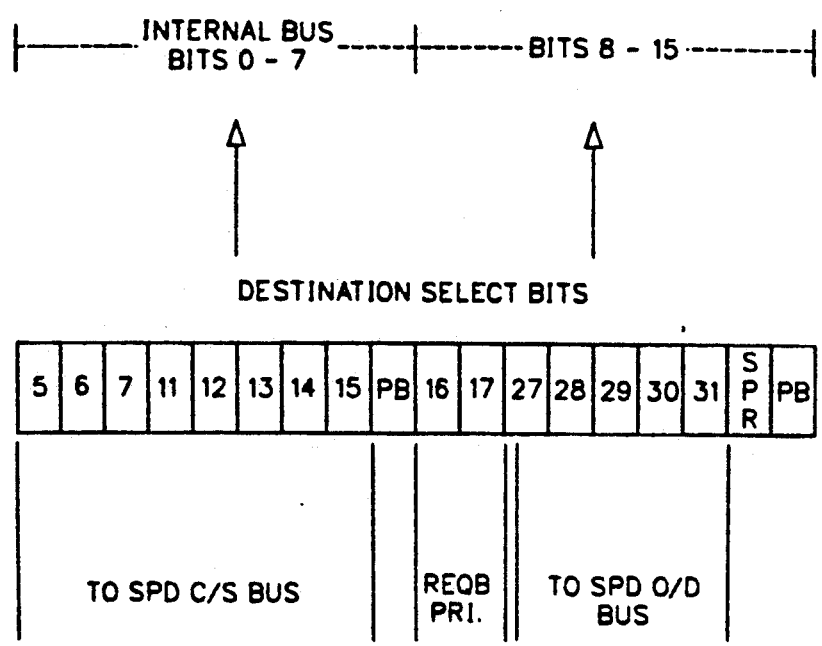
FIG. 15 illustrates a further construction of the destination select register 20h of FIG. 3.

Referring to FIG. 15, a bit layout of the command register 20i of FIGS. 3 and 14 is illustrated.

In FIG. 15, the low order byte of the command register 20i provides the IOIC with the SPD command bus information while the high order byte furnishes the priority level of the IOIC request bus and the O/D bus information. Certain bits of the Destination Select register 20h of FIGS. 3 and 4 are transmitted to Command register 20i. In FIG. 15, the numbers 5, 6, 7, 11, 12, 13, 14, 15, 16, 17, 27, 28, 29, 30, 31 represent the bits of the Destination Select register 20h which are transmitted to the Command register 20i "PB" is a parity bit, and "SPR" is a spare.

Figure 16:
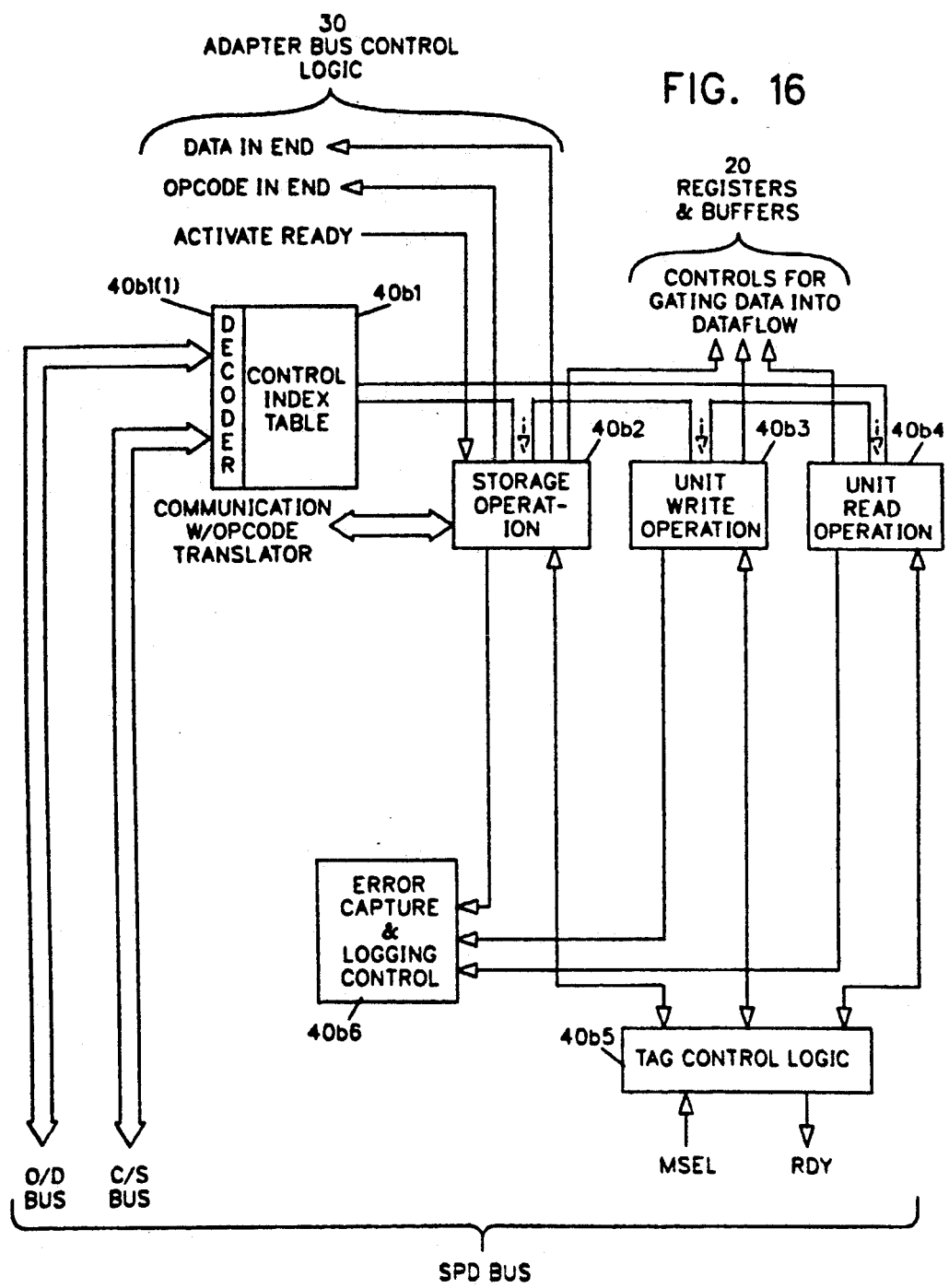
FIG. 16 illustrates a further construction of the slave control unit of FIG. 12.

Referring to FIG. 16, a detailed construction of the slave control unit 40b of FIG. 12 is illustrated.

In FIG. 16, the slave control unit 40b comprises a control index table 40bl including a decoder 40bl(1), connected to the origin destination (O/D) bus 10t3 and to the command status (C/S) bus 10t2, on one end, and to a storage operation logic 40b2, a unit write operation logic 40b3, and a unit read operation logic 40b4 on the other end. The storage operation logic 40b2 communicates with the opcode translator 40c of FIG. 12. The storage operation logic 40b2, unit write operation logic 40b3, and unit read operation logic 40b4 are connected to a tag control logic 40b5 and to an error & logging control logic 40b6.

The tag control logic 40b5 of the slave control unit 40b generates RDX and receives MSEL. To maintain the highest data rate possible on the SPD I/O Bus, the logic implements completely asynchronous tag-line handshaking. This is perhaps the single distinguishing feature of this particular design The attendant problems of asynchronous-to-synchronous interfacing are isolated at the adapter bus interface which allows the SPD Bus Control logic to be asynchronous in its operation. There are two types of SPD Bus operations that the Slave Controller must handle They are:

Unit Operations—same mode of operation as the unit operations with IOIC as the master, but initiated by an IOBU with IOIC as the slave.

Storage Transfer—The IOIC is always the slave unit or recipient of a storage transfer request. The IOIC will read or write from 1 up to 32 bytes of information in one SPD bus operation.

In FIG. 16, the CONTROL INDEX TABLE 40bl decodes commands from the command status (C/S) Bus 10t2, via decoder 40bl(1), and enables the proper control required to perform the command. There are three such controls storage operation 40b2, unit write operation 40b3, and unit read operation 40b4. Each of these controls are described in more detail in the following paragraphs.

Unit Operations—all unit operations are three cycles in duration, i e., three occurrence of tag-line handshaking per operation. Control signals, required to set status bits in their related registers in the Data Flow logic, are sent via the Internal Bus (which receives the Destination Select register when not driving status information). Several of the unit operations are hardware interpreted commands Upon receiving them, the IOIC sets a status bit which triggers an interrupt to the CPU indicating that the IOIC received one of these commands. However, it does not involve any other hardware facility or control sequencing other than generating the tag-line handshaking. These commands are D4 through D7. Message acceptance commands cover SPD Command Bus opcodes C0 through CF. They are handled differently from other unit write commands due to the manner by which the machine implements message buffer areas in main memory. The operation is made to look similar to a Storage Write of 16 bytes in length. However, instead of sending the storage opcode for a write 16, the IOIC sends '0A' indicating to the storage control that this is a write message command from the SPD Bus and must be processed according to the message buffer areas. There are also specific control lines within the IOIC to handle this type of operation.

Storage Operations—storage transfers require several operations to occur simultaneously within the IOIC. Consequently, there are a myriad of control lines necessary to properly sequence the entire operation. In addition, not all the necessary data lines can be resident on one chip due to restrictions of the chip driver technology, thus further complicating the design. The operation can be partitioned into three separate parts. They are: Data Flow; Storage Opcode Generation; and Access with Main Memory. The first two operations take place in parallel in the case of a write command to main memory. The third part is implemented by the Adapter Bus Control logic of FIG. 10.

A functional description of the Slave Control Unit 40b will be set forth in the following paragraph with reference to FIG. 16 of the drawings.

The IOIC registers and buffers 20, shown in FIG. 3, receives the SPD address/data bus 10tl. The registers and buffers 20 is four bytes wide and eight registers deep for a total of 32 bytes of data. Since each register is one word in length, the buffer address bits are taken from bits 27-29 of the SPD A/D bus 10tl. During the select cycle, the low order byte of the address is transferred from the registers and buffers 20 to the Slave Control Unit 40b. The Storage Operation control 40b2 of the Slave Control Unit 40b clocks in the address, determines the starting buffer address, and, in the case of a write, provides control signals and clocks for the purpose of loading data from the SPD A/D bus 10t1 into the buffer 20. When the proper number of data cycles have been clocked into the buffer 20, the Storage Operation control 40b2 provides signals indicating that the buffer 20 has been loaded by activating a control signal DATA IN END. In the case of a storage read command, the Storage Operation control 40b2 waits for a signal from the Adapter Bus Control logic 30. Upon receiving this signal (ACTIVATE READY), it then begins clocking out the data buffer 20a of FIG. 3 beginning at the starting address until it detects that the proper number of data cycles have been clocked out.

Figure 16A:
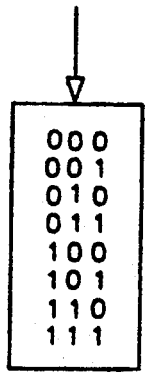
FIG. 16a illustrates the addressing scheme associated with the Data Buffer 20a of FIG. 3.

Referring to FIG. 16a, a description of the addressing scheme associated with the Data Buffer 20a of FIG. 3 is set forth in the following paragraph with reference to FIG. 16a.

In FIG. 16a, the addressing for the data buffer provided from the requesting IOBU via the A/D bus 10t1. Since it is word addressed, the bits correspond to address bits 27-29 of a buffer word received in registers and buffers 20 via the A/D bus 10t1. It can be seen from this implementation that starting addresses must start from no less than a 32-byte boundary (i.e., 00000 in the low order five address bits) and end at the next 32-byte boundary bus operation.

Figure 17A:
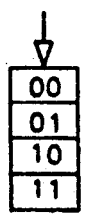
FIG. 17a illustrates a detailed layout of the address registers 20d of FIG. 3.
Figure 17:
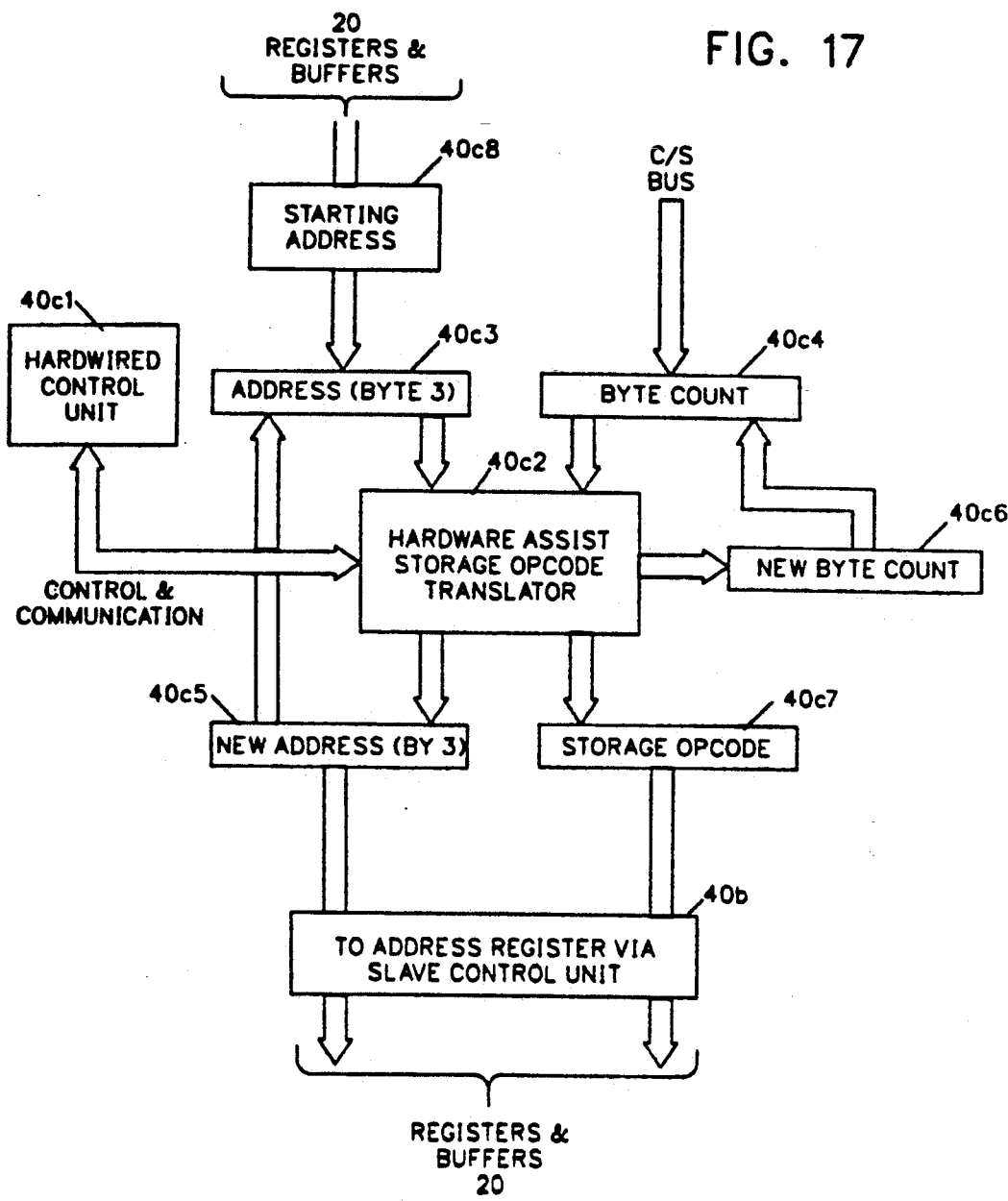
FIG. 17 illustrates a further construction of the storage opcode translator unit of FIG. 12.

Referring to FIG. 17, a detailed construction of the storage opcode translator unit 40c of FIG. 12 is illustrated.

In FIG. 17, the storage opcode translator unit 40c comprises a hardwired control unit 40cl connected to a hardware assist storage opcode translator 40c2. The translator 40c2 receives an address (byte 3) 40c3, a byte count 40c4, generates a new address (byte 3) 40c5 and a new byte count 40c6. The translator also generates a storage opcode 40c7. The address (byte 3) 40c3 receives a starting address 40c8.

With regard to the storage opcode translator 40c, the IOIC must generate the proper opcode(s) and format the data into packets acceptable for main memory. However, for one storage operation on the SPD Bus, there can be up to four separate memory transfer operations generated. For this reason, the opcode stack of the Address Register is four instructions deep. When the IOIC receives a storage write command, the opcode translator 40c is loaded with the starting address and the byte count. From this information the opcode translator 40c creates the opcode(s), loads them into the opcode stack and signals to the Adapter Bus Control Logic 30 that it has completed generating the opcode(s) by activating OPCODE IN END. In contrast, a storage read command causes only one opcode to be generated, regardless of the command or the byte count. The opcode translator 40c takes the list of memory read opcodes and does a 'best fit' for the command and byte count given. After receiving the data from memory, the IOIC clocks out only the buffers needed. If the operation is a storage write, the Adapter Bus Control Logic begins access to main memory after seeing both OPCODE IN END and DATA IN END active. For a storage read, only OPCODE IN END is required to be activated to begin the access. A high-level view of the logic to implement the storage opcode translator 40c is illustrated in FIG. 17. In FIG. 17, the Starting Address register 40c8 is loaded with information during the select cycle of an SPD bus operation by the Storage Operation control 40b2 of FIG. 16. It is merely a temporary holding register used by the translation unit 40c. As soon as the translator unit 40c is activated, the information is clocked into an input register, Address (byte 3) register 40c3. The byte count register 40c4 is loaded with information from the SPD C/S bus during the select cycle as well. It is updated with new data every time a new opcode is to be generated. The new data represents the remaining byte count for the storage transfer being serviced. In a similar manner, the address (byte 3) register 40c3 is updated with new data that represents the next starting address associated with the storage opcode that is generated. The hardware translator unit 40c2 is a custom designed Arithmetic Logic Unit (ALU). Together with the hardwired control unit 40cl, output registers New Address (byte 3) 40c5 and New Byte Count 40c6, input registers Address (byte 3) 40c3 and Byte Count 40c4, and the resultant Storage Opcode 40c7, the entire unit functions as a microinstruction translator and generator. A functional description of the opcode translator unit 40c will be described in the paragraphs to follow with reference to FIGS. 17 and 17a.

Referring to FIG. 17a, a more detailed layout of the address registers 20d of FIG. 3 is illustrated.

In FIG. 17a, there are four (4) addresses stored in address registers 20d, namely, a starting address and three (3) updated addresses. Four opcodes are also stored in the address registers 20d. For example, in FIG. 17a, the four opcodes are stored in a first opcode section OP1, a second opcode section OP2, a third opcode section OP3, and a fourth opcode section OP4 of the address registers 20d of FIGS. 3 and 17a. Similarly, the four addresses are stored in a first address section Ad1, a second address section Ad2, a third address section Ad3, and a fourth address section Ad4 of the address register of FIG. 17a. The address registers 20d store four addresses for the following reasons. Due to the type of memory used, associated with common storage facility 10d, and its unique storage instruction format, for any SPD storage operation, there can be up to four memory instructions generated. Thus, four separate operations to storage facility 10d can be required to complete just one SPD operation. Thus, four addresses, stored in address registers 20d, are required. Since storage transfers will always be within one 32-byte address boundary, the address changes only in the low order byte.

A functional description of the opcode translator 37 unit 40c will be set forth in the following 38 paragraph with reference to FIGS. 17 and 17a.

As the control unit 40cl clocks out the initial storage opcode, it is initially stored in storage opcode 40c7 and, then, subsequently stored in the first opcode OP1 section of the address register 20d of the registers and buffers section 20 of FIG. 17a via slave control unit 40b The control unit 40c1 determines if the output register New Byte Count 40c6 contains a zero count result. If not, the output registers 40c5 and 40c6 of FIG. 17 are transferred back to their corresponding input registers 40c3 and 40c4. A new address and a new byte count are produced in the hardware assist storage opcode translator 40c2 in response to control signals from the hardwired control unit 40c1 from the address and byte count transferred back to the input registers 40c3 and 40c4. The new address is restored in new address register 40c5 and the new byte count is restored in new byte count register 40c6. A new storage opcode is also produced, the new storage opcode being stored in storage opcode register 40c7. The new address is subsequently stored in second address section Ad2 of FIG. 17a, the new storage opcode being subsequently stored in second opcode section OP2 of address register 20d, in registers and buffers 20, of FIG. 17a via slave control unit 40b. The control unit 40c1 then determines if the new byte count is zero. If not, the new address and new byte count in registers 40c5 and 40c6 are again transferred back to input registers 40c3 and 40c4, and a further new address and a further new byte count is produced in the hardware assist storage opcode translator 40c2 in response to control signals from the hardwired control unit 40c1. The further new address and the further new byte count are restored in output registers 40c5 and 40c6 of FIG. 17. A further new storage opcode is also produced and stored in storage opcode register 40c7 of FIG. 17. The further new address is stored in third address section Ad3 of address register 20d of FIG. 17a, the further new storage opcode being stored in third opcode section OP3 of address register 20d of FIG. 17a via the slave control unit 40b. The control unit 40c1 re-examines the further new byte count to determine if it is zero. If the further new byte count is zero, the control unit 40c1 then indicates completion of the translation operation to the Storage Operation Unit 40b2 of FIG. 16 which then activates OPCODE IN END.

Figure 18:
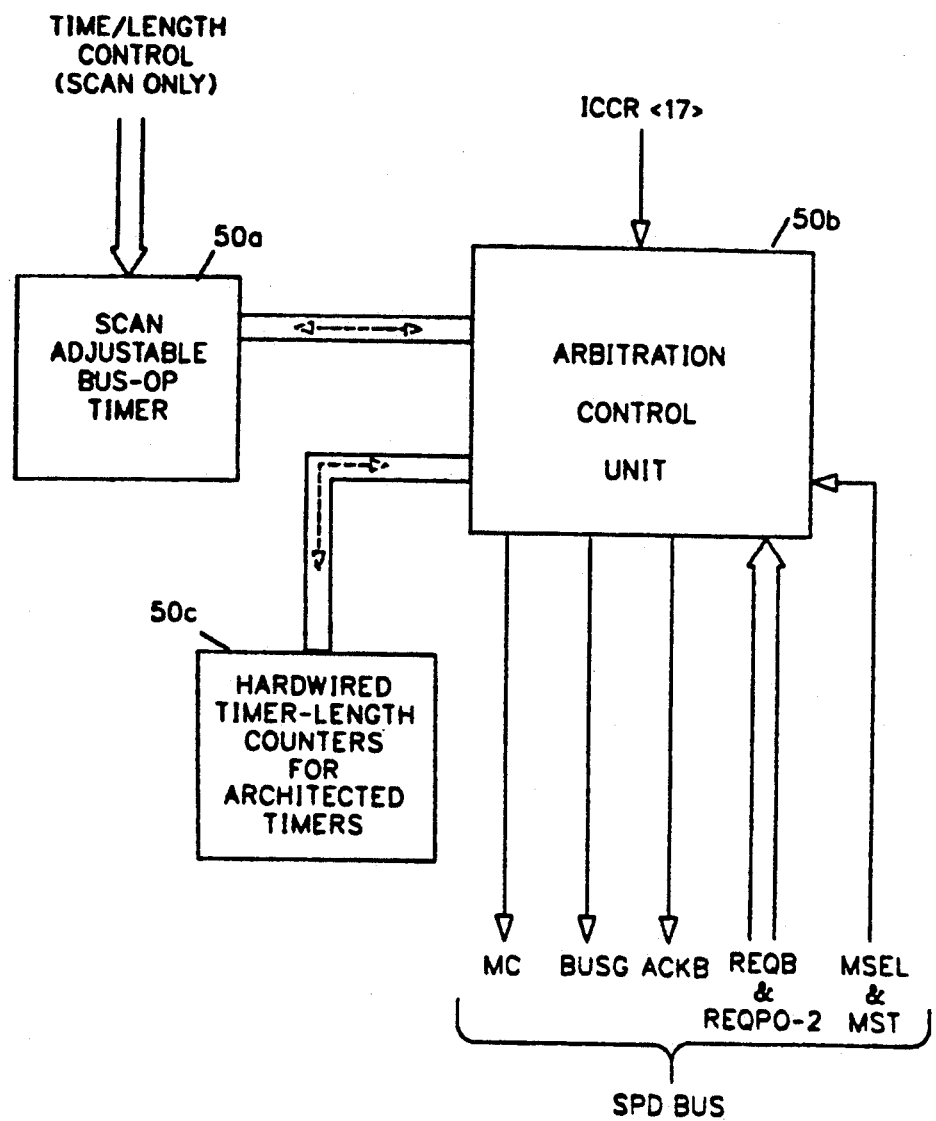
FIG. 18 illustrates a further construction of the bus control unit of FIGS. 2 and 11.

Referring to FIG. 18, a detailed construction of the Bus Control Unit (BCU) 50 of FIGS. 2 and 11 is illustrated.

The BCU 50 comprises a scan adjustable bus-op timer 50a connected to an arbitration control unit 50b, the arbitration control unit 50b being connected to hardwired timer-length counters for architected timers 50c.

The Bus Control Unit logic 50 contains the control logic for generating the Bus Grant (BUSG) and Acknowledge Bus (ACKB) control signals. It also contains the Bus Idle Timer which detects the lack of a bus unit response with BUSG and ACKB present. Although the setting of status bits is part of the Bus Timeout logic, the actual timer resides in the arbiter section of logic The arbitration logic 50b is more or less 'stand-alone' logic. That is, the logic is primarily driven by the architected SPD I/O Bus lines. However, ICCR Bit 17 is an internal control line that allows the CPU (thru the SET ICCR command) to exercise some control over the bus arbitration. With this bit set, arbitration is disabled for all bus requests coming in from the SPD Bus. The IOIC will still be allowed to arbitrate for the bus. In FIG. 18, the Bus Control Unit (BCU) 50 is comprised of three modules, the first two being an Arbitration Control Unit 50b, and a Bus Operation Timer 50a which possesses a software programmable control circuit which allows the timer to be set to any of four different timelengths. The hardwired timer length counters for architected timers 50c contains two more timers that are hardwired to be of a fixed length in accordance with their respective operations. The Arbitration Control Unit 50b is composed of some combinational logic circuits and several latches. The latches are set according to the state of the MSEL, MST and REQB lines. The unit is basically a priority decision circuit that sets or resets the BUSG and ACKB lines with respect to the state of the aforementioned three tag lines at any given moment.

Figure 19A:
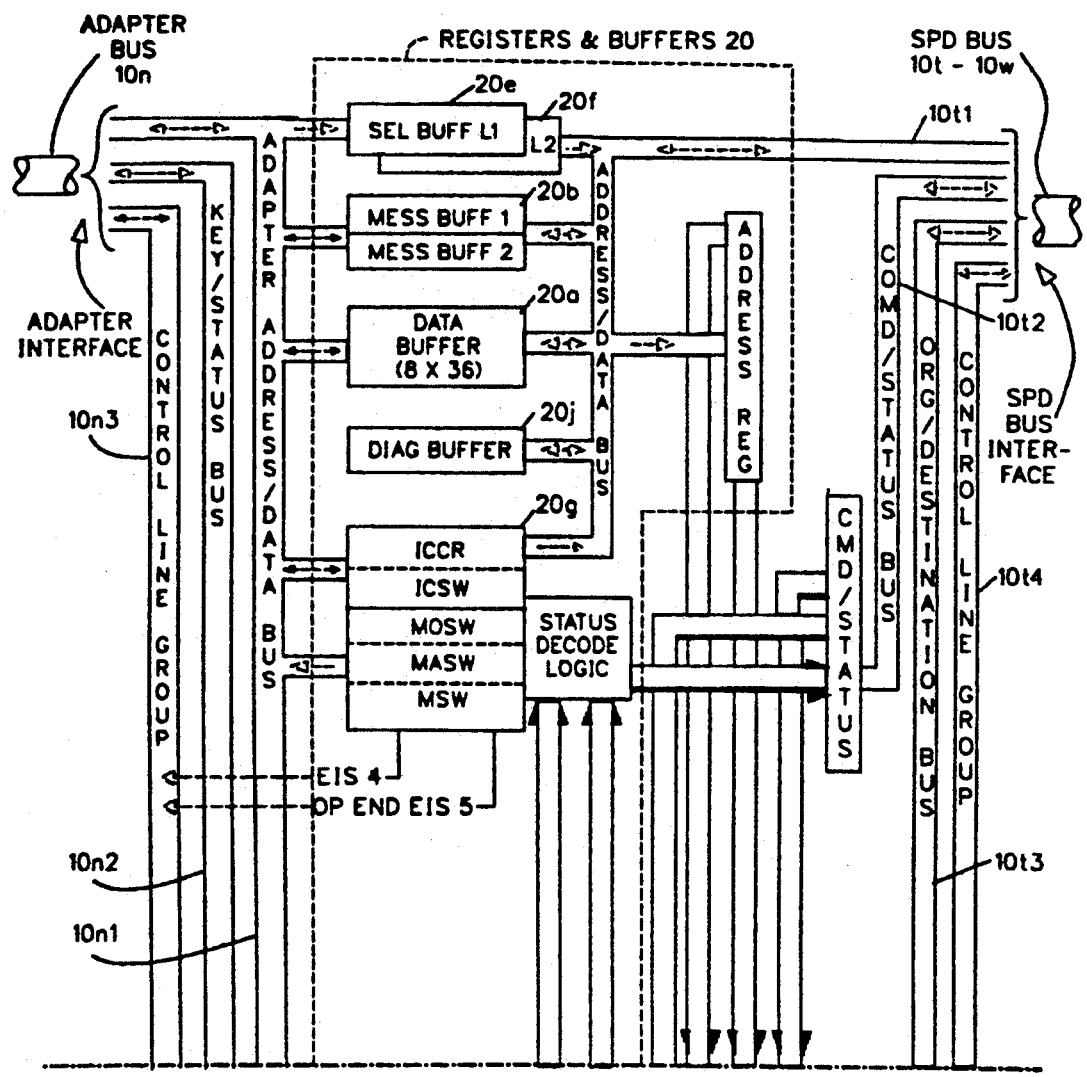
FIGS. 19A and 19B, illustrates a more complete view of the adapter bus, input output interface controller (IOIC), and spd bus of FIG. 1.
Figure 19B:
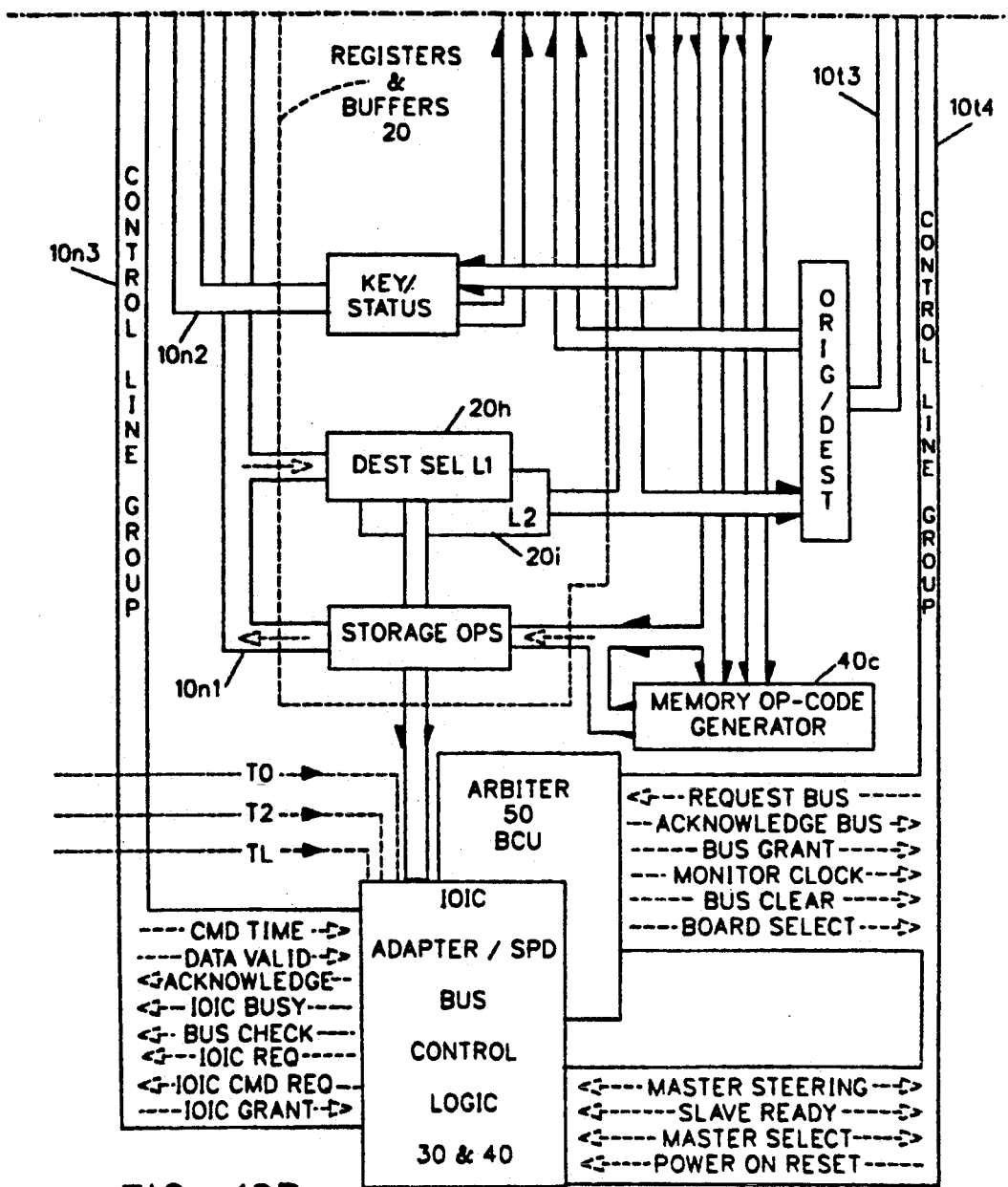

Referring to FIG. 19, a more detailed schematic of the IOIC 10j–10m is illustrated, including its interface with the adapter bus 10n and its interface with the SPD bus 10t–10w. FIG. 19 illustrates the IOIC which includes the registers and buffers section 20, the BCU arbiter 50, and the IOIC adapter and spd control logic 30 and 40. The spd bus 10t–10w each include the spd address data (A/D) bus 10t1, the command status (C/S) bus 10t2, the origin destination (O/D) bus 10t3, and the control line group 10*t*4, which further includes the following lines: REQUEST BUS, ACKNOWLEDGE BUS, BUS GRANT, MONITOR CLOCK, BUS CLEAR, BOARD SELECT, MASTER STEERING (MST), SLAVE READY, MASTER SELECT (MSEL) and POWER ON RESET. The adapter bus 10*n* is shown in FIG. 19 as including the adapter address data (A/D) bus 10*n*1, the key status (K/S) bus 10*n*2, control line group 10*n*3, which further includes the following lines: COMMAND TIME, DATA VALID, ACKNOWLEDGE, IOIC BUSY, BUS CHECK, IOIC REQ, IOIC CMD REQ, and IOIC GRANT.

(ii) The Storage Controller including Arbiter logic 10*i*, IOIU logic 10*e* and Storage Control logic 10*g*

As illustrated in FIG. 1, the adapter bus 10*n* is interconnected between one end of a storage controller and each of four IOICs 10*j*-10*m*. The adapter bus 10*n* includes the adapter address data (A/D) bus 10*n*1, the key status (K/S) bus 10*n*2, and the control line group 10*n*3. The storage controller includes arbiter logic 10*i*, input output interface unit (IOIU) 10*e*, and storage control logic 10*g*. A storage interface, including the storage bus 10*f* and the control bus 10*h*, interconnects the other end of the storage controller to the common storage facility 10*d*.

Figure 20A:
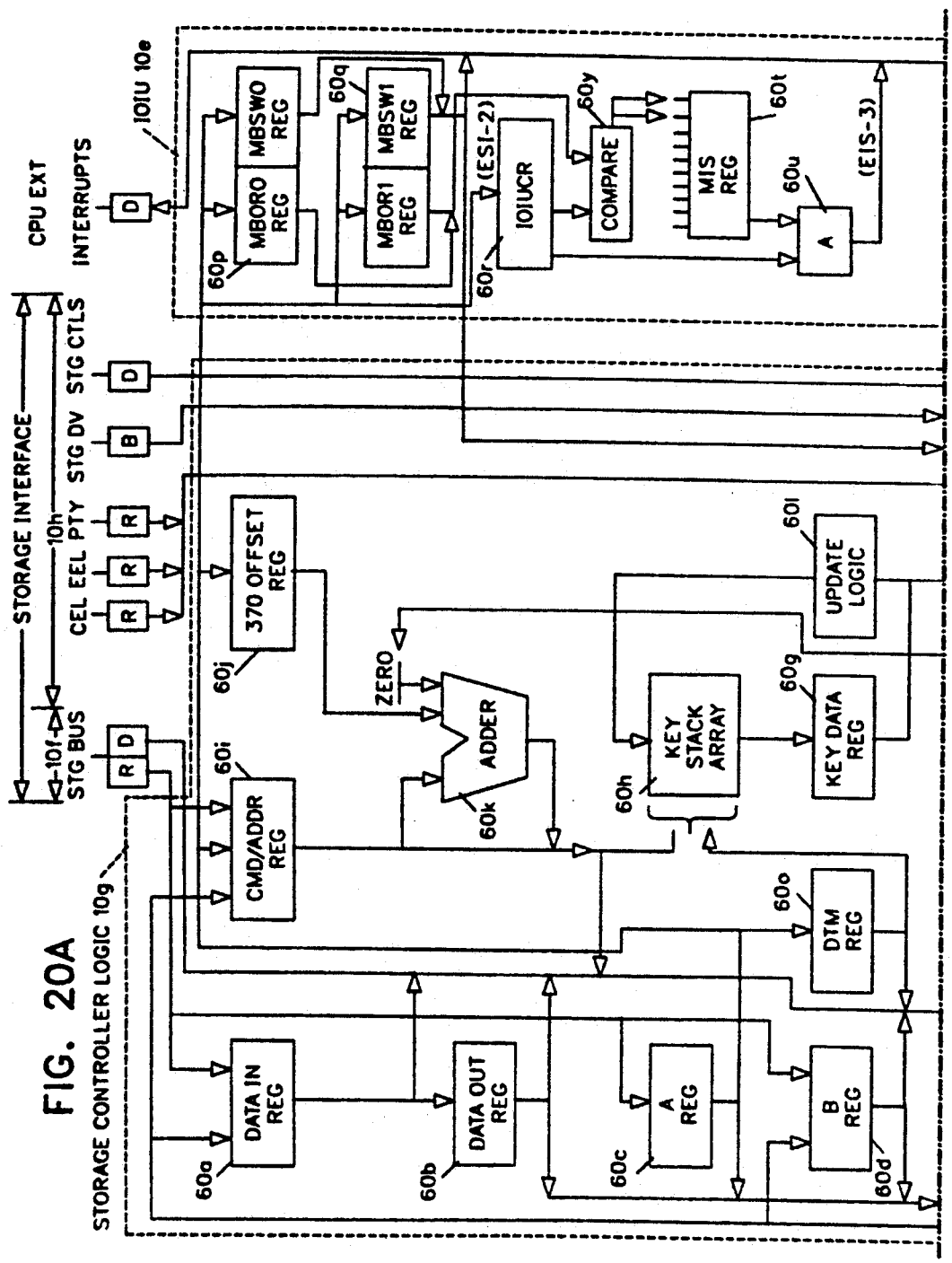

Referring to FIG. 20, a detailed construction of the Storage Controller of FIG. 1, including the arbiter logic 10*i*, the IOIU logic 10*e* and the storage control logic 10*g*, is illustrated.

In FIG. 20, the control bus 10*h* of the storage interface includes the following lines CEL, EEL, PTY, STG DV, and STG CTLS The control line group 10*n*3 of the adapter bus 10*n* includes the following lines: OP END, I/O REQ, I/O GRANT, adapter command time (ADPT CMD TIME), adapter data valid (ADPT DATA VALID), IOIC BUSY, IOIC ACK, ADPT BUS CHECK, and EIS BIT 4.

The arbiter logic 10*i* is described in prior pending application serial number 791,647, filed on Oct. 8, 1985, now U.S. Pat. No. 4,760,515, issued Jul. 26, 1988, entitled "an arbitration apparatus for determining priority of access to a shared bus on a rotating priority basis", the disclosure of which is incorporated by reference into the specification of this application.

The storage control logic 10*g* comprises a data in register 60*a* connected to storage bus 10*f*; a data out register 60*b* is connected to an output of the data in register 60*a* and to the storage bus 10*f*; an A-register 60*c* is connected, at its input, to the storage bus 10*f* and, at its output, to the adapter A/D bus 10*n*1, the output of the A-register 60*c* also being connected to a DTM register 60*o*; a B-register 60*d* is connected, at its input, to an input of the A-register 60*c* and to the storage bus 10*f*, the B-register 60*d* being also connected, at its input, to the adapter A/D bus 10*n*1 and to a further input of the data in register 60*a* and to an input to a command address (cmd/addr) register 60*i*; the B-register 60*d* is connected, at its output, to the adapter A/D bus 10*n*1 and to the storage bus 10*f* via the output of the data out register 60*b* and the output of the data in register 60*a*; the cmd/addr register 60*i* is further connected, at its input, to storage bus 10*f*, to an input of the data in register 60*a*, to an input of the A-register 60*c* and to an input of the B-register 60*d*; a further input of the cmd/addr register 60*i* is connected to an input of the DTM register 60*o*, to the adapter A/D bus 10*n*1, to a 370 offset register 60*j*, and to the MBOR0 register/MBSW0 register 60*p* of the IOIU logic 10*e*; the cmd/addr register 60*i* output is connected to an input of adder 60*k*, to an address input of a key stack array 60*h*, and to the storage bus 10*f* via the output of data out register 60*b* and the output of the data in register 60*a*; the 370 offset register 2 60*j* output is connected to a further input of adder 60*k*; the adder 60*k* output is connected to the address input of key stack array 60*h* and to the storage bus 10*f* via the output of data out register 60*b* and data in register 60*a*; an output of the key stack array 60*h* is connected to an input of a key data register 60*g*, the key data register 60*g* output being connected to an input of an update logic 60*l* and an input of error detection logic 60*m*; an output of update logic 60*l* is connected to an input of key stack array 60*h*; a further input of error detection logic 60*m* is connected to control bus 10*h*; an I/O key register 60*f* has an input connected to the adapter K/S bus 10*n*2, a key output connected to an input of the error detection logic 60*m*, and a no-off output connected to a zero input of the adder 60*k*; an output of the DTM register 60*o* is connected to the address input of the key stack array 60*h* and to the storage bus 10*f* via the output of the cmd/addr register 60*i*, the output of the data out register 60*b* and the output of the data in register 60*a*; an I/O status register 60*e* is connected, at its input, to an output of the error detection logic 60*m* and is connected, at its output, to the adapter K/S bus 10*n*2; an op end sum register 60*w* is connected at its input to an op end line of the control line group 10*n*3 and is connected at its output to the CPU EXT INTERRUPTS line and to the storage bus 10*f* via the outputs of the following: B-register 60*d*, DTM register 60*o*, cmd/addr register 60*i*, adder 60*k*, data out register 60*b* and data in register 60*a*.

The input output interface unit (IOIU) logic 10*e* comprises a message buffer origination register 0 (MBOR0 register)/ MBSW0 register 60*p* connected, respectively, at its input to an input of the 370 offset register 60*j*, to an input of cmd/addr register 60*i* and DTM register 60*o* of the storage control logic 10*g*, to an input of message buffer orignation register 1 (MBOR1)/ MBSW1 register 60*q*, and to an input of IOIUCR register 60*r*; an output of MBOR0 register 60*p* is connected to an output of MBOR1 register 60*q* and to an input of compare logic 60*y*; an output of MBSW0 register 60*p* is connected to the output of MBSW1 register 60*q*, to a further input of error detection logic 60*m* of the storage control logic 10*g*, and to the CPU EXT INTERRUPTS line; an output of the IOIUCR register 60*r* is connected to a further input of compare logic 60*y*, an output of compare logic being connected to some input terminals of MIS register 60*t*; an output of MIS register 60*t* is connected to an input of AND gate 60*u*, a further input of AND gate 60*u* being connected to another output of IOIUCR register 60*r*; an output of AND gate 60*u* is connected to the CPU EXT INTERRUPTS line; an input of an IUSW register 60*v* is connected outside the IOIU logic 10*e* to an output of a control logic 60*n*, a further output of control logic 60*n* being connected to the STG CTLS line of control bus 10*h*, and the STG DV line of the control bus 10*h*; the control logic 60*n* is also connected to an output terminal of the error detection logic 60*m*; the control logic 60*n* is also connected to the following lines of the control line group 10*n*3: ADPT CMD TIME, ADPT DATA VALID, IOIC BUSY, IOIC ACK, ADPT BUS CHECK; the control logic 60*n* is further connected, outside the IOIU logic 10*e*, to the arbiter logic 10*i*, the arbiter logic 10*i* being connected to the following additional lines of the control line group 10n3: OP END, I/O REQ, I/O GRANT; the IUSW register, inside the IOIU logic 10e, is connected at its output to the following remaining line of the control line group 10n3: EIS BIT 4.

A description of the functional operation of the storage controller, including the IOIU 10e and the storage control logic 10g, will set forth in section (v) of this specification and in the following paragraphs of section (iii) of this specification entitled "The Adapter bus 10n" (1) Processor Bus Operation (PBO) message operations—copy operations and load operations, (2) memory operations—read from storage, write to storage, and read modify write to storage, and (3) message acceptance operations.

(iii) The Adapter Bus 10n

In FIG. 19, an IOIC 10j-10m is an interface between the asynchronous SPD BUS 10t-10w and the synchronous ADAPTER BUS 10n. The Adapter Bus 10n is the synchronous interface between the I/O Interface Unit (IOIU) 10e and four IOIC's 10j-10m. There may be up to sixteen IOICs used in this system. The adapter bus 10n comprises an adapter address data (A/D) bus 10n1, a key status (K/S) bus 10n2, and a control line group 10n3.

The Adapter Address/Data (A/D) Bus 10n1 is a 36 bit, tri-state bi-directional bus, consisting of 4 bytes with parity. Key/Status (K/S) Bus 10n2 is a 6 bit, tri-state bi-directional bus, consisting of 5 data bits with parity.

As illustrated in FIG. 19, the control line group 10n3 of each IOIC includes 6 lines used to control the direction of data flow, handshaking and error information. They are:
Adapter Command Time
Adapter Data Valid
Adapter Bus Check
IOIC Acknowledge
IOIC Busy
External Interrupt Summary Bit 4 (EIS 4)

The control line group 10n3 of each IOIC also includes:
two request lines, namely, IOIC REQ and IOIC CMD REQ;
a grant line, namely, IOIC GRANT; and an operation end line, termed OP END EIS 5.

Referring once again to FIG. 19, the adapter address data (A/D) bus 10n1 is a physical part of the adapter bus 10n. The following paragraphs describe the individual bytes which comprise the adapter A/D bus 10n1:

ADAPTER A/D BUS BYTE 0

Adapter Bus Byte 0 is active from T0 to T0 and contains the 'Storage Command' the cycle after an IOIC grant has been given It contains data after a storage write command for up to eight cycles. It contains the 'PBO Adapter Command' at ADAPTER COMMAND TIME when receiving a PBO command from the IOIU. It contains data when ADAPTER DATA VALID is active for a storage read. The IOIC will clock the data from the Bus using the T2 Clock.

ADAPTER A/D BUS BYTE 1

Adapter Bus Byte 1 is active from T0 to T0 and contains the Storage Address the cycle after an IOIC GRANT has been given. It contains data after a storage write command for up to eight cycles. It contains the 'I/O Command' at ADAPTER COMMAND TIME when receiving a PBO command from the IOIU. It contains data when ADAPTER DATA VALID is active for a storage read. The IOIC will clock the data from the Bus using the T2 Clock.

ADAPTER A/D BUS BYTE 2

Adapter Bus Byte 2 is active from T0 to T0 and contains the Storage Address the cycle after an IOIC GRANT has been given It contains data after a storage write command for up to eight cycles. It contains the 'Priority level and IOIC address' at ADAPTER COMMAND TIME when receiving a PBO command from the IOIU. It contains data when ADAPTER DATA VALID is active for a storage read. The IOIC will clock the data from the Bus using the T2 Clock.

ADAPTER A/D BUS BYTE 3 32

Adapter Bus Byte 3 is active from T0 to T0 and contains the Storage Address the cycle after an IOIC GRANT has been given. It contains data after a storage write command for up to eight cycles. It contains the 'Destination address' at ADAPTER COMMAND TIME when receiving a PBO command from the IOIU. It contains data when ADAPTER DATA VALID is active for a storage read. The IOIC will clock the data from the Bus using the T2 Clock.

Referring to FIG. 19, the adapter bus 10n comprises the key status (K/S) bus 10n2.

Referring to FIG. 22, the key status bus bit layout is illustrated.

The Key Status (K/S) Bus 10n2 is active from T0 to T0 following the receipt of an IOIC GRANT. It will contain the S/370 key on bits 0-3 if in 370 emulation or it must contain zero's if in Native mode. Bit 4 if active, will cause the storage clocked into the Command/Address register 60i to be added to a value of zero by the adder 60k. If bit 4 is inactive, it will cause the address in the CMD/ADDR Register 60i to be added to the value in the S/370 Offset Register 60j. The resultant address from the adder 60k is the address presented on the Storage Bus 10f. In Native mode bit 4 has no effect since the offset will be equal to zero. During Message Acceptance operations, the Key/Status bus bits 0-3 contain the message priority value. Except for the time when the IOIC drives the bus, the IOIU drives the bus and presents Status. The Status bits 0-1 are sensed once for Command status on the second cycle after the IOIC GRANT, and then during each ADAPTER DATA VALID cycle for a Read operation, or on the fourth cycle after the last write data cycle for a Write operation.

In FIG. 22, a key bit layout, associated with the key bus portion of the key status bus 10n2, and a status bit layout, associated with the status bus portion of the key status bus 10n2, is presented. The status bus bits have a specific meaning in terms of the status of commands and the status of data on the bus. FIG. 22 sets forth the status of commands (COMMAND STATUS) and the status of data (DATA STATUS) for the first two bits of the status bus, the remaining bits also having a specific meaning as outlined in FIG. 22 and in the following paragraphs:

COMMAND STATUS BIT MEANING

Bits 0-1: equal to '00' means that everything is good and the storage operation is proceeding; equal to '01' means the address given is invalid (Invalid Address); equal to '10' means the Key given is not correct for the address given (Protection Violation); equal to '11' means that the command given is not valid (Unit Check).

Bit 2 indicates that a parity check has occurred on the A/D Bus with the Command and Address or on the data cycle following the command. It could also mean that there was a parity check on the K/S Bus during the command cycle. (Unit Check)

Bit 3 indicates that the IOIU clocks have stopped and that the operation in progress will be unpredictable and should be repeated (Not Ready)

Bit 4 indicates that the Message Buffer is Not Available and is a result of the "OR" of MBSW0 register 60$p$ (of FIG. 20) bits 28,29,or 31, or MBSW1 register 60$q$ bits 28,29,or 31. If active, it signals the storage operation will not be done. This bit is only significant for a Message Acceptance operation. (Buffer Not Available)

Bit 5 will maintain odd parity for the K/S Bus.

DATA STATUS BIT MEANING:

The I/O Status Register 60$e$ contains the following bit meaning and is gated to the Key/Status Bus 10$n$2 by the Storage Controller at all times except the cycle following an IOIC GRANT when the bus is used for Key information.

Bits 0-1: equal to '00' means that the data being received is good; equal to '01' means the data being received is bad and not reliable (Unit Check-Storage Error); equal to '10' or '11' are reserved and should be ignored.

Bit 2 indicates that a parity check has occurred on the A/D Bus with data from the IOIC buffers (Unit Check)

Bit 3 indicates that the IOIU clocks have stopped and that the operation in progress will be unpredictable and should be repeated (Unit Check)

Bit 4 has no valid meaning at this time.

Bit 5 will maintain odd parity for the K/S Bus.

Referring to FIG. 19, the adapter bus 10$n$ includes a control line group 10$n$3.

The control line group 10$n$3 comprises the following signal lines:

ADAPTER COMMAND TIME—The Adapter command time signal is active from T0 to T0 and is driven by the IOIU. This signals all IOIC's to sample the Adapter A/D Bus at T2 and determine if the PBO command is for them If a match of the select field and the IOIC's address occurs, then either an IOIC ACKNOWLEDGE or IOIC BUSY must be given on the second cycle after ADAPTER COMMAND TIME. Absence of a response will cause IUSW Register 60$v$ bit 29 to activate which in turn forces the summary bit 31 active which activates EIS bit 4.

ADAPTER DATA VALID—The Adapter data valid signal is active from T0 to T0 and is driven by the IOIU. This signal indicates that the Adapter A/D Bus bus should be sampled for data and that the Status Bus should be checked to see if the data is good and no error conditions exist.

ADAPTER BUS CHECK—The Adapter Bus Check line is an open collector signal which is driven by the IOIC from T0 to T0 on the following cycle after the receipt of bad parity on the Adapter A/D Bus. Parity is checked on the Adapter A/D Bus during ADAPTER COMMAND TIME and the following data cycle. The Adapter Bus Check signal is only valid for PBO's.

IOIC ACKNOWLEDGE—The IOIC Acknowledge signal is active from T0 to T0 and is driven by the IOIC on the second cycle following the ADAPTER COMMAND TIME cycle. It signals that the selected IOIC has received the PBO command with no parity check and will do the operation.

IOIC BUSY—The IOIC Busy signal is active from T0 to T0 and is driven by the IOIC on the second cycle following the ADAPTER COMMAND TIME cycle. It signals that the selected IOIC has received the PBO command with no parity check but is unable to complete the operation at the present time.

EIS BIT 4 (I/O EXCEPTION)—The EIS Bit 4 interrupt signal will signal exceptional conditions that occur during the execution of SPD Bus commands. It is the dynamic signal created from the logical OR of the IOIC STATUS WORD (ICSW) Status Summary Bit 28 from each of the IOIC's. ICSW Bit 28 is a summary bit indicating the occurrence of an error or other event on the SPD I/O Bus which the IPU needs to handle. EIS 4 will remain active until all sources are reset to zero by Reset ICSW Under Mask instructions. This signal is also present if the IOIU Status Reg 60$v$ summary bit 31 is active.

OPERATION END EIS BIT 5—The Operation End EIS 5 interrupt signals the completion of an abnormally completed operation. It is the dynamic signal created from the logical AND of the MESSAGE ORIGINATION STATUS WORD (MOSW) Operation End Bit 0 and MOSW Status Summary Bit 2. Each IOIC sends a separate OPERATION END EIS 5 signal to the IOIU Operation End Summary Register 60$w$. These 4 bits are "OR"ed and result in the External Interrupt Bit 5 being active. The MOSW bit 2 is a summary bit indicating abnormal status which the IPU will need to handle when the operation ends. OPERATION END EIS 5 is on until MOSW Bit 2 is reset to zero by executing a Move MOSW PBO where the OPERATION END bit 0 is equal to one.

IOIC REQUEST—The IOIC Request signal is active from T2 to the T2 following the reception of an IOIC GRANT and is driven to the IOIU by each IOIC by a separate line It signals the IOIU that the IOIC has a normal I/O Request for use of the Adapter Interface to obtain access to Storage. A normal I/O Request is mutually exclusive with the Cycle Steal Request from the same IOIC.

IOIC CMD REQUEST—The IOIC Command Request is active from T2 to the T2 following the reception of IOIC GRANT and is driven to the IOIU by each IOIC by a separate line. It signals the IOIU that the IOIC has a top priority I/O Request for use of the Adapter Interface to obtain access to Storage. It is used only for four or eight byte requests needed for the next CCW. If used for any other purpose, it may result in performance degradation in the other IOIC's. An IOIC CMD Request is mutually exclusive with a normal I/O Request from the same IOIC.

IOIC GRANT—The IOIC Grant signal is active from T1 to T1 and is driven by the arbiter 10$i$ of FIG. 1 to each IOIC on a separate line. This signal tells the IOIC that its request has been granted and to drive its Command, Address and Key to the Adapter Interface the next T0 to T0 which is IOIC Command Time.

A functional description of the operation of the adaptor bus 10$n$ will be set forth in the following paragraphs with reference, initially, to FIG. 19 of the drawings.

There are three main uses for the ADAPTER BUS interface.

1. Processor Bus Operation (PBO) message operations—transfer of Processor Bus Operation (PBO) information; 24

2. Memory Operations—transfer of IOIC data to or from Memory; and

3. Message Acceptance Operations—transfer of I/O Message information to Memory.

Each of these three main uses are fully described in the following numbered paragraphs.

1. PBO MESSAGE OPERATIONS A Processor Bus Operation (PBO) is any operation, based on the execution of a particular instruction, originating from the IPU 10a. A list of valid PBO instructions executed by the IPU 10a for the purpose of using IOIC's for operations on the adaptor bus 10n and the SPD bus 10t–10w are illustrated in FIG. 21. Processor Bus Operations originate in the IPU 10a and are relayed to the IOIU 10e via the Data Cache 10c on the Storage Bus 10f. At the receipt of a PBO request, the Storage Control logic 10g requests the Storage Bus 10f, by activating the PBO request line 7 of FIG. 1 and waits for a grant from the arbiter logic 10i. When both the Data Cache 10c and the Storage Control 10g receive the PBO grant line from the Arbiter 10i, the Data Cache sends information, which it received from the IPU 10a via the A-bus, on the Storage Bus 10f, to the A register 60c of the Storage Control logic 10g of FIG. 20. During the next cycle, the Data Cache 10c sends information, which it received from the IPU 10a via the D-bus, to the B register 60d of storage control logic 10g of FIG. 20.

Figure 32:
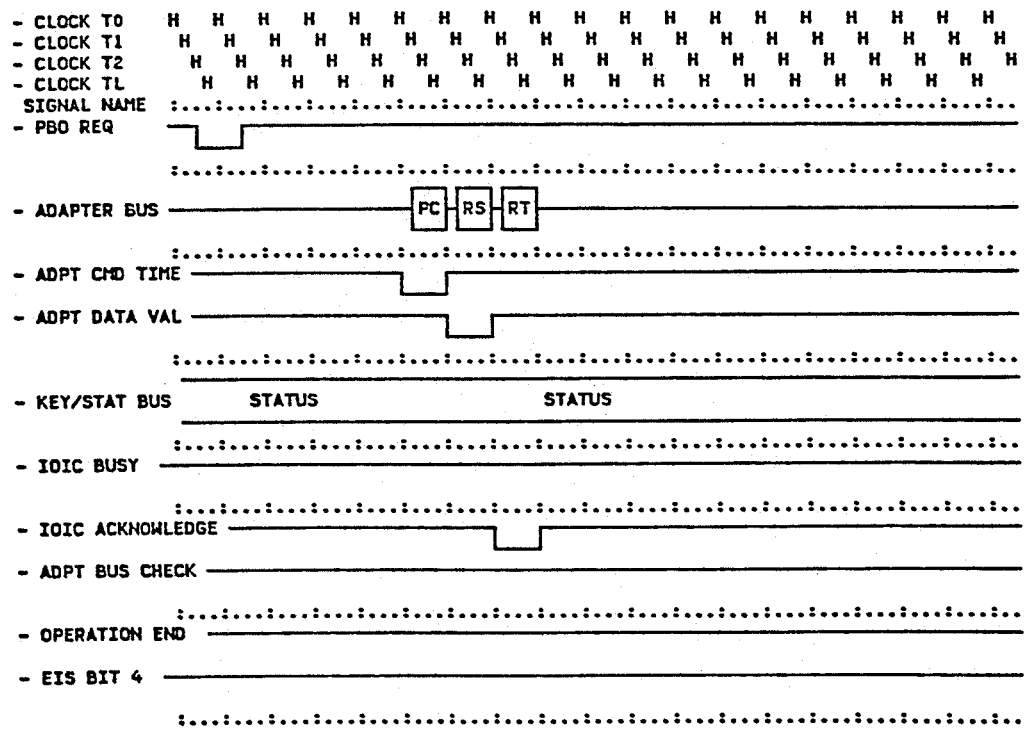

There are two types of PBO operations to the IOIC
A. Copy operations; and
B. Load operations
A. Copy operations Refer to FIG. 32 for a timing diagram of the Copy PBO operation.

During copy operations, data is sent back to the IOIU from the IOIC on a third PBO cycle. There are three cycles during a copy PBO operation:
(1) Adapter COMMAND TIME cycle,
(2) DATA VALID cycle, and
(3) RETURN DATA cycle.

The adapter COMMAND TIME cycle occurs from T0 to T0 on the cycle following the IOIC Grant. The contents of the A-Register 60c of the storage controller 10g of FIG. 20 are gated onto the Adapter Bus 10n to the IOIC during the this cycle. This data represents the destination select (DESTSEL) information clocked into Dest Select Register 20h in FIG. 3.

The DATA VALID Cycle is the next cycle. During this cycle, the contents of the B-Register 60d are clocked onto the adapter bus 10n to the IOIC for storage in the Selector Buffer 20e.

The RETURN DATA cycle is the last cycle of the PBO sequence In response to the A-register 60c and B-register 60d information, the selected IOIC 10j–10m will gate data, corresponding to the A-register and B-register information, onto the Adapter Bus 10n to the B-register 60d in the IOIU 10e. The data will, in turn, be transferred back to the IPU 10a via the storage bus 10f and the data cache 10c in response to a subsequent successful request for access to the storage bus using the PBO REQUEST line. The selected IOIC will also send the IOIC ACKNOWLEDGE signal or the IOIC BUSY signal to the IPU.

If IOIC ACKNOWLEDGE signal is not received from the IOIC, bit 29 of the IOIU STATUS Word Register 60v will be set, which in turn sets the summary bit 31 causing External Interrupt Summary bit 4 to be activated. If IOIC BUSY is received, bit 30 of the IUSW will be set which also sets the summary bit 31 causing EIS bit 4 to be activated.

Figure 31:
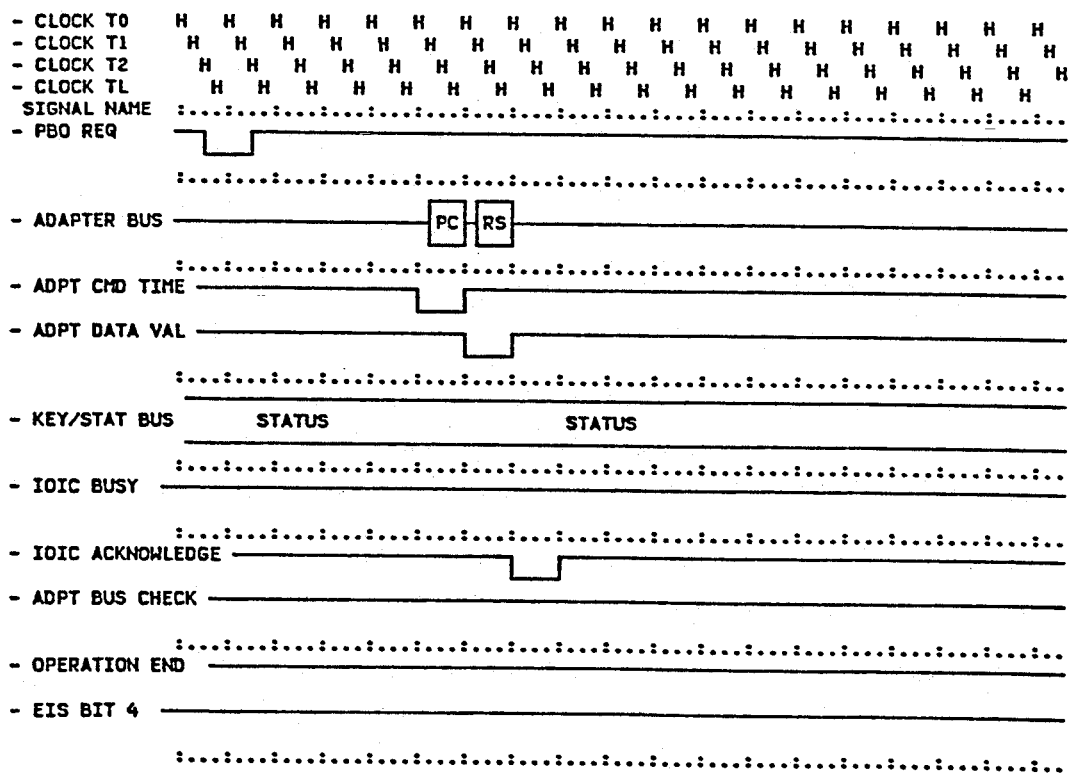

B. Load operations:

Refer to FIG. 31 for a timing diagram of the Load PBO operation.

Load PBO's follow the same sequence as the Copy PBO operation, with the exception that, during the third cycle, the IOIC ACKNOWLEDGE signal is transmitted back to the IPU, but no data is transferred.

FIG. 21 provides a list of valid PBO commands.

2. MEMORY OPERATIONS Memory Operations on the Adapter Bus always originate in the IOIC. There are three types of memory commands that the IOIC sends to the Storage Control 10g of FIG. 1 Read, Write, and Read Modify Write (RMW) Read takes data from the Common Storage Facility 10d and sends it to the IOIC. Write takes data from the IOIC and puts it in the Storage Facility 10d. Read Modify Write takes data from the IOIC and puts it in the Storage Facility 10d but, first, an 8 byte read operation is performed, followed by a merge of the new data to be written.

Refer to FIG. 21A for the valid memory commands which the IOIC sends to the storage control 10g of FIG. 1.

There are three main types of memory commands in FIG. 21A: READ from STORAGE, WRITE to STORAGE, and READ MODIFY WRITE to STORAGE. Each of the three main types of memory commands are described in further detail in the following paragraphs.

A. READ from STORAGE

Figure 27:
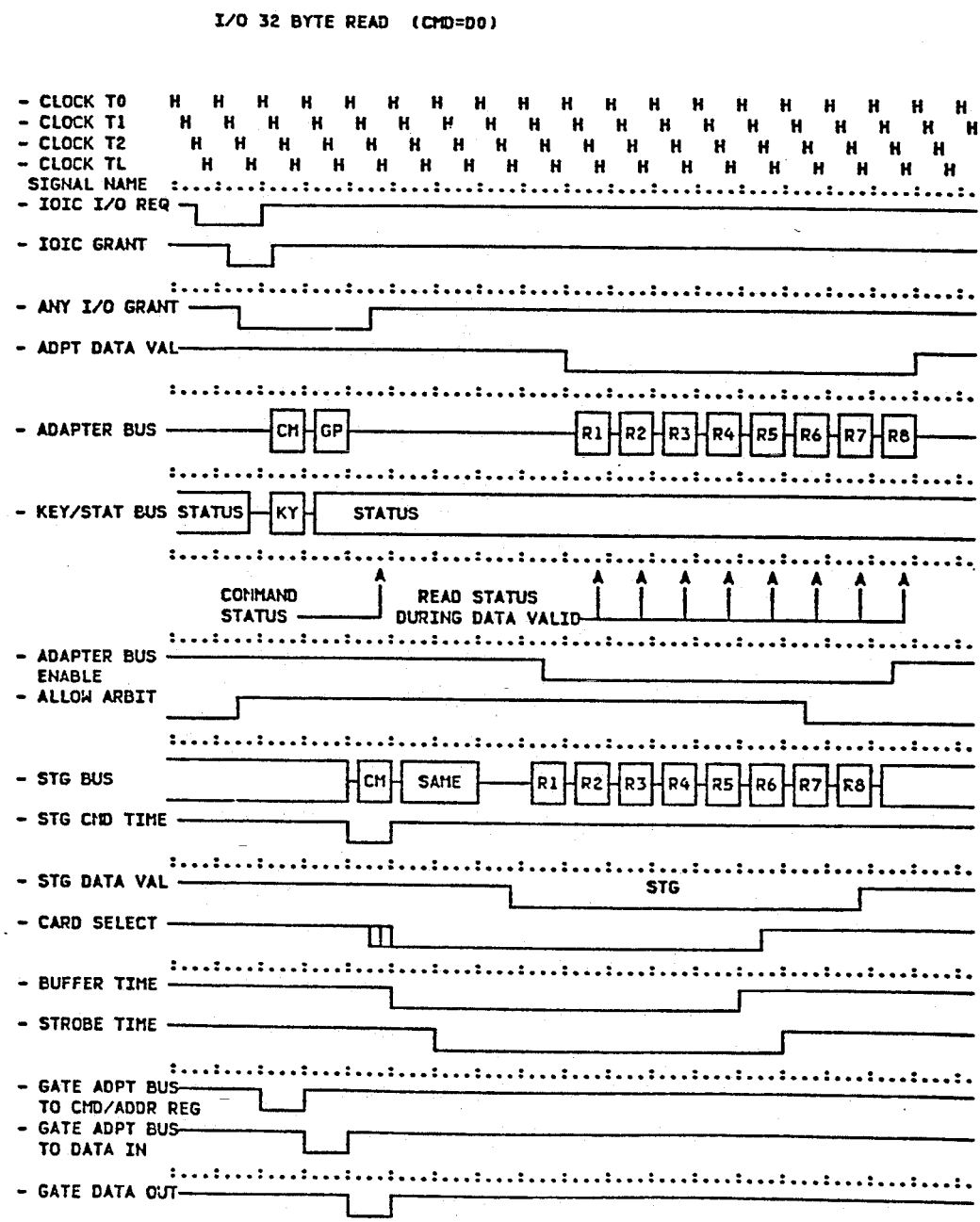
FIGS. 27-32 illustrate timing sequence diagrams associated with the adapter bus.

Refer to FIG. 27 for a timing diagram of the I/O Read Operation.

IOIC COMMAND TIME: The Adapter A/D Bus Byte 0 contains the Read Command for 1,2,4,6 or 8 words of data and is clocked into the CMD/ADDR Register 60i of the Storage Controller 10g of FIG. 20 from an IOIC. FIG. 21A details the valid commands which may be used. The Adapter A/D Bus Bytes 1–3 contain the starting address for the storage read and is clocked into the storage controller 10g from the IOIC. If the I/O Key Register 60f bit 4 is inactive, the address in the CMD/ADDR Register 60i will be added by Adder 60k to the S370 Offset Command Time. This resultant address is the address presented to the Key Stack Array 60h. The data read from the Key Stack into the Key Data Register 60g will then be compared to the Key received in the I/O Key Register 60f. If it satisfies the Key compare operation, the Storage operation proceeds, however, if a Protection Check or an Invalid Address Check occurs the operation is halted and the error status is sent from the Error Detection Logic 60m to the I/O Status Register 60e where it is driven to the Key/Status Bus 10n2.

ADAPTER DATA VALID: After sending the Command and Address to the storage controller 10g (and ultimately to storage facility 10d), the IOIC waits for the data from storage. The data received on the Storage Bus 10f is clocked into the Data In Register 60a and relayed to the Adapter A/D Bus 10n1 on the next cycle. Storage Data Valid signal is also delayed one cycle and becomes ADAPTER DATA VALID. Adapter Data Valid will indicate when each word of data transferred is to be loaded into the IOIC Data Buffer Note Data cycles may not be consecutive if extended ECC retry is attempted by the Storage.

STATUS TIME: The read status from the I/O Status Register 60e of FIG. 20 is sent to the IOIC at the same time data is transferred with Adapter Data Valid.

B. WRITE to STORAGE

Figure 28:
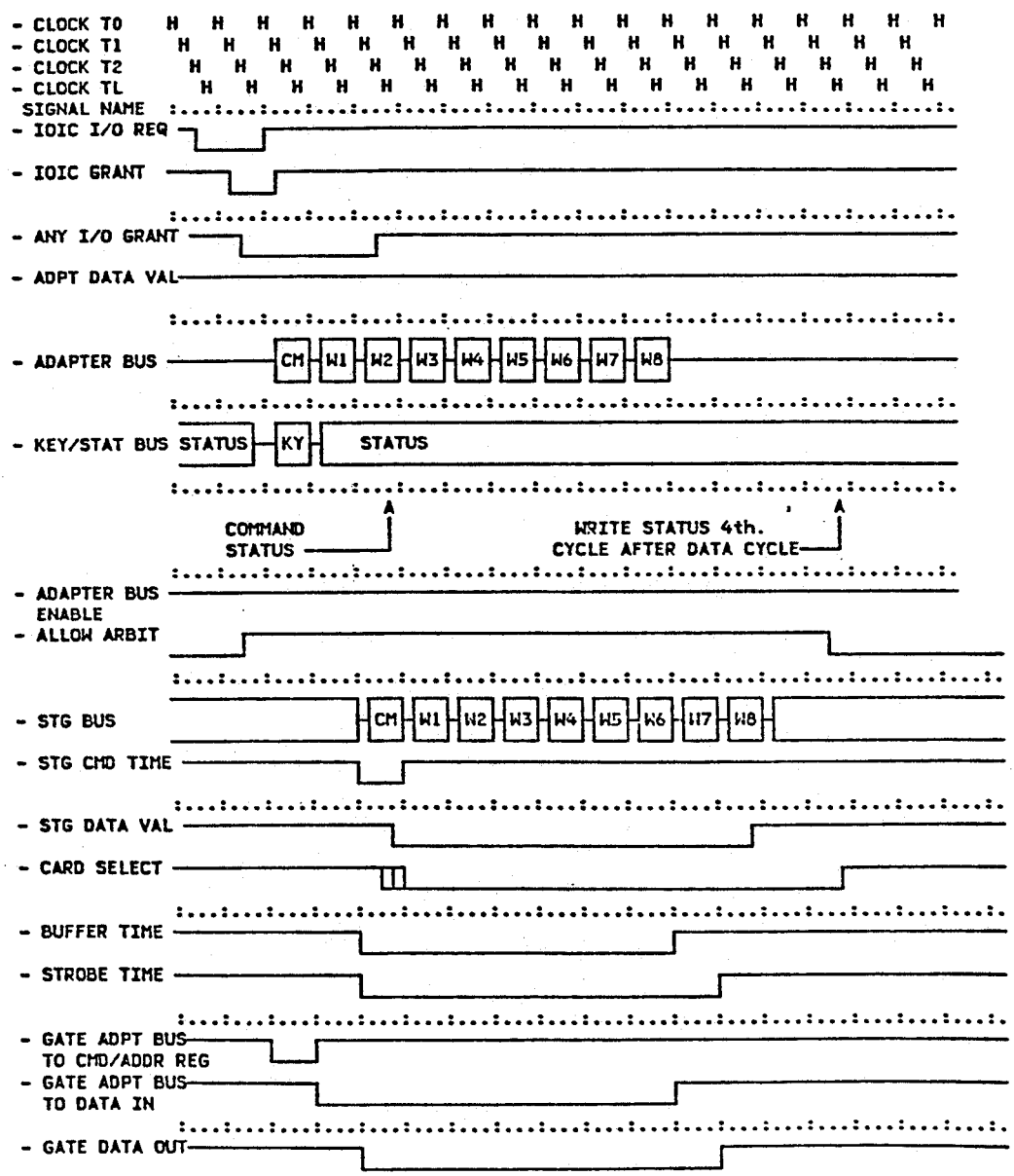

Refer to FIG. 28 for a timing diagram of the Write Operation.

IOIC COMMAND TIME: The Address/Data Bus Byte 0 contains the Write Command for 2,4,6 or 8 words of data. Bytes 1,2 and 3 contain the starting address for the storage write. The Key/Status Bus contains the storage protect key. The beginning cycle is identical to that of a Read Command The data immediately follows the Command Address cycle.

DATA CYCLES The cycles which follow immediately after the IOIC Command Time cycle contain the data to be written in Storage. The data is byte aligned and must be in multiples of 8 bytes and must be within the appropriate boundaries, i.e., a 32 byte request must start on a 32 byte boundary. The data is loaded into the Data In Register 60a and transferred to the Data Out Register 60b on the following cycle. From here the data is sent out on the Storage Bus 10f. This delay of data by two cycles, allows the Key check operation to take place and the new address generated to be gated to the Storage Bus 10f at STORAGE COMMAND TIME.

STATUS TIME The write status from the IOIU is sent to the IOIC on the fourth cycle after the last data valid cycle. Note: ADAPTER DATA VALID line is not used when doing a write.

C. READ MODIFY WRITE to STORAGE

Figure 29:
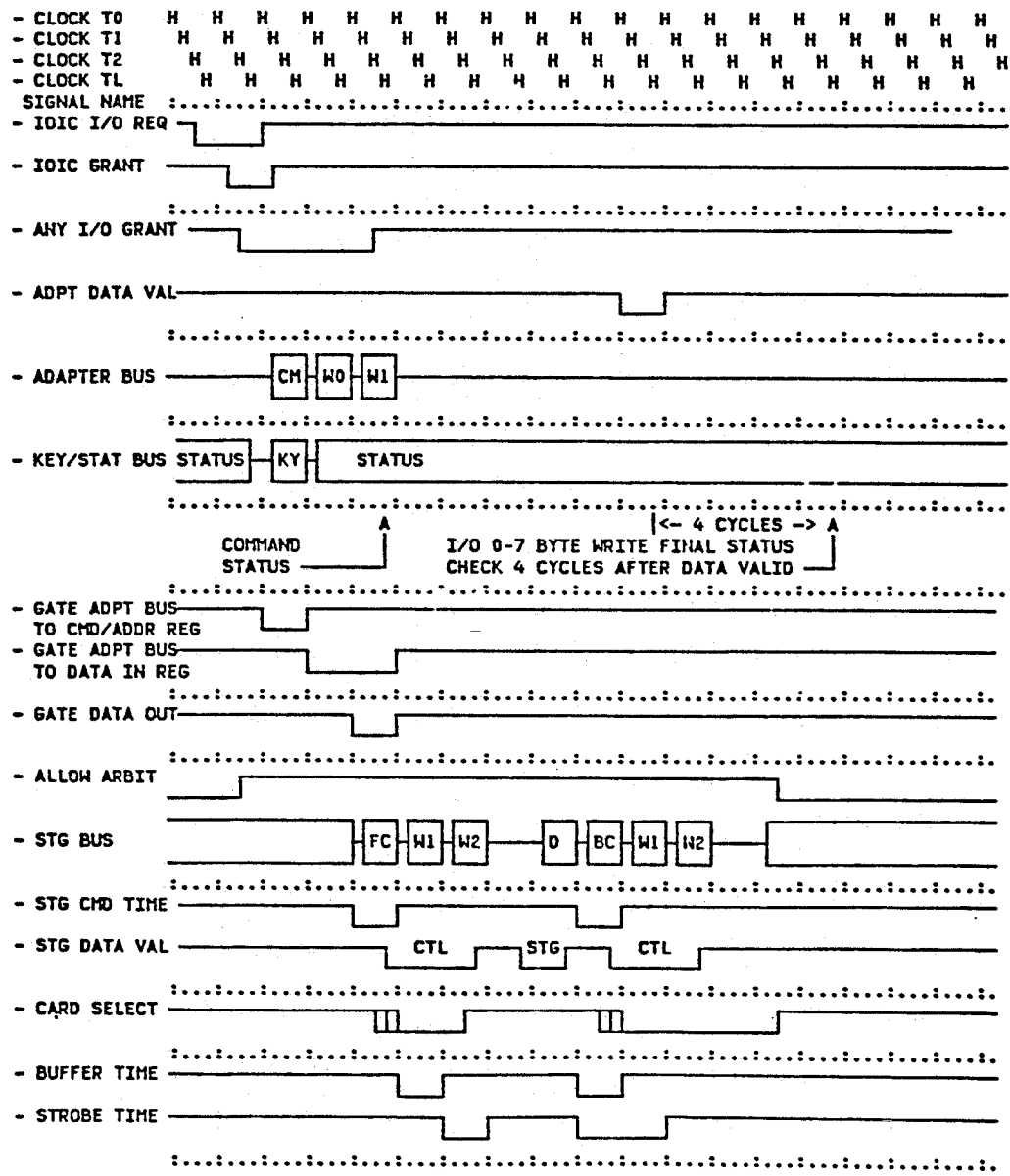

Refer to FIG. 29 for a timing diagram of the I/O RMW Operation.

IOIC COMMAND TIME: The Address/Data Bus Byte 0 contains the Write Command for 1 to 7 bytes of data. Bytes 1,2 and 3 contain the starting address for the storage write. The Key/Status Bus contains the storage protect key.

DATA CYCLES: The 2 cycles which follow immediately after the IOIC Command Time cycle contain the data to be written in Storage. The data is byte aligned and must be on an 8 byte boundary. The first word transferred will end up in the Data Out Register 60b, while the second word transferred will end up in the Data In Register 60a. The data is sent out on the Storage Bus twice, once during the Read operation and then during the Write operation. This allows the Data Cache 10c to modify the Cache during the read portion of the Read Modify Write operation if the data is presently in the cache and the data has been modified prior to this access.

STATUS TIME: The write status from the IOIU is sent to the IOIC on the fourth cycle after ADAPTER DATA VALID line comes active.

3. MESSAGE ACCEPTANCE OPERATION: Message Acceptance Operations on the Adapter Bus look just like a Write to Storage. The difference is as follows: the IOIC does not send an address to the IOIU; instead, it puts a message priority value on the key status (K/S) Bus 10n2, which is clocked into I/O Key Register 60f. This priority value is used to select Message Buffer Origination Register 0 60p or Message Buffer Origination Register 1 60q which provides the address to the storage bus at Storage Command Time.

A. MESSAGE ACCEPTANCE to STORAGE

Figure 30:
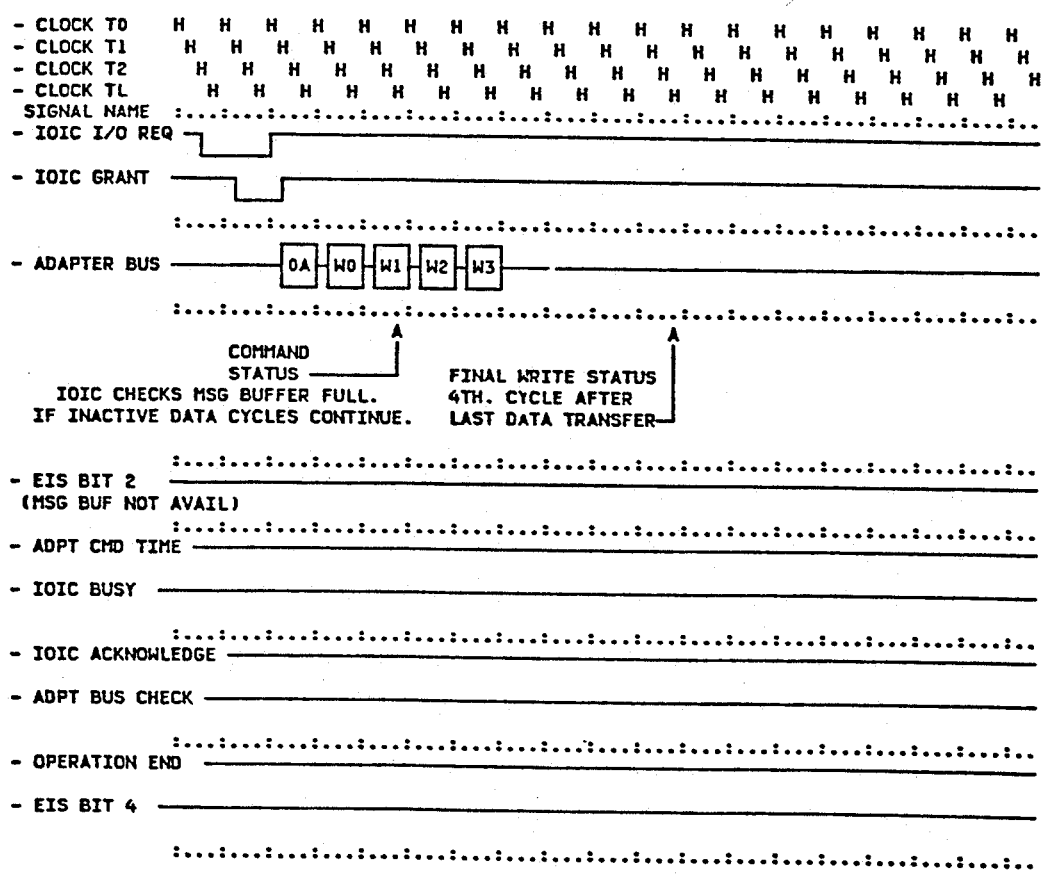

Refer to FIG. 30 for a timing diagram of the I/O Message Acceptance Operation.

IOIC COMMAND TIME: The Address/Data Bus Byte 0 contains the Command code point of X'0A'. Bytes 1,2 and 3 contain good parity. The Key/Status Bus contains the message priority value.

DATA VALID: The 4 cycles which follow immediately after the IOIC Command Time cycle contain the following information to be written in Storage
A/D bus contents during Select Cycle on the SPD bus.
A/D bus during the first Data Cycle on the SPD bus.
A/D bus during the second Data Cycle on the SPD bus.
Message Acceptance Status Word (MASW).

(iv) The SPD I/O Bus 10t-10w

In FIG. 19, the spd I/O bus 10t-10w comprises an address data bus 10t1, a command status bus 10t2, an origin destination bus 10t3, and a control line group 10t4. The control line group 10t4 includes REQUEST BUS, ACKNOWLEDGE BUS, BUS GRANT, MONITOR CLOCK, BUS CLEAR, BOARD SELECT, to arbiter BCU 50, and MASTER STEERING (MST), SLAVE READY, MASTER SELECT (MSEL), and POWER ON RESET, to the adapter/SPD bus control logic 30 and 40.

The SPD I/O Bus is the asynchronous interface between the IOIC and the I/O Bus Units (IOBU). It consists of three buses, thirteen control lines and three signal lines for polling. The Address/Data Bus is a 36 bit, tri-state bi-directional bus, consisting of 4 bytes with parity. The Command/Status Bus is a 9 bit, tri-state bi-directional bus, consisting of 1 byte with parity. The Origin/Destination Bus is a 6 bit, tri-state bi-directional bus, consisting of 5 bits plus parity. The control line group is broken down into four groups. They are:

1. TAG LINES
   Master Steering
   Master Select
   Slave Ready
2. DIRECT SELECTION LINES
   Card Select
   Board Select
3. ARBITRATION LINES
   Request Bus
   Request Priority 0-2
   Acknowledge Bus
   Acknowledge Bus Pol In/In'
   Acknowledge Bus Pol Out
   Bus Grant
4. CONTROL LINES
   Bus Clear
   Monitor Clock
   Power On Reset In FIG. 19, the SPD bus 10t-10w comprises an address data bus 10t1. The following paragraphs will provide the address data bus 10t1 signal descriptions.

ADDRESS DATA BUS SELECT CYCLE: The A/D Bus is driven by the bus master and must be valid prior to Master Select and remain valid until Slave Ready. When the IOIC is master it drives the data from the Select Data Buffer to the A/D Bus. When the IOIC is slave it stores all four bytes of data from the A/D Bus in Data Buffer 0, byte 0 in the Key Buffer, and bytes 1-3 in the Address 33 Register or the Diagnostic Buffer.

ADDRESS DATA BUS DATA CYCLE (WRITE) The A/D Bus is driven by the bus master and must be valid prior to Master Select and remain valid until Slave Ready. When the IOIC is master it drives the data from the Message Buffers to the A/D Bus. When the IOIC is slave it stores the data from the A/D Bus in the Data Buffers.

ADDRESS DATA BUS DATA CYCLE (READ): The A/D Bus is driven by the bus slave and must be valid prior to Slave Ready and remain valid until the deactivation of Master Select. When the IOIC is master it stores the data from the A/D Bus in the Message Buffers. When The IOIC is slave, it drives the A/D BUS with the ICCR Status Register or with the Diagnostic Buffer.

In FIG. 19, the SPD bus 10t–10w comprises a command status (C/S) bus 10t2.

SELECT CYCLE: the C/S Bus is driven by the bus master and must be valid prior to Master Select and remain valid until Slave Ready. When the IOIC is master it drives bits 5–7 and 11–15 of the Command Register to the C/S Bus.

Refer to FIG. 25 for a description of the C/S bus command bits.

DATA CYCLE: the C/S Bus is driven by the bus slave and must be valid prior to Slave Ready and remain valid until the deactivation of Master Select. When the IOIC is master, it stores the status from the C/S Bus in the MOSW Status Register.

Refer to FIG. 26 of a description of the C/S bus status bits.

In FIG. 19, the SPD bus 10t–10w comprises an SPD n destination bus 10t3.

ORIGIN/DESTINATION BUS SELECT CYCLE: The O/D Bus is driven by the bus master and must be valid prior to Master Select and remain valid until Slave Ready. When the IOIC is master it drives bits 27–31 of the Command Register to the O/D Bus.

ORIGIN/DESTINATION BUS DATA CYCLE (NORMAL): The O/D Bus is driven by the bus master with its address so the slave will know the origin address. The master's origin address must be valid prior to Master Select and remain valid until the activation of Slave Ready of each data cycle; and the O/D bus value must be the same for each data cycle of a bus operation.

ORIGIN/DESTINATION BUS DATA CYCLE (DIRECT): The O/D Bus is driven by the bus slave with its address so that the BCU can put the address in the MOSW Status Register. The slave address must be valid prior to Slave Ready and remain valid until the deactivation of Master Select.

In FIG. 19, refer to the control line group 10t4. The SPD bus 10t–10w comprises the following tag lines, which are a part of the control line group 10t4:

1. MASTER SELECT (MSEL)

SELECT CYCLE: The MSEL line indicates the start of a bus operation cycle. In response to Bus Grant, MSEL indicates bus mastership by an IOBU. MSEL indicates validity of the A/D Bus, the C/S Bus, and the O/D Bus. MSEL is interlocked with Slave Ready and Acknowledge Bus.

DATA CYCLES: MSEL indicates validity of the buses driven by the bus master and is interlocked with Slave Ready.

2. SLAVE READY (RDY)

SELECT CYCLE: The RDY line response to MSEL indicates that information on the A/D Bus, the C/S Bus, and the O/D Bus has been received.

DATA CYCLES A RDY response to MSEL indicates that the information sent by the Master has been received and indicates validity of information being sent to the Master.

3. MASTER STEERING (MST)

SELECT CYCLE: The MST line is activated by the bus master and received by the bus arbiter.

DATA CYCLES The deactivation of MST by the bus operation is complete and that Bus Grant may be activated to start a new operation.

Still referring to FIG. 19, the SPD bus 10t–10w comprises the following direct selection lines which are a part of the control line group 10t4.

1. CARD SELECT (CS)

SELECT CYCLE: The CS line used in conjunction with Board Select indicates selection when doing direct selection. The CS line is an input required by all IOBU's other that the BCU. The source of the CS line is a different A/D Bus line (from bit position 0–15) for each IOBU card location. For example, A/D Bus bit 0 for the first card location, bit 2 for the second and so on.

2. BOARD SELECT (BS)

SELECT CYCLE: The BS line used in conjunction with Card Select indicates selection when doing direct selection. The BS line is an input required by all IOBU's other that the BCU. The source of the BS line is a driver on each board which decodes A/D Bus bits 29–31 to determine if the board select line should be activated. For example, A/D Bus bits 29–31 all zero the IOIC will drive BS.

FIG. 19, the SPD bus 10t–10w comprises the following arbitration lines which are a part of the control line group 10t4.

1. REQUEST BUS (REQB)

The REQB line is activated by IOBUs and received by the bus arbiter when services of the SPD Bus are required by the IOBU.

2. REQUEST PRIORITY 0–2 (REQP0–2)

The REQP0–2 lines are priority level requests associated with the bus request indicated by REQB. Four levels of priority are possible with REQB and REQP0 being the highest and REQB with no priority lines active being the lowest. An IOBU which has REQB active must compare its priority with the level indicated on the REQPn lines and if it has a lower priority it must propagate the poll.

3. ACKNOWLEDGE BUS (ACKB)

The ACKB line from the bus arbiter indicates the beginning of arbitration for the next bus master. The IOBU uses ACKB to sample its requests with REQPn and determine if it will propagate the poll when ABPI and ABPI' are active.

4. ACKNOWLEDGE BUS POLL IN/IN' (ABPI, ABPI')

The ABPI and ABPI' lines are required by all IOBUs to support arbitration. Each IOBU provides internal termination for ABPI and ABPI' which allows the removal of an IOBU from a serial string without breaking the propagation path.

5. ACKNOWLEDGE BUS POLL OUT (ABPO)

The ABPO line is an output required by all IOBUs to support arbitration. The ABPO line is activated by an IOBU when ACKB is active and its request is inactive or lower in priority than other requests and ABPI and ABPI' are active.

6. BUS GRANT (BUSG)

The BUSG line is activated by the bus arbiter to establish a bus master for the next operation. Bus Grant signals the IOBU that stopped the serial poll that it is bus master for one bus operation. Activation of MSEL with BUSG active indicates the start of the select cycle to all other IOBUs BUSG is deactivated after MSEL is deactivated.

In FIG. 19, the SPD bus 10t–10w comprises control lines, a part of control line group 10t4.

1. BUS CLEAR (BC)

The Bus Clear line is driven by the BCU 50 and causes the following actions:

An IOBU in an operation will immediately stop that operation and deactivate all buses and tags;

All other IOBUs will deactivate all buses and tags while Bus Clear is active.

2. MONITOR CLOCK (MC)

The Monitor Clock line is driven by the BCU and is activated following the detection of a time out. Monitor Clock is an input to all IOBUs and signals them to collect status.

3. POWER ON RESET (POR)

The POR line is active for all power on and off sequences for a power domain POR is driven by the power supply associated with the power domain. The following actions occur with POR:

Arbitration is suppressed;

IOBU addresses are set to zero; and

Deactivate drivers by putting tristate drivers in high impedance state and the other drivers in the inactive state.

A functional description of the SPD bus 10*t*–10*w* will be set forth in the following paragraphs with reference, initially, to FIG. 1 and FIG. 19 of the drawings. FIG. 1 is needed to visualize the relationship between the SPD bus and other IOBUs 10*p*–10*s*. FIG. 19 is needed to visualize the structure of the SPD bus 10*t*–10*w*.

There are two basic SPD I/O Bus operations: (1) Storage Operations, and (2) Unit Operations. Each of these operation will be discussed in detail in the following paragraphs.

1. STORAGE OPERATIONS on the SPD I/O Bus transfers packets of one to thirty-two bytes of data between the IOBU 10*p*–10*s* and common storage facility 10*d*. A packet consists of one select cycle and from one to eight data cycles The IOIC, in this implementation, is always the slave during Storage Operations. A storage sequence is indicated by bit 0 of the SPD command being equal to zero. Bit 1 being on indicates a write and bits 2-7 plus one is the number of bytes to be transferred.

Refer to FIG. 23 for a table of SPD storage commands.

STORAGE WRITE to STORAGE

SELECT CYCLE The Master I/O Bus Unit (IOBU) puts information on the O/D Bus 10*t*3, the C/S Bus 10*t*2 and the A/D Bus 10*t*1. The O/D Bus 10*t*3 contains the address of the IOIC which is X'00'. The C/S Bus 10*t*2 contains the Write command plus the number of bytes of data to be transferred. The A/D Bus 10*t*1 contains the Key in byte 0 and the starting common storage facility address in bytes 1,2, and 3.

DATA CYCLES The Master I/O Bus Unit (IOBU) puts its address on the O/D Bus 10*t*3 and a word of byte aligned data on the A/D Bus 10*t*1. The size of the packet of data can cause up to eight Data Cycles. The IOIC buffers the data in the IOIC DATA BUFFERS until the whole packet of data has been transferred from the IOBU Master. The IOIC generates common storage facility commands and transfers the data from the the buffers to storage. The IOIC puts the completion status on the C/S Bus 10*t*2 after the data has been transferred to the Common Storage Facility 10*d* and storage status has been received by the IOIC.

STORAGE READ from STORAGE

SELECT CYCLE The Master I/O Bus Unit (IOBU) puts information on the O/D Bus 10*t*3, the C/S Bus 10*t*2 and the A/D Bus 10*t* 1. The O/D Bus 10*t*3 contains address of the IOIC which is X'00'. The C/S Bus 10*t*2 contains the Read command plus the number of bytes of data to be transferred. The A/D Bus 10*t*1 contains the Key in byte 0 and the starting common storage facility address in bytes 1,2, and 3.

DATA CYCLES: The Master I/O Bus Unit (IOBU) puts its address on the O/D Bus 10*t*3. The IOIC generates an common storage facility command and receives data from storage and buffers it in the IOIC DATA BUFFERS The IOIC puts a word of byte aligned data from the buffers on the A/D Bus 10*t*1 after it has received the data and status from the Common Storage Facility 10*d*. The size of the packet of data can cause up to eight Data Cycles. The IOIC also puts the completion status on the C/S Bus 10*t*2 during the last Data Cycle.

2. UNIT OPERATIONS provide a means of communications between IOBUs without having to utilize storage. Unit Operations will always have one select cycle and two data cycles. A unit operation sequence is indicated by bit 0 of the SPD command being equal to one. Bit 1 being on indicates a write and bit 2 on indicates direct select. Bits 3-7 are the unit operation command code.

Refer to FIG. 24 for a table of SPD bus unit operation commands.

UNIT WRITE transfers 8 bytes of data from the IOBU Master to the IOBU Slave.

SELECT CYCLE The Master puts information on the O/D Bus 10*t*3, the C/S Bus 10*t*2 and the A/D Bus 10*t*1. The O/D Bus 10*t*3 contains the address of the Slave and the C/S Bus 10*t*2 contains the write command. The A/D Bus 10*t*1 contains 4 bytes of machine dependent data.

DATA CYCLES: The Master puts its address on the O/D Bus 10*t*3 and data on the A/D Bus 10*t*1 both cycles. The Slave puts its completion status on the C/S Bus 10*t*2 at the end of the last Data Cycle.

UNIT READ transfers 8 bytes of data from the IOBU Slave to the IOBU Master.

SELECT CYCLE: The Master puts information on the O/D Bus, the C/S Bus and the A/D Bus. The O/D Bus contains the address of the Slave and the C/S Bus contains the read command. The A/D Bus contains 4 bytes of machine dependent data.

DATA CYCLES The Master puts its address on the O/D Bus. The Slave puts data on the A/D Bus both cycles and its completion status on the C/S Bus at the end of the last Data Cycle.

UNIT WRITE DIRECT transfers 8 bytes of data from the IOIC Master to the IOBU Slave. The Board Select and Card Select lines, of the control line group 10*t*4, are used to select the IOBU Slave.

SELECT CYCLE: The IOIC Master puts information on the O/D Bus, the C/S Bus and the A/D Bus. The O/D Bus contains the Slave address for a write command and the C/S Bus contains the write command. The A/D Bus contains the card and board select data.

DATA CYCLES: The IOIC Master puts data on the A/D Bus both cycles. The Slave puts its address on the O/D Bus and its completion status on the C/S Bus at the end of the last Data Cycle.

UNIT READ DIRECT transfers 8 bytes of data from the IOBU Slave to the IOIC Master. The Board Select and Card Select lines are used to select the IOBU Slave.

SELECT CYCLE: The Master puts information on the O/D Bus, the C/S Bus and the A/D Bus. The O/D Bus contains good parity and the C/S Bus contains the read command. The A/D Bus contains the card and board select data.

DATA CYCLES: The IOBU Slave puts its address on the O/D Bus. The Slave puts data on the A/D Bus both cycles and its completion status on the C/S Bus at the end of the last Data Cycle.

An SPD bus MESSAGE ACCEPTANCE OPERATION is like Unit Write and the IOIC is always the slave. The SPD Op Code is C0-CF and the IOIC will send the data to an IPU Message Buffer in storage.

SELECT CYCLE The Master IOBU puts '00' on the O/D Bus, 'CX' on the C/S Bus and the A/D Bus contains 4 bytes of machine dependent data which is put into the first IOIC DATA BUFFER.

DATA CYCLES: The Master IOBU puts its address on the O/D Bus and data on the A/D Bus both cycles. The IOIC buffers the two words of A/D Bus data in the second and third IOIC DATA BUFFERS and puts the Message Acceptance Status Word (MASW) in the fourth IOIC DATA BUFFER. The IOIC sends an '0A' IPU Common Storage Facility command to the IOIU followed by the four words in the data buffers. The IOIU knows the next address of the IPU Message Buffer and stores the data. The IOIC puts the completion status on the C/S Bus after the data has been transferred to the Common Storage Facility 10d and storage status has been received by the IOIC.

In the following paragraphs, a description of the arbitration scheme practiced by the BCU 50 is set forth. In practicing the arbitration scheme, the BCU 50 receives requests for access to an SPD bus (one of 10t-10w) from an IOIC (one of 10j-10m) or from one or more IOBUs 10p-10s. The BCU 50 will determine which one of the IOICs or the IOBUs will be granted access to the SPD bus.

Figure 18A:
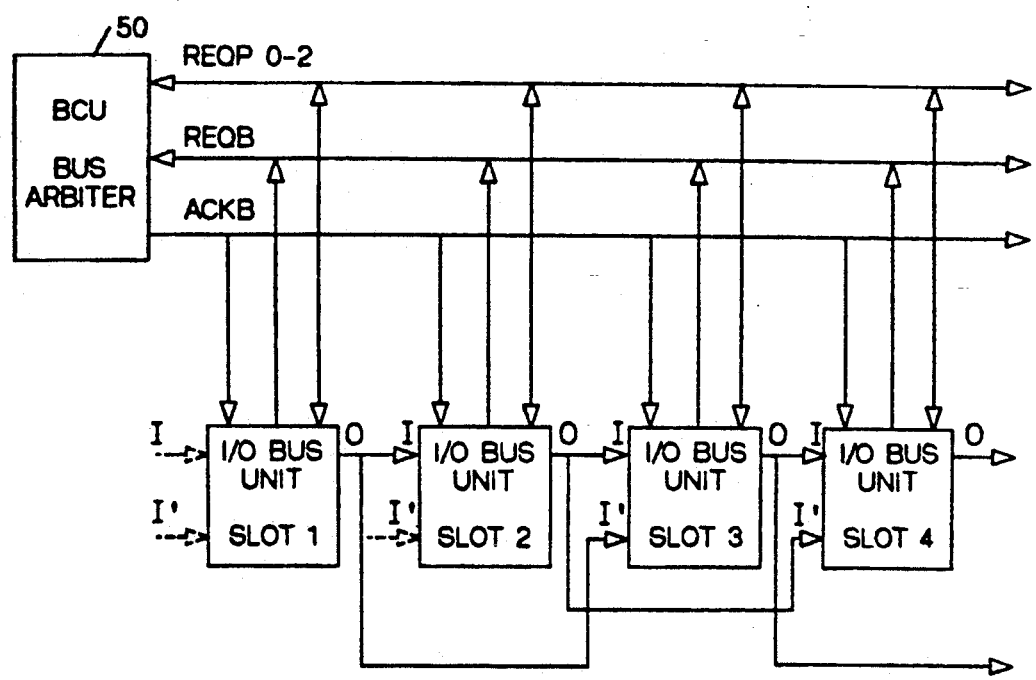
FIG. 18a is a schematic of an input output interface controller (IOIC) and other input output bus units (IOBU), including three sub buses which comprise the SPD bus for the purpose of illustrating the function of the Bus Control Unit 50 of FIG. 2.

Referring to FIG. 18a, another schematic of the IOIC 10j-10m, including BCU 50, is illustrated in conjunction with four other IOBUs 10p-10s. In FIG. 18a, an IOIC includes SPD bus arbiter BCU 50. Other IOBUs are also illustrated. The IOIC is connected to a number of card slots in which circuit cards are disposed, namely, card slots 1, 2, 3, and 4. Slot 1 has priority over slot 2, by virtue of its position, slot 2 having priority over slot 3, by virtue of its position, etc. The following buses are connected to each of the circuit cards in each card slot as indicated in FIG. 18a: the REQ BUS, the REQ P0, the REQ P1, and the REQ P2. The following additional buses of FIG. 3, are connected to each of the circuit cards: the C/S bus 10t2, the O/D bus 10t3, and the A/D bus 10t1. The bus arbiter BCU 50 is disposed within the IOIC, the arbiter having a pin 0. Each circuit card in each card slot 1 through 4 have pins I, I', and 0. Pin I and pin I' are not connected to an external active source but are pulled on by an internal active source. Pin 0 of slot 1 is connected to pin I of slot 2 and to pin I' of slot 3. Pin 0 of slot 2 is connected to pin I of slot 3 and to pin I' of slot 4. Pin 0 of slot 3 is connected to pin I of slot 4, etc.

A functional description of the arbitration scheme practiced by the SPD bus arbiter BCU 50 will be described in the following paragraphs with reference to FIG. 18a of the drawings.

Pin I and pin I' are pulled high by an internal source in the IOBU because they are not connected to an external source. Circuit card 1 then looks at the status of its REQ BUS pin, REQ P0 pin, REQ P1 pin, and its REQ P2 pin when the acknowledge bus (ACKB) signal is activated by the arbiter in the BCU 50. If its REQ BUS pin is high, it then looks to the status of its other pins: REQ P0, REQ P1, and REQ P2. If the other pins are high, and circuit card 1 did not cause these other pins to go high, circuit card 1 will defer to the next card in slot 2 or 3 by turning on its Acknowledge Bus Poll Out 0 (ABPO 0) in FIG. 18a. Circuit card 2 of slot 2 will look to its REQ BUS pin, and REQ P0, REQ P1, and REQ P2 pins. If its REQ BUS pin is high, and its REQ P0, REQ P1, and/or REQ P2 pin is high, but circuit card 2 did not cause the REQ P0, REQ P1, and REQ P2 pins to go high, circuit card 2 will defer to the next card in slot 3 or 4 by turning on its ABPO (0) in FIG. 18a. Assume that circuit card 3 of slot 3 examines its pins, and discovers the REQ BUS pin is high, the REQ P0 pin is high, the REQ P1 pin is high, and the REQ P2 pin is high. Assume that circuit card 3 of slot 3 caused its REQ P0, REQ P1, REQ P2 pins to go high Therefore, circuit card 3 of slot 3 (one of the IOBUs attached to the SPD bus) gets access to the SPD bus.

TIMEOUTS are set by the BCU when an IOBU fails to complete an operation within a specific period of time. There are two kinds of timeouts.

Bus Idle Timeout will occur if there is a request on the SPD Bus and, after arbitration, there is no response to the request by the Master turning on MASTER STEERING and MASTER SELECT control lines.

Bus Operation Timeout will occur if an SPD Bus operation starts but does not complete by turning off MASTER STEERING control line.

DIRECT SELECTION operations can only originate from the BCU. Direct selection commands are unit operations used to communicate with IOBU's which do not have addresses assigned. It is through the direct select commands that the BCU finds out who is on the bus and then writes an address to that IOBU.

ERROR RECOVERY is performed by the BCU through the use of the MONITOR CLOCK and BUS CLEAR control lines.

FIGS. 27 to 32 illustrate timing sequence diagrams for the adapter bus, the diagrams illustrating how different adapter bus 10n interface lines interact and the number of cycles required for each operation.

FIGS. 33 to 39 illustrate timing sequence diagrams for the SPD bus, the diagrams further illustrating how the different SPD bus interface lines interact, and illustrate the tag sequences required for each operation.

(v) Functional description of the SPD bus, IOIC, Adapter bus, and Storage Controller operating in combination A functional description of the operation of the SPD bus 10t-10w, input output interface controller (IOIC) 10j-10m, the adaptor bus 10n, and the Storage Controller 10e, 10g operating in combination will be described in the following paragraphs with reference to FIGS. 1-39 of the drawings.

1. COPY TYPE PROCESSOR BUS OPERATIONS (PBO) TO AN IOIC 10j-10m

A. Copy MOSW

The Message Origination Status Word (MOSW) of FIG. 5 of an addressed IOIC is sent to the IPU 10a and the contents of the MOSW is not changed.

A PBO operation to an IOIC starts when the IOIU 10e of FIG. 1 transmits to the IOICs "ADAPTER COMMAND TIME" to tell all the IOIC's that the ADAPTER A/D BUS 10n1 of FIG. 19 contains an IOIC PBO Command. See FIG. 32 for the applicable timing sequence. The adapter bus control logic 30 of FIG. 10 PBO Sequencer 30c loads the PBO command from the ADAPTER A/D BUS 10n1 into the Destination Select Register 20h of FIG. 3 and FIG. 4, and the IOIC Match logic 30a of FIG. 10 compares the PBO address with the IOIC Hardware Address. If the addresses match, the PBO Facility logic 30b of FIG. 10 decodes the PBO Command determining that it is a 'DA' command FIG. 21). Then, the PBO facility logic 30b sets the status register 20g controls so that, on the third cycle of the PBO, the data in the MOSW register of FIG. 5 will be gated to the ADAPTER A/D BUS 10n1. Also, on the third cycle, the IOIC Match logic 30a of FIG. 10 will send IOIC ACKNOWLEDGE if the PBO address and a IOIC hardware address matched.

B. Move MOSW

The Message Origination Status Word (MOSW) register of FIG. 5, of the addressed IOIC, is sent to the IPU 10a, and, if the Operation End bit is on (MOSW(0)=1), then the remaining bits in the MOSW are set to zero. If the Op End bit is off (MOSW(0)=0), then the MOSW of FIG. 5 is not changed.

A PBO operation to an IOIC 10j-10m starts when the IOIU 10e transmits ADAPTER COMMAND TIME to the IOICs to tell all the IOIC's that the ADAPTER A/D BUS 10n1 of FIGS. 3 and 19 contains an IOIC PBO Command. See FIG. 32 for the applicable timing sequence. The adapter bus control logic 30 of FIG. 10 PBO Sequencer 30c loads the ADAPTER A/D BUS 10n1 into the Destination Select Register 20h of FIG. 3 and the IOIC Match logic 30a of FIG. 10 compares the PBO address with the IOIC Hardware Address. If the addresses match, the PBO Facility logic 30b of FIG. 10 decodes the Adapter Command to find that it is a 'D8' (see FIG. 21) and then sets the status register 20g controls so that, on the third cycle of the PBO, the data in the MOSW register of FIG. 5 will be gated to the ADAPTER A/D BUS 10n1. Also, on the third cycle, the IOIC Match logic 30a of FIG. 10 will send IOIC ACKNOWLEDGE if the PBO address and a IOIC hardware address matched. After the MOSW register of FIG. 5 has been sent to the IPU 10a, the PBO Facility logic 30b of FIG. 10 checks the Op End bit and, if it is on, resets the rest of the MOSW bits to zero.

2. LOAD TYPE PBO'S TO IOIC

A. Load Message Buffer Reg 1

The Message Buffer Register 1 (MBR1) 20b of FIG. 3 is loaded with four bytes of data from the IPU 10a. If the Message Origination facility is busy, that is, if bit 1 of the MOSW register of FIG. 5 is a binary 1 (MOSW(1)=1), the message buffer register 20b is not loaded.

A PBO operation to an IOIC starts when the IOIU 10e of FIG. 1 sends "ADAPTER COMMAND TIME" to all IOICs in order to tell the IOIC's that the ADAPTER A/D BUS 10n1 contains an IOIC PBO Command (See FIG. 31 for the timing sequence). The adapter bus control logic 30 PBO Sequencer 30c loads the contents of the ADAPTER A/D BUS 10n1 into the Destination Select Register 20h of FIG. 3 (and FIG. 4) and the IOIC Match logic 30a of FIG. 10 compares the PBO address with the IOIC Hardware Address and checks for SPD Busy. If the addresses match and the spd bus is not busy, the PBO Facility logic 30b decodes the PBO Command to find that it is a '9E' (see FIG. 21) and then sets the message buffer 20b controls so that, on the second cycle of the PBO, the data on the ADAPTER A/D BUS 10n1 will be set into the MBR1 buffer 20b of FIG. 3. On the third cycle of the PBO, the IOIC Match logic 30a of FIG. 10 will send IOIC ACKNOWLEDGE to the IOIU 10e if the PBO address and a IOIC hardware address matched or IOIC BUSY if the address matched and the Message Origination facility (MOSW) is busy.

B. Reset ICSW under mask

In this operation, the contents of the Selector Buffer 20e of FIG. 3 are "ones complemented" and then ANDed with the bits of the IOIC Status Word (ICSW) register of FIG. 8 within the status registers 20g of FIG. 3.

A PBO operation to an IOIC starts when the IOIU 10e transmits "ADAPTER COMMAND TIME" to the IOICs to tell all the IOIC's that the ADAPTER A/D BUS 10n1 of FIG. 3 and 19 contains an IOIC PBO Command. See FIG. 31 for an applicable timing sequence. The adapter bus control logic 30 of FIG. 10 PBO Sequencer 30c loads the ADAPTER A/D BUS 10n1 into the Destination Select Register 20h of FIG. 3, and FIG. 4, in the first PBO cycle, and into the Selector Buffer 20e of FIG. 3 in the second cycle. The IOIC Match logic 30a of FIG. 10 compares the PBO address with the IOIC Hardware Address. If the addresses match, the PBO Facility logic 30b of FIG. 10 decodes the Adapter Command to find that it is a '99' (see FIG. 21) and then sets the status register 20g controls so that, after the second cycle, contents of the Selector Buffer 20e of FIG. 3 are "ones complemented" and then ANDed with the bits in the ICSW of FIG. 8. Only the bits on in the Selector Buffer 20e will have their corresponding bits in the ICSW reset to zero. On the third cycle of the PBO, the IOIC Match logic 30a will send IOIC ACKNOWLEDGE to the IOIU 10e if the PBO address and a IOIC hardware address matched.

3. UNIT OPERATION PROCESSOR BUS OPERATIONS (PBO) TO IOIC

A. Unit Operation Write

This instruction requests a unit write operation on the specified SPD I/O bus (one of buses 10t-10w). If the Message Origination facility is busy, that is, MOSW(1)=1, there is no change in the state of the IOIC.

A PBO operation to an IOIC starts when the IOIU transmits "ADAPTER COMMAND TIME" to the IOICs to tell all the IOIC's that the ADAPTER A/D BUS 10n1 contains an IOIC PBO Command. See FIG. 31 for the applicable timing sequence The adapter bus control logic 30 PBO Sequencer 30c of FIG. 10 loads the ADAPTER A/D BUS 10n1 into the Destination Select Register 20h of FIG. 3, and FIG. 4, in the first PBO cycle and into the Selector Buffer 20e in the second cycle. The IOIC Match logic 30a of FIG. 10 compares the PBO address with the IOIC Hardware Address and checks for SPD Busy. If the addresses match and the SPD bus is not busy, the PBO Facility logic 30b of FIG. 10 decodes the Adapter Command to find that it is a '96'(See FIG. 21) and then, if the Message Origination Facility is not busy, uses the load command buffer controls to move the Selector Buffer 20e of FIG. 3 to the Select Data Buffer 20f of FIG. 3 and the Dest Select Register 20h to the Command Register 20i of FIG. 3. On the third cycle of the PBO, the IOIC Match logic 30a will send IOIC ACKNOWLEDGE to the IOIU 10e if the PBO address and a IOIC hardware address matched or IOIC BUSY if the address matched and the Message Origination facility is busy. The PBO Facility 30b of FIG. 10 sends a request to the SPD Bus Control logic 40 of FIG. 2 which accepts this instruction and then resets MOSW bits 0,8, and 27-31 of FIG. 5. The Message Origination facility becomes busy (MOSW(1)=1). The IOIC SPD Master Control unit 40a of FIG. 12 sends a REQB for a SPD bus operation to the BCU 50 of FIG. 2. The Master Control unit 40a takes the ACKB from the BCU 50 and, if no other IOBU has higher priority, it blocks the ACKB from going out to the SPD Bus and waits for BUSG. When the Master Control unit 40a receives BUSG, it starts the SPD Unit Write operation select cycle (See FIG. 35 for the SPD bus sequence) by driving the SPD A/D Bus 10t1, C/S Bus 10t2, O/D Bus 10t3 of FIG. 19, and Master Steering (MST) of control line group 10t4. The Select Data Buffer 20f is sent to the SPD A/D Bus 10t1, the SPD bus command field of the Command Register 20i to the C/S Bus 10t2, and the destination field of the Command Register 20i to the O/D Bus 10t3 of FIG. 19 (See FIG. 4 for a description of the Dest Sel Register 20h which is equal to the data in the Command register 20i). After the data on the buses settles down, the Master Control 40a drives MSEL telling the slave IOBU that the bus data is valid. The slave IOBU tells the IOIC to continue by raising RDY. The master control 40a drops MSEL and stops driving the buses After MSEL drops, the BCU 50 drops BUSG and the slave IOBU drops RDY to end the select cycle. The first data cycle starts when the Master Controller 40a drives the A/D Bus with the data in Message Buffer 1 and the O/D Bus with the IOIC address '00. Next, the Master Control 40a sets the C/S Bus to receive and, after the buses settle, raises MSEL to indicate that the bus data is valid. The slave drives the C/S Bus with status (FIG. 26) if there is an error and, after waiting for the bus to settle, raises RDY. The master control 40a drops MSEL and stops driving the A/D Bus. The slave drops RDY and stops driving the C/S Bus to end the first data cycle. The second data cycle starts when the Master Controller 40a drives the A/D Bus with the data in Message Buffer 2. After the A/D Bus settles, the Master Controller 40a raises MSEL to indicate that the bus data is valid. The slave drives the C/S Bus with ending status or error status if there was an error and, after waiting for the bus to settle, raises RDY. The master 40a drops MSEL and stops driving the A/D Bus and O/D Bus. The slave drops RDY and stops driving the C/S Bus and then the Master Control drops MST. The MOSW receives the ending status from the C/S Bus which causes the Op End (MOSW(0)) bit to come on and the Busy (MOSW(1)) bit to turn off to end the operation.

B. Unit Operation Read

This instruction requests a unit read operation on the specified SPD I/O bus If the Message Origination facility is busy (MOSW(1)=1), there is no change in the state of the IOIC.

A PBO operation to an IOIC starts when the IOIU sends ADAPTER COMMAND TIME to tell all the IOIC's that the ADAPTER A/D BUS contains an IOIC PBO Command. (See FIG. 31 for timing sequence). The adapter bus control logic PBO Sequencer 30c loads the ADAPTER A/D BUS into the Destination Select Register 20h in the first PBO cycle and into the Selector Buffer 20e in the second cycle. The IOIC Match logic 30a compares the PBO address with the IOIC Hardware Address and checks for SPD Busy. If the address match and the SPD bus is not busy, the PBO Facility logic 30b decodes the Adapter Command to find that it is a '94' (FIG. 21) and then, if the Message Origination is not busy, uses the load command buffer controls to move the Selector Buffer 20e to the Select Data Buffer 20f and the Dest Select Register 20h to the Command Register 20i. On the third cycle of the PBO, the IOIC Match logic 30a will send IOIC ACKNOWLEDGE if the PBO address and a IOIC hardware address matched or IOIC BUSY if the address matched and the Message Origination facility is busy. The PBO Facility 30b sends a request to the SPD Bus Control logic 40, which accepts this instruction and then resets MOSW bits 0,8, and 27-31. The Message Origination facility becomes 20 busy (MOSW(1)=1). The IOIC SPD Master Control unit 40a sends a REQB for a SPD bus operation to the BCU 50. The Master Control unit 40a takes the ACKB from the BCU 50 and, if no other IOBU has higher priority, it blocks the ACKB from going out to the SPD Bus and waits for BUSG. When the Master Control unit 40a receives BUSG, it starts the SPD unit Read operation select cycle (See FIG. 37 for the SPD bus sequence) by driving the SPD A/D Bus 10t1, C/S Bus 10t2, O/D Bus 10t3 of FIG. 19, and MST. The Select Data Buffer 20f is sent to the SPD A/D Bus 10t1, the SPD bus command field of the Command Register 20i to the C/S Bus 10t2, and the destination field of the Command Register 20i to the O/D Bus. After the data on the buses settles down, the Master Control 40a drives MSEL telling the slave IOBU that the bus data is valid. The slave IOBU tells the IOIC to continue by raising RDY. The master control 40a drops MSEL and stops driving the buses. After MSEL drops, the BCU drops BUSG and the slave drops RDY to end the select cycle. The first data cycle starts when the Master Controller 40a drives the O/D Bus 10t3 with the IOIC address '00.

Next, the Master Control 40a sets the A/D Bus 10t1 and the C/S Bus 10t2 to receive and, after the O/D Bus 10t3 settles, raises MSEL to indicate that the data is valid The slave IOBU drives the A/D Bus 10t1 with data which is put in the Message Buffer 1 (see FIG. 19) and the C/S Bus 10t2 with status if there is an error. After waiting for the bus to settle, the slave IOBU raises RDY. The master control 40a drops MSEL after buffering the data in the MBR1 buffer. The slave IOBU drops RDY and stops driving the A/D Bus 10t1 and C/S Bus 10t2 to end the first data cycle. The second data cycle starts when the Master Controller 40a raises MSEL to indicate that the master is ready for more data. The slave IOBU drives the A/D Bus 10t1 with data which is put in the Message Buffer 2 (of FIG. 19) and the C/S Bus 10t2 with ending status or error status if there was an error and, after waiting for the buses to settle, raises RDY. The master 40a drops MSEL after buffering the data in the MBR2 buffer (of FIG. 19) and stops driving O/D Bus 10t3. The slave IOBU drops RDY and stops driving the A/D Bus 10t1 and C/S Bus 10t2 and then the Master Control 40a drops MST. The MOSW of FIG. 5 receives the ending status from the C/S Bus 10t2 which causes the Op End (MOSW(0)) bit to come on and the Busy bit (MOSW(1)) to turn off to end the operation.

C. Unit Operation Write Direct

This instruction requests a unit write direct operation on the specified SPD I/O bus (one of 10t-10w). If the Message Origination facility is busy (MOSW(1)=1), there is no change in the state of the IOIC.

A PBO operation to an IOIC starts when the IOIU 10e sends "ADAPTER COMMAND TIME", which tells all the IOIC's that the ADAPTER A/D BUS 10n contains an IOIC PBO Command (See FIG. 31 for timing sequence). The adapter bus control logic 30 PBO Sequencer 30c loads the ADAPTER A/D BUS 10n into the Destination Select Register 20h of FIG. 3 in the first PBO cycle and into the Selector Buffer 20e in the second cycle. The IOIC Match logic 30a of FIG. 10 compares the PBO address with the IOIC Hardware Address and checks for SPD Busy. If the addresses match and the SPD bus is not busy, the PBO Facility logic 30b decodes the Adapter Command to find that it is a '97' (FIG. 21) and then, if the Message Origination is not busy, uses the load command buffer controls to move the Selector Buffer 20e to the Select Data Buffer 20f and the Dest Select Register 20h to the Command Register 20i. On the third cycle of the PBO, the IOIC Match logic 30a will send IOIC ACKNOWLEDGE if the PBO address and a IOIC hardware address matched or IOIC BUSY if the address matched and the Message Origination facility is busy. The PBO Facility 30b sends a request to the SPD Bus Control logic 40 which accepts this instruction and then resets MOSW bits 0,8, and 27-31. The Message Origination facility becomes busy (MOSW(1)=1). The IOIC SPD Master Control unit 40a of FIG. 12 sends a REQB for an SPD bus operation to the BCU 50. The Master Control unit 40a takes the ACKB from the BCU 50 and, if no other IOBU has higher priority, it blocks the ACKB from going out to the SPD Bus and waits for BUSG. When the Master Control unit 40a receives BUSG, it starts the SPD Unit Write Direct operation select cycle (See FIG. 36 for the SPD bus sequence) by driving the SPD A/D Bus 10t1, C/S Bus 10t2, O/D Bus 10t3, of FIG. 19, and MST. The Select Data Buffer 20f is sent to the SPD A/D Bus 10t1, the SPD bus command field of the Command Register 20i to the C/S Bus 10t2, and the destination field of the Command Register 20i to the O/D Bus 10t3. The BCU 50 decodes bits 29-31 of the A/D Bus 10t1 for zeros to drive Board Select. After the data on the buses settles down, the Master Control 40a drives MSEL telling the slave IOBU that the bus data is valid. The slave IOBU is in a card slot that sees both the BOARD SELECT and the CARD SELECT lines in an active condition. The slave IOBU tells the IOIC to continue by raising RDY The master 40a drops MSEL and stops driving the buses. After MSEL drops, the BCU 50 drops BUSG and the slave IOBU drops RDY to end the select cycle. The first data cycle starts when the Master Control 40a drives the A/D Bus 10t1 with the data in Message Buffer 1 (FIG. 19). Next, the Master Control 40a sets the C/S Bus 10t2 and O/D Bus 10t3 to receive and, after the buses settle, raises MSEL to indicate that the bus data is valid. The slave IOBU drives the C/S Bus 10t2 with status (see FIG. 26) if there is an error and the O/D Bus 10t3 with its address After waiting for the buses to settle, the slave IOBU raises RDY. The master 40a puts the O/D Bus 10t3 data in byte 3 of the MOSW, drops MSEL and stops driving the A/D Bus 10t1. The slave IOBU drops RDY and stops driving the C/S Bus 10t2 to end the first data cycle. The second data cycle starts when the Master Controller 40a drives the A/D Bus 10t1 with the data in Message Buffer 2. After the A/D Bus 10t1 settles, the Master Controller 40a raises MSEL to indicate that the bus data is valid. The slave IOBU drives the C/S Bus 10t2 with ending status, or error status if there was an error, and, after waiting for the bus to settle, raises RDY. The master control 40a drops MSEL and stops driving the A/D Bus 10t1. The slave IOBU drops RDY and stops driving the O/D Bus 10t3 and the C/S Bus 10t2; and, then, the Master Control 40a drops MST. The MOSW receives the ending status from the C/S Bus 10t2 which causes the Op End (MOSW(0)) bit to come on and the Busy bit (MOSW(1)) to turn off to end the operation.

4. SPD UNIT OPERATION TO IOIC

A. Message Acceptance Operation

This instruction is an SPD Unit Write operation from an IOBU 10p-10s to an IOIC 10j-10m. The message received from an IOBU 10p-10s is buffered in the IOIC 10j-10m and then sent to the IOIU 10e for storage.

Figure 39:
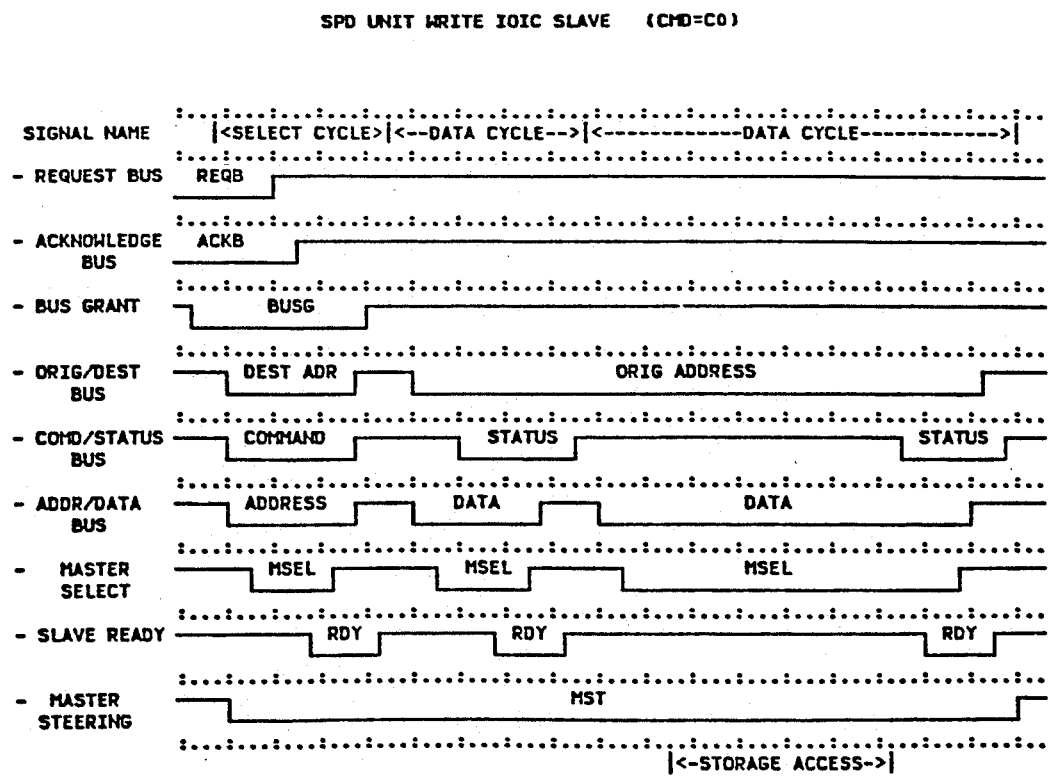

An SPD operation to an IOIC 10j-10m starts when the IOBU 10p-10s of FIG. 1 sends a REQB to the BCU 50 (See FIG. 39 for SPD bus sequence). The BCU 50 of FIG. 11 (and FIG. 2) raises ACKB to start the bus polling and then raises BUSG when the SPD Bus is free to start another operation. The IOBU that raised the REQB captures the poll and, when it sees BUSG, starts the select cycle. The IOBU drives the A/D Bus 10t1, C/S Bus 10t2, O/D Bus 10t3 of FIG. 19 and master steering (MST) of the control line group 10t4. After the data on the buses settles down, the IOBU drives MSEL telling the IOIC Slave Control unit 40b of FIG. 12 that the data is valid. The Slave control 40b decodes the 'C0' command from the C/S Bus 10t2 and matches on '00' from the O/D Bus 10t3. The command on the C/S Bus 10t2 is put in the MASW, a status register 20g of FIG. 3 and FIG. 6; the data on the A/D Bus 10t1 is put in the first Data Buffer 20a; and A/D Bus 10t1 bits 0-5 in the Key Buffer 20c. Then, the IOIC raises RDY to tell the IOBU to continue. During this time, the IOBU drops REQB and the BCU drops ACKB. The IOBU, seeing RDY, drops MSEL and stops driving the buses. After MSEL drops, the IOIC drops RDY and the BCU 50 of FIG. 11 drops BUSG to end the select cycle. The first data cycle starts when the IOBU drives the A/D Bus 10t1 with the data and the O/D Bus 10t3 with its address and, after the buses settle, raises MSEL to indicate that the bus data is valid. The slave control 40b puts the data from the A/D Bus 10t1 into the second Data Buffer 20a and from the O/D Bus 10t3 into the MASW register of FIG. 6. The slave control 40b drives the C/S Bus 10t2 with status if there is an error and, after waiting for the bus to settle, raises RDY. The IOBU 10p-10s drops MSEL and stops driving the A/D Bus 10t1. The IOIC slave control unit 40b of FIG. 12 drops RDY and stops driving the C/S Bus 10t2 to end the first data cycle. The second data cycle starts when the IOBU drives and A/D Bus 10t1 with the data and, after the bus settles, raises MSEL to indicate that the bus data is valid. The slave control 40b puts the data from the A/D Bus 10t1 into the third Data Buffer 20a Now that the IOIC has all of the message, the Slave Control unit 40b turns the operation over to the Adapter Bus Controls 30 of FIG. 2 and holds the SPD Bus until the Adapter controls 30 give the Slave control unit 40b final status. The Adapter Bus Control 30 storage op controller 30d of FIG. 10 raises IOIC REQUEST and then waits for IOIC GRANT. When the controller 30d receives IOIC GRANT, it drives the K/S Bus 10n2 and the Adapter A/D Bus 10n1 from T0 to T0 of the next cycle (See FIG. 30 for timing sequence). The Key bus 10n2 of FIG. 19 contains the message priority value, and byte zero of the Adapter A/D bus 10n1 contains '0A', which is the Message Acceptance command. When the storage controller logic 10g (see FIG. 20) receives the command and address on the cycle following the IOIC GRANT, it gates the information from the ADAPTER BUS 10n1 into the CMD/ADDR register 60i. The message priority on the Key/Status Bus 10n2 during this same cycle is clocked into the I/O KEY reg 60f. This message priority value will determine which Message Buffer Offset Register 60p or 60q will be used for this message. The address contained in the selected message buffer will be gated to the storage bus 10f at STORAGE COMMAND TIME. The command '0A' will be changed to an '88' which is a sixteen byte write operation. On the second data cycle, the data in the DATA IN register 60a, will be clocked into the DATA OUT register, while the data from the ADAPTER BUS 10n1 is clocked into the DATA IN register. This sequence will continue for four cycles. On the third cycle, STORAGE COMMAND TIME (one of the as the I/O REQUEST TO D-CACHE signal. This I/O REQUEST TO D-CACHE signals the data cache to gate the command and address into its logic so that a search of the cache can be made to see if the data being updated exists within the cache and to see if the data within that line has been modified. If the data exists but has not been modified, the cache will invalidate that line of data and allow the storage operation to be done in the memory card. If however, the data does exist and the data within that line has been modified, the data cache will use the data received on data cycles following the command to modify the existing data in the cache. All data gated to the storage bus 10f by the storage controller 10g is gated from the DATA OUT register 60b. Meanwhile the selected memory card is in the process of accessing the storage location addressed by the address given in bytes 1-3 on the command cycle. On each cycle following the transmission of data to the storage card, the INPUT PARITY line will indicate whether an error was detected, and if active, will be gated to the ERROR DETECTION LOGIC 60m, and then relayed to the I/O STATUS register 60e. At the end of the storage operation, the appropriate message buffer offset register will be incremented to the next quad word address. The storage op controller 30d puts the first three Data Buffers 20a on the Adapter A/D Bus 10n1 from T0 To T0 during the next three data cycles. On the fourth data cycle, the storage op controller 30d puts the MASW register of FIG. 6 (a part of the status registers 20g of FIG. 3) on the Adapter A/D Bus 10n1 from T0 to T0, and, then, waits four cycles to get the final write status from the IOIU 10e on the Status Bus 10n2. The Slave Control unit 40b of FIG. 12 receives the final status from the Adapter Bus Controls 30 and puts the ending status on the C/S Bus 10t2. After waiting for the bus to settle, the slave control 40b raises RDY to tell the master control 40a of FIG. 12 that the Message Acceptance operation in the IOIC is complete. The IOBU drops MSEL and then stops driving the A/D Bus 10t1 and the O/D Bus 10t3. When the slave IOIC sees MSEL drop, it drops RDY and stops driving the C/S Bus 10t2. The IOBU master can now drop MST which ends the operation.

B. Read Wrap Operation

This instruction is a SPD Unit Read operation from an IOBU 10p10s to the IOIC. The data received from the IOBU during the select cycle is buffered in the IOIC, and, then, for the purpose of checking the operation of the spd bus, the data received from the IOBU is put back on the A/D Bus 10t1 for transmission back to the IOBU during the data cycles.

Figure 37:
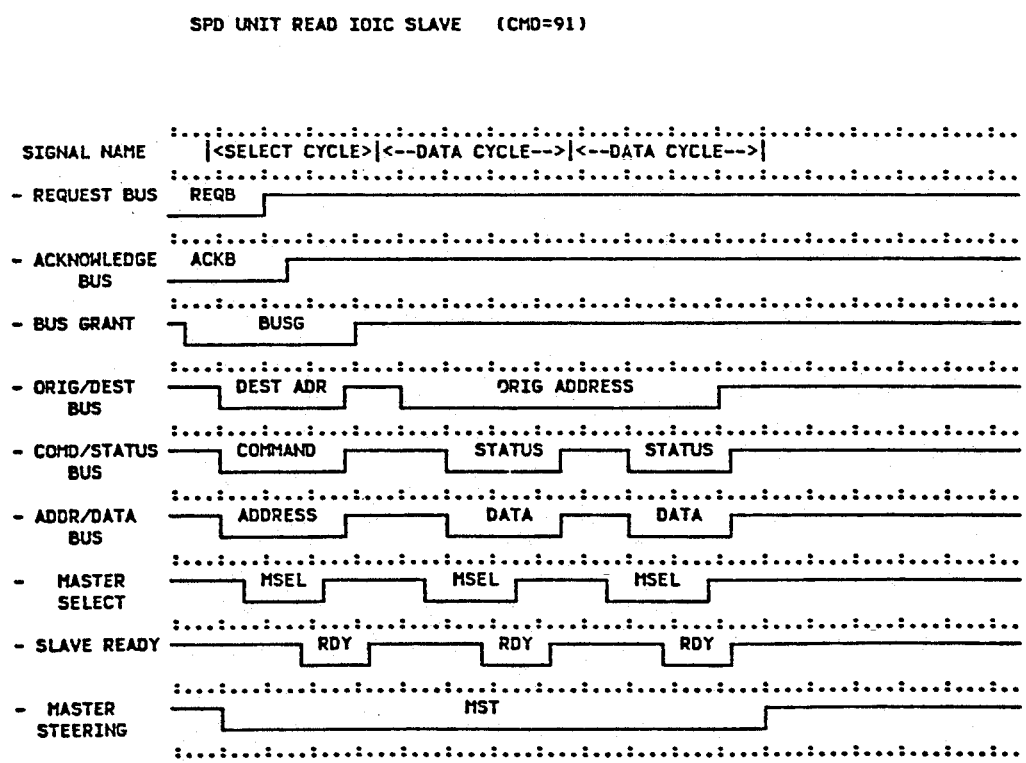
Figure 38:
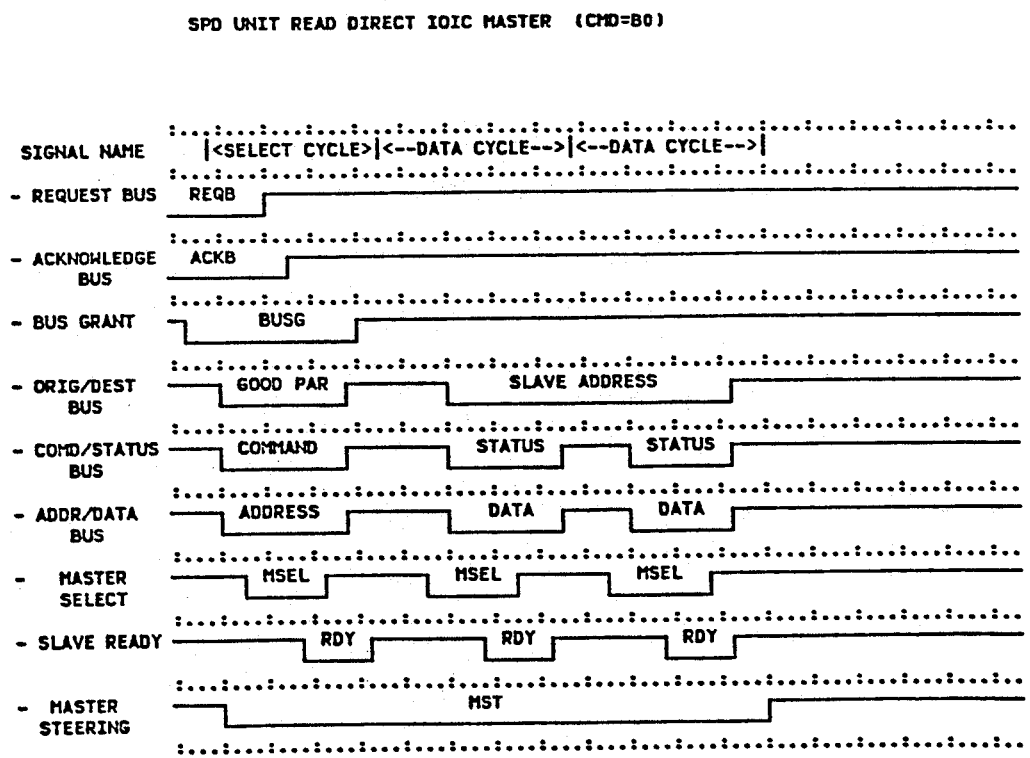

An SPD operation to an IOIC starts when the IOBU sends a REQB to the BCU 50 (See FIG. 37 for SPD bus sequence). The BCU 50 raises ACKB to start the bus polling and then raises BUSG when the SPD Bus is free to start another operation. The IOBU that raised the REQB captures the poll, and, when it sees BUSG, starts the select cycle. The IOBU drives the A/D Bus 10t1, C/S Bus 10t2, O/D Bus 10t3 and master steering (MST) of the control line group 10t4. After the data on the buses settles down, the IOBU drives master select (MSEL) of the control line group 10t4 telling the IOIC Slave Control unit 40b that the data is valid. The Slave control 40b decodes the '9F' command from the C/S Bus 10t2 and matches on '00' from the O/D Bus 10t3. The data on the A/D Bus 10t1 is put in the Diagnostic Buffer 20j of FIG. 3, then, the IOIC raises RDY to tell the IOBU to continue During this time, the IOBU drops REQB and the BCU 50 drops ACKB. The IOBU, seeing RDY, drops MSEL and stops driving the buses. After MSEL drops, the IOIC drops RDY and the BCU 50 drops BUSG to end the select cycle. The first data cycle starts when the IOBU drives the O/D Bus 10t3 with its address, and, after the buses settle, raises master select (MSEL) of control line group 10t4 to indicate that the bus data is valid. The slave control 40b of FIG. 12 drives the A/D Bus 10t1 with the data stored in the Diagnostic Buffer 20j and the C/S Bus 10t2 with status (see FIG. 26), if there is an error, and, after waiting for the bus to settle, raises RDY. The IOBU drops MSEL after receiving the A/D Bus 10t1. The IOIC slave control unit 40b of FIG. 12 drops RDY and stops driving the A/D Bus 10t1 and C/S Bus 10t2 to end the first data cycle. The second data cycle starts when the IOBU raises MSEL to tell the IOIC slave to continue. The slave control 40b drives the A/D Bus 10t1 again with data stored in the Diagnostic Buffer 20j and the C/S Bus 10t2 with ending status or error status, if there was an error. After waiting for the bus to settle, the slave control 40b raises RDY to tell the master control 40a of FIG. 12 that the Read Wrap operation in the IOIC is complete. The IOBU (one of 10p-10s) drops master select (MSEL) and then stops driving the O/D Bus 10t3. When the slave IOIC sees MSEL drop, it drops RDY and stops driving the A/D Bus 10t1 and the C/S Bus 10t2 The IOBU master can now drop MST which ends the operation.

5. SPD STORAGE OPERATION TO IOIC

A. Write 32 Bytes Memory Operation

This instruction is a SPD Storage Write operation from an IOBU (one of 10p-10s) to the IOIC 10j-10m. The data received from the IOBU is buffered in the IOIC and then sent to the IOIU 10e for storage.

Figure 33:
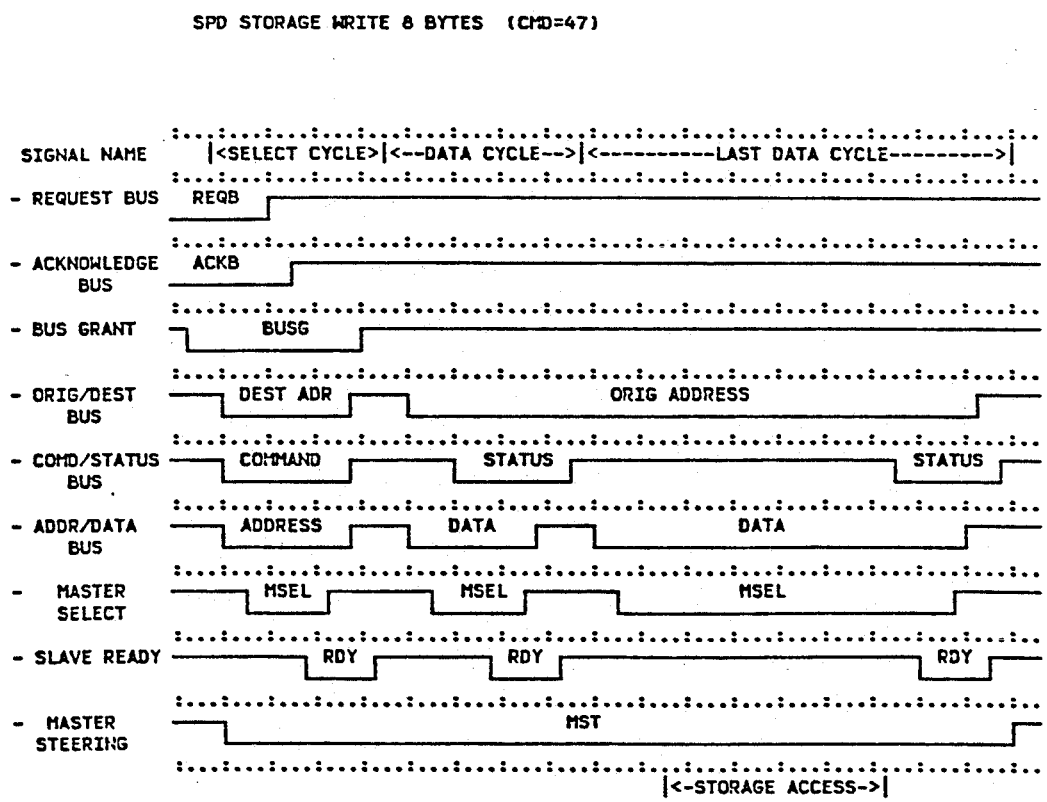
FIGS. 33-39 illustrate timing sequence diagrams associated with the SPD I/O bus.
Figure 34:
Figure 35:
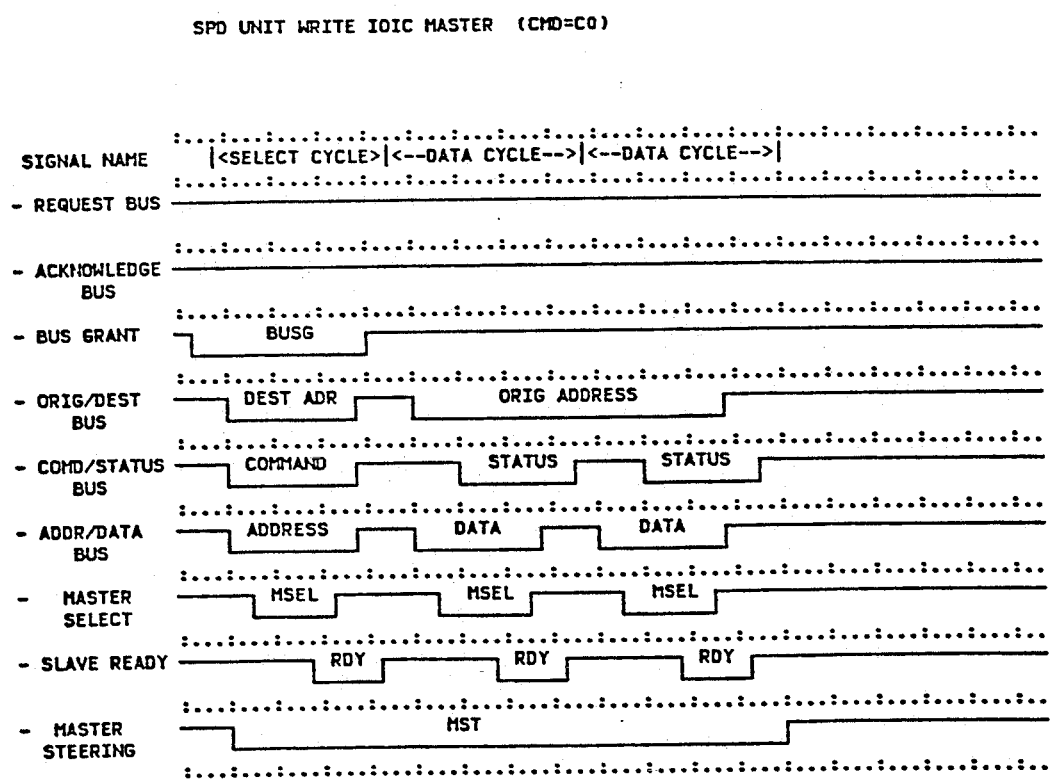
Figure 36:
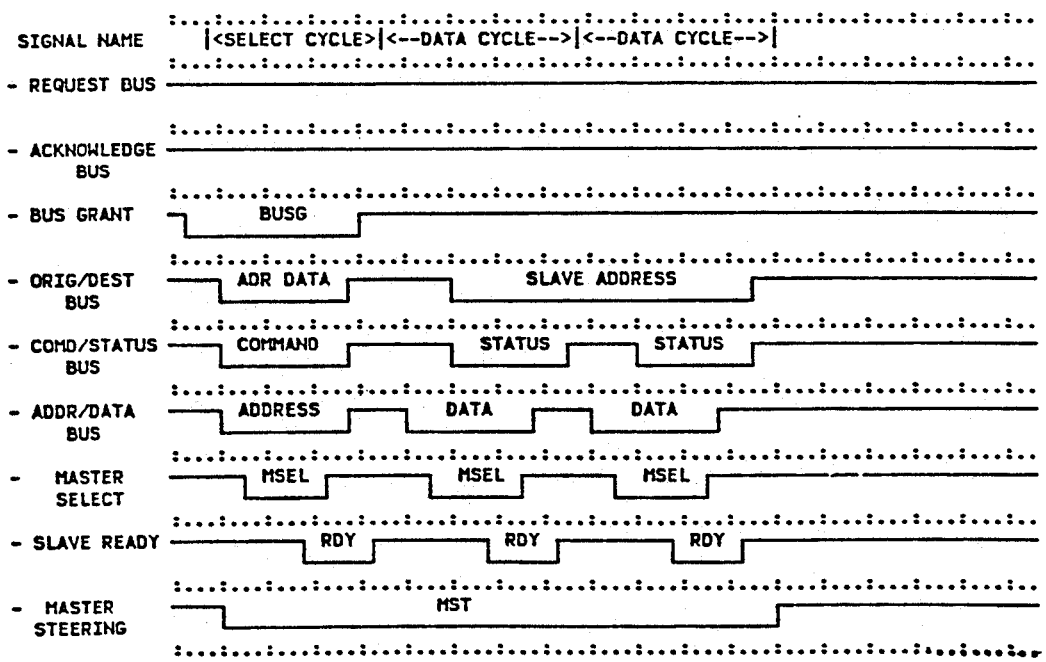

An SPD operation to an IOIC starts when the IOBU sends a REQB to the BCU 50 (See FIG. 33 for SPD bus sequence). The BCU 50 raises ACKB to start the bus polling and then raises BUSG when the SPD Bus is free to start another operation. The IOBU that raised the REQB captures the poll; and, when it sees BUSG, starts the select cycle. The IOBU drives the A/D Bus 10t1, C/S Bus 10t2, O/D Bus 10t3 and master steering (MST) of control line group 10t4. After the data on the buses settles down, the IOBU drives master select (MSEL) of control line group 10t4 telling the IOIC Slave Control unit 40b that the data is valid. The Slave control 40b decodes the '5F' command from the C/S Bus 10t2 and matches on '00' from the O/D Bus 10t3. The data on the A/D Bus 10t1 is put in the Address Register 20d of FIG. 3 and A/D Bus 10t1 bits 0-5 in the Key Buffer 20c. Then, the IOIC raises RDY to tell the IOBU to continue. During this time, the IOBU drops REQB and the BCU 50 drops ACKB. The IOBU, seeing RDY, drops MSEL and stops driving the buses. After MSEL drops, the IOIC drops RDY and the BCU 50 drops BUSG to end the select cycle. The first data cycle starts when the IOBU drives the A/D Bus 10t1 with the data and the O/D Bus 10t3 with its address and, after the buses settle, raises MSEL of the control line group 10t4 to indicate that the bus data is valid. The slave control 40b of FIG. 12 puts the data from the A/D Bus 10t1 into the first Data Buffer 20a. The slave control 40b drives the C/S Bus 10t2 with status (see FIG. 26) if there is an error and, after waiting for the bus to settle, raises RDY. The IOBU drops MSEL and stops driving the A/D Bus 10t1. The IOIC slave control unit 40b drops RDY and stops driving the C/S Bus 10t2 to end the first data cycle. The second thru seventh data cycles are all like the first data cycle and they put the data in the second thru seventh Data Buffers. During the data cycles, the Storage Opcode Translator unit 40c of FIG. 12 takes the '5F' command (see FIG. 23) and generates a '90' Memory Opcode and stores it in byte 0 of the Address Register 20d of FIG. 3. The eighth data cycle starts when the IOBU drives the A/D Bus 10t1 with the data and, after the bus settles, raises MSEL of control line group 10t4 to indicate that the bus data is valid. The slave control 40b puts the data from the A/D Bus 10t1 into the eight Data Buffer 20a Now that the IOIC has all of the data, the Slave Control unit 40b turns the operation over to the Adapter Bus Controls 30 and holds the SPD Bus until the Adapter bus controls 30 give the Slave controls 40b final status. The Adapter Bus Control 30 storage op Controller 30d raises IOIC REQUEST and then waits for IOIC GRANT from IOIU 10e. When the controller receives IOIC GRANT, it drives the K/S Bus 10n2 and the Adapter A/D Bus 10n1 from T0 to T0 of the next cycle. The Key bus 10n2 contains the 370 key and the Adapter A/D bus 10n1 contains the first Address Register 20d. Byte 0 of the Address Register 20d is the memory command (FIG. 21A) and bytes 1-3 are the starting memory address. When the storage controller logic 10g (see FIG. 20) receives the command and address on the cycle following the IOIC GRANT, it gates the information from the ADAPTER BUS 10n1 into the CMD/ADDR register 60i. The Key data present on the Key/Status Bus 10n2 during this same cycle is clocked into the I/O KEY reg 60f. The cycle following the command and address will contain the first data sent on the ADAPTER BUS 10n1 and is clocked into the DATA IN reg 60a. Simultaneously during this second cycle, the address in the CMD/ADDR register 60i is added to the 370 OFFSET register 60j if the I/O KEY register bit 4 is zero. If bit 4 is a one, then a zero value is substituted for the 370 OFFSET value. The result of the addition from ADDER 60k is gated to the KEY STACK ARRAY 60h which addresses the key value for that memory address requested. The output of the key stack is gated into the the KEY DATA register 60g. The key data in the KEY DATA register 60g is now compared to the key in the I/O KEY register 60f by the ERROR DETECTION LOGIC 60m. If the key is acceptable the status gated to the I/O STATUS register 60e will indicate good status. Otherwise, a protection check indication will be set into the register. On the second data cycle, the data in the DATA IN register 60a, will be clocked into the DATA OUT register, while the data from the ADAPTER BUS 10n1 is clocked into the DATA IN register. This sequence will continue for as many cycle as necessary, determined by the opcode received on the command cycle in byte 0 of the CMD/ADDR register 60i. Assuming no error conditions exist, the resultant address from the ADDER 60k is placed on the Storage Bus 10f bytes 1-3 during this same cycle. Byte 0 of the Storage Bus will be driven with the value in the CMD/ADDR register 60i. FIG. 21A lists the code points used for each length of data transfer. During this cycle, STORAGE COMMAND TIME (one of the storage control 10h signals) will be driven as well as the I/O REQUEST TO D-CACHE signal. This I/O REQUEST TO D-CACHE signals the data cache to gate the command and address into its logic so that a search of the cache can be made to see if the data being updated exists within the cache and to see if the data within that line has been modified. If the data exists but has not been modified, the cache will invalidate that line of data and allow the storage operation to be done in the memory card. If however, the data does exist and the data within that line has been modified, the data cache will use the data received on data cycles following the command to modify the existing data in the cache. One exception to this procedure exists, and that is, if the write operation is 32 bytes, or a full line within the cache, the data cache will not write the data Instead it invalidates the line within the cache and allows the write to memory. This means that a reference to this data by the IPU will cause the line to be refetched into the cache. All data gated to the storage bus 10f by the storage controller 10g is gated from the DATA OUT register 60b. Meanwhile the selected memory card is in the process of accessing the storage location addressed by the address given in bytes 1-3 on the command cycle. On each cycle following the transmission of data to the storage card, the INPUT PARITY line will indicate whether an error was detected, and if active, will be gated to the ERROR DETECTION LOGIC 60m, and then relayed to the I/O STATUS register 60e. The Storage OP Controller 30d puts the eight data Buffers 20a on the Adapter A/D Bus 10n1 from T0 To T0 during the next eight data cycles After the eighth data cycle, the storage controller 30d waits four cycles to get the final write status from the IOIU on the Status Bus. The Slave Control unit 40b receives the final status from the Adapter Bus Controls 30 and puts the ending status on the C/S Bus 10t2. After waiting for the bus to settle, the slave control 40b raises RDY to tell the master control 40a that the Storage Write operation in the IOIC is complete. The IOBU drops master select (MSEL) of control line group 10t4 and then stops driving the A/D Bus 10t1 and the O/D Bus 10t3. When the slave control 40b of the IOIC sees MSEL drop, it drops RDY and stops driving the C/S Bus 10t2. The IOBU master control 40a can now drop master steering (MST) of control line group 10t4 which ends the operation.

B. Read 32 Bytes Memory Operation

This instruction is an SPD Storage Read operation from an IOBU (one of 10p–10s) to the IOIC (one of 10j–10m). The data read from the IOIU 10e is buffered in the IOIC and then sent to the IOBU.

An SPD operation to an IOIC starts when the IOBU 10e sends a REQB to the BCU 50. The BCU 50 raises ACKB to start the bus polling and then raises BUSG when the SPD Bus is free to start another operation. The IOBU that raised the REQB captures the poll and, when it sees BUSG, starts the select cycle. The IOBU drives the A/D Bus 10t1, C/S Bus 10t2, O/D Bus 10t3 and master steering (MST) of the control line group 10t4. After the data on the buses settles down, the IOBU drives master select (MSEL) of the control line group 10t4 telling the IOIC Slave Control unit 40b that the data is valid. The Slave control 40b decodes the '1F' command (see FIG. 23) from the C/S Bus 10t2 and matches on '00' from the O/D Bus 10t3. The data on the A/D Bus 10t1 is put in the Address Register 20d of FIG. 3 and A/D Bus 10t1 bits 0–5 in the Key Buffer 20c. Then, the IOIC raises RDY to tell the IOBU to continue. During this time, the IOBU drops REQB and the BCU 50 drops ACKB. The IOBU, seeing RDY, drops MSEL and stops driving the buses. After MSEL drops, the IOIC drops RDY and the BCU 50 drops BUSG to end the select cycle. The first data cycle starts when the IOBU drives the O/D Bus 10t3 with its address and, after the buses settle, raises MSEL of control line group 10t4 to indicate that the bus data is valid. The slave control 40b decodes the command; the Storage Opcode Translator unit 40c of FIG. 12 takes the '1F' command and generates a 'D0' Memory Opcode and stores it in byte 0 of the Address Register 20d. Now that the IOIC knows that this a storage read operation, the Storage Op Controller 30d turns the operation over to the Adapter Bus Controls 30 and holds the SPD Bus until the Adapter controls 30 give the Slave controls 40b DATA VALID, indicating that the data is on the Adapter A/D Bus 10n1. The Adapter Bus Control 30 storage op controller 30d raises IOIC REQUEST and then waits for IOIC GRANT. When the controller 30d receives IOIC GRANT, it drives the K/S Bus 10n2 and the Adapter A/D Bus 10n1 from T0 to T0 of the next cycle. The Key bus 10n2 contains the 370 key and the Adapter A/D bus 10n1 contains the first Address Register 20d Byte 0 of the Address Register 20d is the memory command (see FIG. 21A) and bytes 1–3 are the starting memory address When the storage controller logic 10g (see FIG. 20) receives the command and address on the cycle following the IOIC GRANT, it gates the information from the ADAPTER BUS 10n1 into the CMD/ADDR register 60i. The Key data present on the Key/Status Bus 10n2 during this same cycle is clocked into the I/O KEY reg 60f. The cycle following the command and address will contain the first data sent on the ADAPTER BUS 10n1 and is clocked into the DATA IN reg 60a. In the case of a read operation, any data maybe sent with good parity. Simultaneously during this second cycle, the address in the CMD/ADDR register 60i is added to the 370 OFFSET register 60j if the I/O KEY register bit 4 is zero. If bit 4 is a one, then a zero value is substituted for the 370 OFFSET value. The result of the addition from ADDER 60k is gated to the KEY STACK ARRAY 60h which addresses the key value for that memory address requested. The output of the key stack is gated into the the KEY DATA register 60g. The key data in the KEY DATA register 60g is now compared to the key in the I/O KEY register 60f by the ERROR DETECTION LOGIC 60m. If the key is acceptable the status gated to the I/O STATUS register 60e will indicate good status. Otherwise, a protection check indication will be set into the register. Assuming no error conditions exist, the resultant address from the ADDER 60k is placed on the Storage Bus 10f bytes 1–3 during this same cycle. Byte 0 of the Storage Bus will be driven with the value in the CMD/ADDR register 60i. FIG. 21A lists the code points used for each length of data transfer. During this cycle, STORAGE COMMAND TIME (one of the storage control 10h signals) will be driven as well as the I/O REQUEST TO D-CACHE signal. This I/O REQUEST TO D-CACHE signals the data cache to gate the command and address into its logic so that a search of the cache can be made to see if the data being fetched exists within the cache and to see if the data within that line has been modified. If the data exists but has not been modified, the cache will allow the data to be accessed from the memory card. If however, the data does exist and the data within that cache line has been modified, the data cache will send a signal HIT & MODIFIED to the storage controller 10g on the cycle following the command time. Receipt of this signal will cause the storage controller 10g to activate the STORAGE DISABLE signal (part of the storage controls 10h). This will cause the memory card being accessed to disable its drivers on the storage bus 10f and allow the data cache to send the data requested on the storage bus upon receipt of the DATA CACHE GATE DATA signal. All data gated to the storage bus 10f by either the memory card or the cache will be gated into the DATA IN register and relayed to the Adapter Bus 10n1 on the next cycle from T0 to T0. Refer to timing diagram for storage read operations on FIG. 27. Any error status received during STORAGE DATA VALID cycles on the storage control lines 10h, will be gated to the error detection logic 60m and relayed to the I/O status register 60e, for transmission during data cycle corresponding to the error. When ADAPTER DATA VALID comes on, for eight cycles, the storage op controller 30d will take the data from the Adapter A/D Bus 10n1 and put it in the eight Data Buffers 20a at T2 time, and will accumulate the read status from the IOIU 20e on the Status Bus at each T2. Now that the IOIC has all of the data, the Adapter Bus Control unit 30 turns the operation back over to the SPD Slave Control Unit 40b. The slave control 40b drives the A/D Bus 10t1 with the data in the first Data Buffer 20a and the C/S Bus 10t2 with status (see FIG. 26) if there is an error. After waiting for the bus to settle, the slave IOIC raises RDY. The master IOBU drops MSEL after receiving the data. The slave control 40b drops RDY and stops driving the A/D Bus 10t1 and C/S Bus 10t2 to end the first data cycle. The second through the seventh data cycles start when the master IOBU raises MSEL to indicate that the it is ready for more data. The slave control 40b drives the A/D Bus 10t1 with data from the second thru seventh Data Buffers 20a and drives the C/S Bus 10t2 with status if there is an error. After waiting for the bus to settle, the slave IOIC (slave control unit 40b) raises RDY. The master IOBU drops MSEL after receiving the data The slave control 40b drops RDY and stops driving the A/D Bus 10t1 and C/S Bus 10t2 to end the data cycle. The eighth data cycle starts when the master IOBU raises MSEL to indicate that the it is ready for more data. The slave control unit 40b drives the A/D Bus 10t1 with data from the eighth Data Buffer 20a and drives the C/S Bus 10t2 with ending status or error status, if there was an error, and, after waiting for the buses to settle, raises RDY. The master IOBU drops MSEL after receiving the data and stops driving O/D Bus 10t3. The slave control unit 40b drops RDY, stops driving the A/D Bus 10t1 and the C/S Bus 10t2. The IOBU master can now drop MST which ends the operation.

C. Write 6 Bytes Read Modify Write Operation

This instruction is a SPD Storage Write operation from an IOBU (one of 10p-10s) to an IOIC (one of 10j-10m). The data received from the IOBU buffered in the IOIC and then sent to the IOIU 10e using read modify write command for storage.

An SPD operation to an IOIC starts when the IOBU sends a REQB to the BCU 50. The BCU 50 raises ACKB to start the bus polling and then raises BUSG when the SPD Bus (one of 10t-10w) is free to start another operation. The IOBU that raised the REQB captures the poll and, when it sees BUSG, starts the select cycle. The IOBU drives the A/D Bus 10t1, C/S Bus 10t2, O/D Bus 10t3 and master steering (MST) of the control line group 10t4 of FIG. 19. After the data on the buses settles down, the IOBU drives master select (MSEL) of the control line group 10t4 telling the IOIC Slave Control unit 40b that the data is valid. The Slave control 40b decodes the '45' command from the C/S Bus 10t2 and matches on '00' from the O/D Bus 10t3. The data on the A/D Bus 10t1 is put in the Address Register 20d and A/D Bus 10t1 bits 0-5 in the Key Buffer 20c. Then, the IOIC 38 raises RDY to tell the IOBU to continue. During this time, the IOBU drops REQB and the BCU 50 drops ACKB. The IOBU, seeing RDY, drops MSEL and stops driving the buses. After MSEL drops, the IOIC drops RDY and the BCU 50 drops BUSG to end the select cycle. The first data cycle starts when the IOBU drives the A/D Bus 10t1 with the data and the O/D Bus 10t3 with its address and, after the buses settle, raises MSEL to indicate that the bus data is valid. The slave control 40b puts the data from the A/D Bus 10t1 into the even Data Buffer 20a pointed to by the address. The slave control 40b drives the C/S Bus 10t2 with status (see FIG. 26) if there is an error and, after waiting for the bus to settle, raises RDY. The IOBU drops MSEL and stops driving the A/D Bus 10t1 The IOIC slave control 40b drops RDY and stops driving the C/S Bus 10t2 to end the first data cycle. While the data cycles are in process, the-Storage Opcode Translator unit 40c of FIG. 12 takes the '45' command, generates a 'B8' Memory Opcode, and stores it in byte 0 of the Address Register 20d. The second data cycle starts when the IOBU drives the A/D Bus 10t1 with the data and, after the bus settles, raises MSEL to indicate that the bus data is valid. The slave control 40b puts the data from the A/D Bus 10t1 into the odd Data Buffer 20a pointed to by the address. Now that the IOIC has all of the data, the Slave Control unit 40b turns the operation over to the Adapter Bus Controls 30 and holds the SPD Bus until the Adapter controls 30 give the Slave control unit 40b final status. The Adapter Bus Control 30 storage op controller 30d raises IOIC REQUEST and then waits for IOIC GRANT. When the controller 30d receives IOIC GRANT, it drives the K/S Bus 10n2 and the Adapter A/D Bus 10n1 from T0 to T0 of the next cycle. The Key bus 10n2 contains the 370 key and the Adapter A/D bus 10n1 contains the first Address Register 20d. Byte 0 of the Address Register 20d is the memory command (see FIG. 21A) and bytes 1-3 are the starting memory address. The controller 30d puts the two Data Buffers 20a on the Adapter A/D Bus 10n1 from T0 To T0 during the next two data cycles. When the storage controller logic 10g (see FIG. 20) receives the command and address on the cycle following the IOIC GRANT, it gates the information from the ADAPTER BUS 10n1 into the CMD/ADDR register 60i. The Key data present on the Key/Status Bus 10n2 during this same cycle is clocked into the I/O KEY reg 60f. The cycle following the command and address will contain the first data sent on the ADAPTER BUS 10n1 and is clocked into the DATA IN reg 60a. Simultaneously during this second cycle, the address in the CMD/ADDR register 60i is added to the 370 OFFSET register 60j if the I/O KEY register bit 4 is zero. If bit 4 is a one, then a zero value is substituted for the 370 OFFSET value. The result of the addition from ADDER 60k is gated to the KEY STACK ARRAY 60h which addresses the key value for that memory address requested The output of the key stack is gated into the the KEY DATA register 60g. The key data in the KEY DATA register 60g is now compared to the key in the I/O KEY register 60f, by the ERROR DETECTION LOGIC 60m. If the key is acceptable the status gated to the I/O STATUS register 60e will indicate good status. Otherwise, a protection check indication will be set into the register. On the second data cycle, the data in the DATA IN register 60a, will be clocked into the DATA OUT register, while the data from the ADAPTER BUS 10n1 is clocked into the DATA IN register. Assuming no error conditions exist, the resultant address from the ADDER 60k is placed on the Storage Bus 10f bytes 1-3 during this same cycle. Byte 0 of the Storage Bus will be driven with the value x'F8' which is the first cycle command of the two step Read Modify Write storage operation. During this cycle, STORAGE COMMAND TIME (one of the storage control 10h signals) will be driven as well as the I/O REQUEST TO D-CACHE signal. This I/O REQUEST TO D-CACHE signals the data cache to gate the command and address into its logic so that a search of the cache can be made to see if the data being updated exists within the cache and to see if the data within that line has been modified. If the data exists but has not been modified, the cache will invalidate that line of data and allow the storage operation to be done in the memory card. If however, the data does exist and the data within that line has been modified, the data cache will use the data received on the two cycles following the command to modify the appropriate data within the specified cache line. The first data cycle information sent by the storage controller 10g is gated from the DATA OUT register 60b. The second data Cycle information sent by the storage controller 10g is gated from the DATA IN register 60a. These two data cycles are not clocked into the memory cards. Meanwhile the selected memory card is in the process of accessing the storage location addressed by the address given in bytes 1-3 on the command cycle. After three access cycles have passed, the storage card will send the STORAGE DATA VALID signal, which indicates the access has finished, the double word of data is in its data register and is now ready to accept the write portion of the two cycle RMW storage operation. The cycle following the receipt of STORAGE DATA VALID, signals the storage controller to send the STORAGE COMMAND TIME signal again and also gate the address again on bytes 1-3 of the storage buss 10f. Byte 0 will now contain the x'B8' command which is still in the CMD/ADDR register 60i. The next two cycles following the command will contain first the data in the DATA OUT register 60b, followed by the data in the DATA IN register 60a. On each cycle following the transmission of data to the storage card, the INPUT PARITY line will indicate whether an error was detected, and if active, will be gated to the ERROR DETECTION LOGIC 60m, and then relayed to the I/O STATUS register 60e. After the second data cycle, the storage op controller 30d of FIG. 10 waits for DATA VALID from the IOIU 10e and then counts four cycles to get the final write status from the IOIU 10e on the Status Bus. The Slave Control unit 40b receives the final status from the Adapter Bus Controls 30 and puts the ending status on the C/S Bus 10t2. After waiting for the bus to settle, the slave control 40b raises RDY to tell the master control 40a that the Storage Write operation in the IOIC is complete The IOBU drops MSEL and then stops driving the A/D Bus 10t1 and the O/D Bus 10t3. When the slave IOIC (slave control unit 40b) sees MSEL drop, it drops RDY and stops driving the C/S Bus 10t2. The IOBU master control unit 40a can now drop MST which ends the operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of performing a data storage operation in a main data store over a plurality of buses, said plurality including a first asynchronous bus interconnecting one or more Input/Output Bus Units (IOBUs) and a first Input/Output Interface Controller (IOIC), a second synchronous bus interconnecting said first IOIC and one or more additional IOICs and a storage controller, and a third synchronous bus interconnecting said storage controller and said main data store, said first asynchronous bus including a first address/data bus, a command/status bus, an origin/destination bus, and a handshaking line group, said second synchronous bus including a second address/data bus, a key/status bus and a control line group, said third synchronous bus including a third address/data bus and a storage control bus, said method comprising the unordered steps of:

(a) arbitrating a request from a first said IOBU or said first IOIC for control of said first asynchronous bus;

(b) transferring information on said first asynchronous bus between said first IOBU and said first IOIC by exchanging asynchronous handshaking signals via said handshaking line group,
a first part of said information being transferred between said first IOBU and said first IOIC via said first address/data bus,
a second part of said information being transferred between said first IOBU and said first IOIC via said command/status bus, and
a third part of said information being transferred between said first IOBU and said first IOIC via said origin/destination bus;

(c) storing said first and said third parts of said information in said first IOIC;

(d) arbitrating a request from said first IOIC or said main data store for control of said second and third synchronous buses;

(e) transferring information on said second synchronous bus between said first IOIC and said storage controller in response to clock signals from said second synchronous bus,
said first part of said information being transferred between said first IOIC and said storage controller via said second address/data bus; and (f) transferring information on said third synchronous bus between said storage controller and said main data store in response to clock signals from said third synchronous bus,
said first part of said information being transferred between said storage controller and said main data store via said third address/data bus.

2. The method of claim 1, wherein, during a select cycle of a write to storage operation, said first part of said information includes key information and starting main data store address information, said transferring step (b) including the step of transmitting said key information and said starting main data store address information from said first IOBU to said first IOIC via said first address/data bus.

3. The method of claim 2, wherein, during said select cycle of said write to storage operation, said second part of said information includes a write command and a number representing the number of bytes of data to be stored in said main data store, said transferring step (b) including the step of transmitting said write command and said number of bytes of data from said first IOBU to said first IOIC via said command/status bus.

4. The method of claim 3, wherein, during said select cycle of said write to storage operation, said third part of said information includes an address of said first IOIC, said transferring step (b) further including the step of transmitting said address of said first IOIC from said first IOBU to said first IOIC via said origin/destination bus.

5. The method of claim 1, wherein, during a data cycle of a write to storage operation, said first part of said information includes a word of data, said transferring step (b) including the step of transmitting said word of data from said first IOBU to said first IOIC via said first address/data bus.

6. The method of claim 5, wherein, during said data cycle of said write to storage operation, said third part of said information includes an address of said first IOBU, said transferring step (b) including the step of transmitting said address of said first IOBU from said first IOBU to said first IOIC via said origin/destination bus.

7. The method of claim 6, wherein, said first IOIC, stores said word of data until said word of data is completely received from said first IOBU, said first IOIC generating storage commands and transferring said word of data to said main data store, said first IOIC receiving data status information from said main data store when said word of data is received by said main store; and wherein during said data cycle of said write to storage operation, said second part of said information includes completion status information, said transferring step (b) including the step of transmitting said completion status information from said first IOIC to said first IOBU via said command/status bus after said word of data has been transferred to said main data store and said data status information has been received by said first IOIC from said main data store.

8. The method of claim 1 wherein, during a select cycle of a read from storage operation, said first part of said information includes key information and starting main data store address information, said transferring step (b) comprising the step of transmitting said key information and said starting main data store address information from said first IOBU to said first IOIC, via said first address/data bus.

9. The method of claim 8, wherein, during the select cycle of the read from storage operation, said second part of said information includes a read command and a number representing the number of bytes of data to be read from said main data store, said transferring step (b) including the step of transmitting said read command and said number representing the number of bytes of data from said first IOBU to said first IOIC via said command/status bus.

10. The method of claim 9, wherein, during the select cycle of the read from storage operation, said third part of said information includes an address of said first IOIC, said transferring step (b) including the step of transmitting said address of said first IOIC via said origin/destination bus.

11. The method of claim 1 wherein, during a data cycle of a read from storage operation, said third part of said information includes an address of said first IOBU, said transferring step (b) including the step of transmitting said address of said first IOBU from said first IOBU to said first IOIC via said origin/destination bus.

12. The method of claim 11, wherein, said first IOIC generates a storage command and receives a word of data from said main data store in response thereto, said first IOIC buffering said word of data therein; and wherein during the data cycle of the read from storage operation, said first part of said information includes said word of data, said transferring step (b) including the step of transmitting said word of data from said first IOIC to said first IOBU via said first address/data bus.

13. The method of claim 12, wherein, during the data cycle of the read from storage operation, said second part of said information includes completion status information, said transferring step (b) including the step of transmitting said completion status information from said first IOIC to said first IOBU via said command/status bus after said word of data is completely transmitted from said first IOIC to said first IOBU.

(c)

* * * * *

UNITED STATES PATENT AND TRADEMARK OFFICE
CERTIFICATE OF CORRECTION

PATENT NO. : 5,276,814
DATED : January 4, 1994
INVENTOR(S) : Bourke et al

It is certified that error appears in the above-indentified patent and that said Letters Patent is hereby corrected as shown below:

On the tittle page, item [54], and in column 1, line 1:
In the title, please change "TRANFERRING" to --TRANSFERRING--

Signed and Sealed this

Thirty-first Day of May, 1994

Attest:

BRUCE LEHMAN

*Attesting Officer*     *Commissioner of Patents and Trademarks*